(12) United States Patent
Nakayama et al.

(10) Patent No.: US 11,307,393 B2
(45) Date of Patent: Apr. 19, 2022

(54) ZOOM LENS SYSTEM, INTERCHANGEABLE LENS, AND IMAGING APPARATUS

(71) Applicant: Ricoh Company, Ltd., Tokyo (JP)

(72) Inventors: Takahiro Nakayama, Kanagawa (JP); Tomoya Koga, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 48 days.

(21) Appl. No.: 16/808,523

(22) Filed: Mar. 4, 2020

(65) Prior Publication Data

US 2020/0292797 A1    Sep. 17, 2020

(30) Foreign Application Priority Data

Mar. 14, 2019   (JP) .............. JP2019-046773
Dec. 23, 2019   (JP) .............. JP2019-231486

(51) Int. Cl.
*G02B 15/14*   (2006.01)

(52) U.S. Cl.
CPC ............... *G02B 15/1461* (2019.08)

(58) Field of Classification Search
CPC .... G02B 15/145109; G02B 15/145117; G02B 15/1461; G02B 15/144109
USPC ............................... 359/676–679
See application file for complete search history.

(56) References Cited

U.S. PATENT DOCUMENTS

2009/0251778 A1* 10/2009 Adachi .......... G02B 15/145109
                                             359/554
2013/0342716 A1   12/2013 Yamamoto et al.
2015/0350558 A1   12/2015 Uchida et al.
2016/0048007 A1*  2/2016 Takada .......... G02B 15/144105
                                             359/684
2017/0123195 A1*  5/2017 Lee ................ G02B 15/1451

FOREIGN PATENT DOCUMENTS

JP   2009-251113      10/2009
JP   2013-195774       9/2013
WO   WO2012/121014 A1  9/2012

OTHER PUBLICATIONS

Extended European Search Report dated Jul. 29, 2020 in Patent Application No. 20161268.6, 7 pages.

* cited by examiner

*Primary Examiner* — Darryl J Collins
(74) *Attorney, Agent, or Firm* — Xsensus LLP

(57) ABSTRACT

A zoom lens satisfies Conditional Expression (1) as follows:

$$-20 < Twt/Twm < 1, \qquad (1)$$

Twt is a moving amount of the second lens group during zooming from the short focal-length end to the long focal-length end, a moving amount to the object side being indicated by a positive sign, a moving amount to an image side being indicated by a negative sign, and Twm is a moving amount of the second lens group during zooming from the short focal-length end to an intermediate focal length, a moving amount to the image side being indicated by a negative sign, the intermediate focal length being expressed by $fm=(fw \cdot ft)^{1/2}$, where fw is a focal length of a whole system at the short focal-length end, and ft is a focal length of the whole system at the long focal-length end.

18 Claims, 24 Drawing Sheets

SHORT FOCAL
LENGTH END

INTERMEDIATE
FOCAL LENGTH

LONG FOCAL
LENGTH END

SHORT FOCAL
LENGTH END

INTERMEDIATE
FOCAL LENGTH

LONG FOCAL
LENGTH END

SHORT FOCAL LENGTH END

INTERMEDIATE FOCAL LENGTH

LONG FOCAL LENGTH END

SHORT FOCAL
LENGTH END

INTERMEDIATE
FOCAL LENGTH

LONG FOCAL
LENGTH END

SHORT FOCAL
LENGTH END

INTERMEDIATE
FOCAL LENGTH

LONG FOCAL
LENGTH END

SHORT FOCAL LENGTH END

INTERMEDIATE FOCAL LENGTH

LONG FOCAL LENGTH END

SHORT FOCAL LENGTH END

INTERMEDIATE FOCAL LENGTH

LONG FOCAL LENGTH END

SHORT FOCAL LENGTH END

INTERMEDIATE FOCAL LENGTH

LONG FOCAL LENGTH END

SHORT FOCAL LENGTH END

INTERMEDIATE FOCAL LENGTH

LONG FOCAL LENGTH END

ZOOM LENS SYSTEM, INTERCHANGEABLE LENS, AND IMAGING APPARATUS

CROSS-REFERENCE TO RELATED APPLICATIONS

This patent application is based on and claims priority pursuant to 35 U.S.C. § 119(a) to Japanese Patent Application No. 2019-046773, filed on Mar. 14, 2019 and Japanese Patent Application No. 2019-231486, filed on Dec. 23, 2019, in the Japan Patent Office, the entire disclosure of which is hereby incorporated by reference herein.

BACKGROUND

Technical Field

The present disclosure relates to a zoom lens system, an interchangeable lens, and an imaging apparatus.

Description of the Related Art

There are a wide variety of requests from users for, for example, interchangeable lenses of lens interchangeable cameras. In particular, a category of standard-range zoom lenses having a large diameter with an F-number of less than 3 and having a size in a range of from about 24 to about 70 mm on a 35-mm film basis and a category of relatively high-power zoom lenses including a standard range in a range of from about 28 to about 150 mm on a 35-mm film basis are popular with users by a certain degree and are fully expected. Moreover, major requests from users for such interchangeable lenses involve being compact by a certain degree, having high performance, being able to perform close-up shooting, having a high autofocus speed, and producing a quiet autofocus operating sound.

In terms of having high performance, requests include, for example, to have a resolving power corresponding to an imaging element with 20,000,000 to 40,000,000 or more pixels; to have less coma flare and high contrast since a release of an aperture stop, thereby preventing a collapse of point images even in a peripheral portion of the angle of view; to have less chromatic aberration, thereby preventing occurrence of unintentional coloring even in a portion with a large difference in brightness; and to have less distortion, thereby being able to draw a straight line as it is. In terms of being compact by a certain degree, it is desirable to have a small filter diameter and a small size in the total length direction. In terms of close-up shooting, it is desirable to ensure a shooting distance of about 0.3 m in all zoom ranges. In terms of improving an autofocus speed and quietness, it is desirable to decrease the moving amount required for focusing and to decrease a load on a driving source of a focusing mechanism as much as possible. Optimization of a refractive power and a decrease in size of an optical system of a focusing section, a decrease in weight of a driven portion, and simplification of a driving method are requested.

SUMMARY

A zoom lens system includes, sequentially from an object side, a first lens group having a positive refractive power, a second lens group having a negative refractive power, a third lens group having a negative refractive power, and a rear lens group having a positive refractive power. Distances among the respective lens groups adjacent to one another change during zooming from a short focal-length end to a long focal-length end. The third lens group constitutes a focus lens group configured to move during focusing. The rear lens group includes an N-th lens group having a negative refractive power and configured such that distances between the N-th lens group and the respective lens groups adjacent to the N-th lens group change during zooming from the short focal-length end to the long focal-length end, and wherein the zoom lens system satisfies Conditional Expression (1) as follows:

$$-20 < Twt/Twm < 1, \tag{1}$$

where

Twt is a moving amount of the second lens group during zooming from the short focal-length end to the long focal-length end, a moving amount to the object side being indicated by a positive sign, a moving amount to an image side being indicated by a negative sign, and Twm is a moving amount of the second lens group during zooming from the short focal-length end to an intermediate focal length, a moving amount to the object side being indicated by a positive sign, a moving amount to the image side being indicated by a negative sign, the intermediate focal length being expressed by $fm=(fw \cdot ft)^{1/2}$, where fw is a focal length of a whole system at the short focal-length end, and ft is a focal length of the whole system at the long focal-length end.

An interchangeable lens and an imaging apparatus according to embodiments include one of the above-described zoom lens systems.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1A:
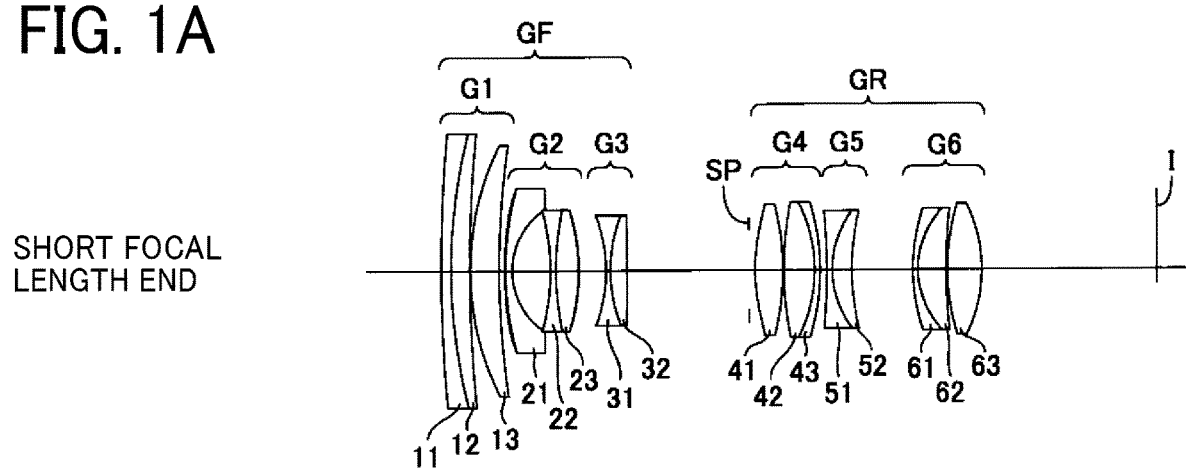
FIGS. 1A, 1B, and 1C each is a lens configuration diagram of a zoom lens system according to Numerical Example 1.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

As illustrated in lens configuration diagrams in FIGS. 1 to 9, a zoom lens system according to an embodiment includes, sequentially from the object side, a front lens group GF and a rear lens group GR.

Throughout all Numerical Examples 1 to 9 (FIGS. 1 to 9), the front lens group GF includes, sequentially from the object side, a first lens group G1 having a positive refractive power, a second lens group G2 having a negative refractive power, and a third lens group G3 having a negative refractive power.

Throughout all Numerical Examples 1 to 9 (FIGS. 1 to 9), the rear lens group GR as a whole has a positive refractive power. Reference sign I denotes an image surface in terms of design.

In Numerical Examples 1 to 6 (FIGS. 1 to 6), the rear lens group GR includes, sequentially from the object side, a fourth lens group G4 having a positive refractive power, a fifth lens group G5 having a negative refractive power, and a sixth lens group G6 having a positive refractive power. Thus, the zoom lens system as a whole has a six-group zoom lens configuration including six positive, negative, negative, positive, negative, and positive groups.

In Numerical Example 7 (FIG. 7), the rear lens group GR includes, sequentially from the object side, a fourth lens group G4 having a positive refractive power, a fifth lens group G5 having a negative refractive power, a sixth lens group G6 having a positive refractive power, and a seventh lens group G7 having a positive refractive power. Thus, the zoom lens system as a whole has a seven-group zoom lens configuration including seven positive, negative, negative, positive, negative, positive, and positive groups.

In Numerical Example 8 (FIG. 8), the rear lens group GR includes, sequentially from the object side, a fourth lens group G4 having a negative refractive power, a fifth lens group G5 having a positive refractive power, and a sixth lens group G6 having a positive refractive power. Thus, the zoom lens system as a whole has a six-group zoom lens configuration including six positive, negative, negative, negative, positive, and positive groups.

In Numerical Example 9 (FIG. 9), the rear lens group GR includes, sequentially from the object side, a fourth lens group G4 having a positive refractive power, a fifth lens group G5 having a positive refractive power, and a sixth lens group G6 having a negative refractive power. Thus, the zoom lens system as a whole has a six-group zoom lens configuration including six positive, negative, negative, positive, positive, and negative groups.

The distances among the respective lens groups (the first lens group G1 to the sixth lens group G6, or the first lens group G1 to the seventh lens group G7) adjacent to one another change along lens movement paths in FIGS. 1 to 9 during zooming from a short focal-length end to a long focal-length end. For example, in the case of the six-group zoom lens configuration including the first lens group G1 to the sixth lens group G6, during zooming from the short focal-length end to the long focal-length end, the distance between the first lens group G1 and the second lens group G2 increases, the distance between the second lens group G2 and the third lens group G3 increases or decreases, the distance between the third lens group G3 and the fourth lens group G4 decreases, the distance between the fourth lens group G4 and the fifth lens group G5 increases or decreases, and the distance between the fifth lens group G5 and the sixth lens group G6 decreases.

According to Numerical Examples 1 to 7 (FIGS. 1 to 7), the fifth lens group G5 constitutes an N-th lens group having a negative refractive power and configured such that the distance between the fifth lens group G5 and each of the respective lens groups adjacent to the N-th lens group changes during zooming from the short focal-length end to the long focal-length end. Note that the fifth lens group G5 constitutes the N-th lens group having a negative refractive power is merely an example, and the design can be changed in any of various ways. For example, the rear lens group GR may include two or more lens groups each having a negative refractive power, and one of the lens groups may constitute an N-th lens group.

Throughout Numerical Examples 1 to 6, the first lens group G1 includes, sequentially from the object side, a negative lens 11, a positive lens 12, and a positive lens 13.

In Numerical Example 7, the first lens group G1 includes, sequentially from the object side, a negative lens 11A, a positive lens 12A, and a positive lens 13A.

In Numerical Example 8, the first lens group G1 includes, sequentially from the object side, a negative lens 11B, a positive lens 12B, and a positive lens 13B.

In Numerical Example 9, the first lens group G1 includes, sequentially from the object side, a negative lens 11C, a positive lens 12C, and a positive lens 13C.

Throughout Numerical Examples 1 to 6, the second lens group G2 includes, sequentially from the object side, a negative lens 21, a negative lens 22, and a positive lens 23.

In Numerical Example 7, the second lens group G2 includes, sequentially from the object side, a negative lens 21A, a negative lens 22A, and a positive lens 23A.

In Numerical Example 8, the second lens group G2 includes, sequentially from the object side, a negative lens 21B, a negative lens 22B, and a positive lens 23B.

In Numerical Example 9, the second lens group G2 includes, sequentially from the object side, a negative lens 21C, a negative lens 22C, and a positive lens 23C.

Throughout Numerical Examples 1 to 6, the third lens group G3 includes, sequentially from the object side, a negative lens 31 and a positive lens 32.

In Numerical Example 7, the third lens group G3 includes, sequentially from the object side, a negative lens 31A and a positive lens 32A.

In Numerical Example 8, the third lens group G3 includes, sequentially from the object side, a negative lens 31B and a positive lens 32B.

In Numerical Example 9, the third lens group G3 includes, sequentially from the object side, a negative lens 31C and a positive lens 32C.

In Numerical Examples 1 to 3, the fourth lens group G4 includes, sequentially from the object side, an aperture stop SP, a positive lens 41, a positive lens 42, and a negative lens 43.

In Numerical Examples 4 to 6, the fourth lens group G4 includes, sequentially from the object side, a positive lens 41', an aperture stop SP, a positive lens 42', and a negative lens 43'.

In Numerical Example 7, the fourth lens group G4 includes, sequentially from the object side, a positive lens 41A, an aperture stop SP, a positive lens 42A, and a negative lens 43A.

In Numerical Example 8, the fourth lens group G4 includes, sequentially from the object side, a negative lens 41B and a positive lens 42B.

In Numerical Example 9, the fourth lens group G4 includes, sequentially from the object side, an aperture stop SP, a positive lens 41C, a positive lens 42C, and a negative lens 43C.

In Numerical Examples 1 to 3, the fifth lens group G5 includes, sequentially from the object side, a negative lens 51 and a positive lens 52.

In Numerical Examples 4 to 6, the fifth lens group G5 includes, sequentially from the object side, a negative lens 51', a negative lens 52', and a positive lens 53'.

In Numerical Example 7, the fifth lens group G5 includes, sequentially from the object side, a negative lens 51A, a negative lens 52A, and a positive lens 53A.

In Numerical Example 8, the fifth lens group G5 includes, sequentially from the object side, an aperture stop SP, a positive lens 51B, a positive lens 52B, and a negative lens 53B.

In Numerical Example 9, the fifth lens group G5 includes, sequentially from the object side, a positive lens 51C, a negative lens 52C, a positive lens 53C, and a positive lens 54C.

In Numerical Examples 1 to 5, the sixth lens group G6 includes, sequentially from the object side, a negative lens 61, a positive lens 62, and a positive lens 63.

In Numerical Example 6, the sixth lens group G6 includes, sequentially from the object side, a negative lens 61', a positive lens 62', a positive lens 63', and a negative lens 64'.

In Numerical Example 7, the sixth lens group G6 includes, sequentially from the object side, a negative lens 61A and a positive lens 62A.

In Numerical Example 8, the sixth lens group G6 includes, sequentially from the object side, a positive lens 61B, a positive lens 62B, a negative lens 63B, and a positive lens 64B.

In Numerical Example 9, the sixth lens group G6 includes, sequentially from the object side, a negative lens 61C, a positive lens 62C, and a positive lens 63C.

In Numerical Example 7, the seventh lens group G7 includes, sequentially from the object side, a negative lens 71A and a positive lens 72A.

The zoom lens system according to the embodiment employs a small focus group configuration that is compact, that has high performance, that ensures brightness with an F-number of 3 or less in a whole focal-length range, that supports a zoom range of from about 24 to about 70 mm or a zoom range of from about 28 to about 150 mm on a 35-mm film basis, and that is suitable for decreases in size and sound of an autofocus section.

In general, when wide-angle characteristics are more enhanced, coma aberration, astigmatism, lateral chromatic aberration, field curvature, and distortion likely increase. In contrast, when telephoto characteristics are more enhanced, the influences of spherical aberration and axial chromatic aberration likely increase. Furthermore, when the diameter is increased, coma aberration and spherical aberration increase. To correct the aberrations, the whole optical system and the focus section tend to increase in length.

The zoom lens system according to the embodiment has a configuration to address a disadvantage in terms of correction of the above-described aberrations and in particular a disadvantage in terms of an increase in length of the focus lens group.

In a positive-lead zoom lens system, in many cases, a second lens group having the strongest negative power performs focusing. However, when the second lens group performs focusing, the magnification likely changes due to the focusing. In addition, it is difficult to decrease the weight and to increase the focusing speed.

In contrast, with the zoom lens system according to the embodiment, the above-described negative lens group having the strongest power is divided into the second lens group G2 and the third lens group G3, and the third lens group G3 is used as a focus lens group that moves during focusing. Thus, the size and weight of the focus lens group are decreased, and hence the speed of autofocus is increased and the sound of autofocus is decreased. Specifically, the third lens group G3 serving as the focus lens group moves (extends) to the object side during focusing from an object at infinity to an object at close range.

In addition, the extension space required for focusing by the second lens group of related art is no longer required. The distance between the first lens group G1 and the second lens group G2 can be set to a small value at the short focal-length end, thereby contributing to an increase in performance of correcting distortion and field curvature. Moreover, since the respective lens groups including the third lens group G3 contribute to zooming, the degree of freedom for design is increased to provide high performance.

Since the rear lens group GR having as a whole a positive refractive power includes the negative lens group (N-th lens group) of which the distance from each of the adjacent lens groups changes during zooming, the rear lens group GR serves as a compensator during zooming to ensure the back-focus amount at the short focal-length end and to improve performance of correcting aberrations.

If a zooming balance among the respective lens groups is collapsed, the whole system may be increased in length and a sensitivity to eccentricity may be increased. Thus, it is desirable to set the contribution to zooming of the respective lens groups within proper ranges. In addition, for control of the height of rays to make the whole lens system compact, it is desirable to set the paths of the respective lens groups during zooming within proper ranges. The second lens group G2 having a negative refractive power has a relatively large zooming effect, and significantly affects the behavior of the height of rays in the lens system. Thus, it is desirable to properly set the paths during zooming.

The zoom lens system according to the embodiment desirably satisfies Conditional Expression (1) as follows:

$$-20 < Twt/Twm < 1, \qquad (1)$$

where

Twt is a moving amount of the second lens group during zooming from the short focal-length end to the long focal-length end, a moving amount to the object side being indicated by a positive sign, a moving amount to the image side being indicated by a negative sign, and Twm is a moving amount of the second lens group during zooming from the short focal-length end to an intermediate focal length, a moving amount to the object side being indicated by a positive sign, a moving amount to the image side being indicated by a negative sign, the intermediate focal length being expressed by $fm=(fw \cdot ft)^{1/2}$, where fw is a focal length of a whole system at the short focal-length end, and ft is a focal length of the whole system at the long focal-length end.

In the conditional-expression range that is satisfied by Conditional Expression (1), Conditional Expression (1') is desirably satisfied as follows:

$$-15 < Twt/Twm < 0.3. \qquad (1')$$

Conditional Expressions (1) and (1') each indicate "a proper path range of the second lens group G2 during zooming from the short focal-length end via the intermediate focal length to the long focal-length end".

Conditional Expression (1) is satisfied to decrease the size of the first lens group G1 and the size of the whole lens system. The advantageous effect is further markedly exhibited when Conditional Expression (1') is satisfied.

If the value is above the upper limit of Conditional Expression (1), the distance between the first lens group G1 and the second lens group G2 at the intermediate focal length excessively increases, the height of rays passing through the first lens group G1 increases, and hence the first lens group G1 increases in size.

If the value is below the lower limit of Conditional Expression (1), the lens total length at the long focal-length end excessively increases, and the first lens group G1 increases in size.

The intermediate focal length fm indicates being set as an intermediate point of imaging angles of view at the short focal-length end and the long focal-length end. Controlling the zoom path with respect to the intermediate focal length that is the intermediate point of imaging magnification enables well-balanced control on reduction in total lengths at the short focal-length end and the long focal-length end and reduction in the radial direction at a position close to the intermediate focal length together with correction on aberrations in the entire zoom range.

The zoom lens system according to the embodiment desirably satisfies Conditional Expression (2) as follows:

$$2.0 < frw/Ya < 3.5, \quad (2)$$

where frw is a focal length of the rear lens group at the short focal-length end in focus at infinity, and Ya is the maximum image height.

In the conditional-expression range that is satisfied by Conditional Expression (2), Conditional Expression (2') is desirably satisfied as follows:

$$2.4 < frw/Ya < 3.1. \quad (2')$$

In Conditional Expressions (2) and (2'), the maximum image height indicates a half diagonal length of the size of an effective image surface. For example, regarding a digital camera, the half diagonal length of an effective pixel range of an imaging element is the maximum image height.

The positive-lead zoom lens system according to the embodiment has power arrangement in which the object side is negative and the image side is positive. When the power of the positive rear group (the rear lens group GR) is increased, the increase in power is advantageous for a decrease in size of the whole system; however, is disadvantageous for ensuring the back-focus amount. In addition, it is difficult to ensure the back-focus amount at the short focal-length end. When the power of the positive rear group (the rear lens group GR) is properly set, the whole system can have proper performance while an increase in size is prevented. Moreover, the back-focus amount required for the camera system can be ensured.

Conditional Expressions (2) and (2') each indicate "a proper range of the focal length of the positive rear group (the rear lens group GR) at the short focal-length end".

Conditional Expression (2) is satisfied to decrease the size of the whole lens system, to properly correct various aberrations, and to properly set a sensitivity to a manufacturing error. The advantageous effect is further markedly exhibited when Conditional Expression (2') is satisfied.

If the value is above the upper limit of Conditional Expression (2), the power of the positive rear group (the rear lens group GR) decreases and the back-focus amount is likely ensured; however, the whole system may be increased in length.

If the value is below the lower limit of Conditional Expression (2), it is more difficult to ensure the back-focus amount and to control spherical aberration. Thus, correction on spherical aberration may become difficult, and aberrations may be excessively exchanged among lens groups, thereby deteriorating the sensitivity to a manufacturing error.

The zoom lens system according to the embodiment desirably satisfies Conditional Expressions (3) and (4) as follows:

$$2.0 < |f3/ffw| < 5.0, \text{ and} \quad (3)$$

$$1.0 < |f3/fft| < 4.0, \quad (4)$$

where f3 is a focal length of the third lens group, ffw is a composite focal length of the first lens group, the second lens group, and the third lens group at the short focal-length end in focus at infinity, and fft is a composite focal length of the first lens group, the second lens group, and the third lens group at the long focal-length end in focus at infinity.

In the conditional-expression ranges that are satisfied by Conditional Expressions (3) and (4), Conditional Expressions (3') and (4') are desirably satisfied as follows:

$$2.4 < |f3/ffw| < 4.5, \text{ and} \quad (3')$$

$$1.0 < |f3/fft| < 3.5. \quad (4')$$

The third lens group G3 contributes to focusing and zooming, and hence it is desirable to set the third lens group G3 within the proper focal length range to prevent an increase in aberration because the balance of aberrations is collapsed and to prevent an increase in size of the lens system.

Conditional Expressions (3), (3'), (4), and (4') each indicate "a proper range of the focal length of the third lens group in lens groups disposed closer than the aperture stop to the object side" at each zoom point.

Conditional Expressions (3) and (4) are satisfied to decrease the size of the whole lens system, to properly correct various aberrations, and to facilitate precise fabrication and assembly. The advantageous effect is further markedly exhibited when Conditional Expressions (3') and (4') are satisfied.

If the values are above the upper limits of Conditional Expressions (3) and (4), the sensitivity to a manufacturing error decreases; however, a load of zooming on the other lens groups increases. Thus, "a displacement amount due to zooming" of each lens group increases. To ensure the displacement amount, the configuration is disadvantageous for a decrease in size, and also disadvantageous for correction on aberrations.

If the values are below the lower limits of Conditional Expressions (3) and (4), the contribution of the third lens group G3 to zooming relatively increases, and the load of zooming on the other lens groups decreases. Thus, the configuration is advantageous for a decrease in size and correction on aberrations of the whole zoom lens system, whereas the sensitivity to a manufacturing error increases. Precise fabrication and assembly may become difficult, which is not desirable in practical use.

The zoom lens system according to the embodiment desirably satisfies Conditional Expression (5) as follows:

$$0.1 < f2/f3 < 0.7, \quad (5)$$

where f2 is a focal length of the second lens group, and f3 is a focal length of the third lens group.

In the conditional-expression range that is satisfied by Conditional Expression (5), Conditional Expression (5') is desirably satisfied as follows:

$$0.2 < f2/f3 < 0.6. \quad (5')$$

As described above, the third lens group G3 in the zoom lens system according to the embodiment is made by dividing the second lens group of the typical positive-lead zoom lens system. Since the negative power is divided and allocated to the focus group, a change in image magnification during focusing can be prevented.

Conditional Expressions (5) and (5') each indicate "a proper range of the focal length of the third lens group G3 with respect to the focal length of the second lens group G2".

Conditional Expression (5) is satisfied to prevent an excessive change in image magnification, and to decrease the moving amount during focusing, thereby preventing an increase in length of the whole lens system. The advantageous effect is further markedly exhibited when Conditional Expression (5') is satisfied.

If the value is above the upper limit of Conditional Expression (5), the power of the third lens group G3 excessively increases, and a change in image magnification excessively increases.

If the value is below the lower limit of Conditional Expression (5), the power of the third lens group G3 excessively decreases, the moving amount during focusing increases, and the whole lens system increases in length.

In the zoom lens system according to the embodiment, the third lens group G3 includes two lenses of the negative lens 31 and the positive lens 32. If exchange of aberrations between the third lens group G3 serving as the focus lens group and the other lens groups is excessive, a variation in aberration during focusing increases, and hence a variation likely occurs in imaging performance in accordance with a shooting distance. Since the third lens group G3 serving as the focus lens group includes the two lenses of the negative lens 31 and the positive lens 32 minimally required to correct chromatic aberration, an increase in size of the focus lens group is prevented, performance of correcting chromatic aberration in the third lens group G3 is enhanced, and hence a variation in imaging performance during focusing can be prevented. Furthermore, the negative lens 31 and the positive lens 32 of the third lens group G3 constitute a cemented lens to balance the performance of correcting aberrations in the third lens group G3 and the sensitivity to a manufacturing error, to decrease the number of mechanical components, and hence to contribute to a decrease in weight of the focus lens group. In addition, the negative lens 31 and the positive lens 32 are disposed sequentially from the object side and the position of the principal point of the third lens group G3 is disposed close to the second lens group G2. Thus, the closest shooting distance can be decreased.

The zoom lens system according to the embodiment desirably satisfies Conditional Expression (6) as follows:

$$0.1 < R3gf/R2gr < 5.0, \quad (6)$$

where

R3gf is a curvature radius of a surface disposed closest to the object side of the third lens group, and R2gr is a curvature radius of a surface disposed closest to the image side of the second lens group.

Since the third lens group G3 is the focus lens group, the surface distance between the third lens group G3 and the second lens group G2 changes in accordance with the shooting distance. In this case, the second lens group G2 and the third lens group G3 are made by dividing the negative lens group which is originally one lens group. It is desirable to properly decrease a variation in aberration due to a change in surface distance. In particular, thick rays pass at the short focal-length end. It is desirable to properly set exchange of spherical aberrations between the second lens group G2 and the third lens group G3.

Conditional Expression (6) indicates "a proper range of a curvature radius of a final surface of the second lens group and a curvature radius of a foremost surface of the third lens group".

Conditional Expression (6) is satisfied to prevent a variation in imaging performance due to focusing and hence to provide proper focusing.

If the value is above the upper limit or below the lower limit of Conditional Expression (6), exchange of spherical aberrations between the second lens group G2 and the third lens group G3 may become excessive, and a variation in imaging performance due to focusing may increase.

The above described Conditional Expressions (1) to (6) are satisfied to make a high-performance zoom lens system that prevents an increase in size particularly in the radial direction, to have a large diameter to allow zooming from a wide-angle range to a standard range, and to have a compact and lightweight focus lens group. In viewpoints of ensuring the back-focus amount by a certain degree, effectively attaining prevention of an increase in size of the whole system, and increasing performance, Conditional Expression (7) is desirably satisfied as follows:

$$1.5 < Bfw/Ya < 4.0, \quad (7)$$

where

Bfw is a distance in terms of air conversion from a surface disposed closest to the image side of the rear lens group at the short focal-length end in focus at infinity to the image surface, and Ya is the maximum image height.

In the viewpoint similar to the above, Conditional Expression (8) is desirably satisfied as follows:

$$1.5 < Bfw/fw < 4.0, \quad (8)$$

where

Bfw is a distance in terms of air conversion from the surface disposed closest to the image side of the rear lens group at the short focal-length end in focus at infinity to the image surface, and fw is a focal length of the whole system at the short focal-length end in focus at infinity.

In the conditional-expression ranges that are satisfied by Conditional Expressions (7) and (8), Conditional Expressions (7') and (8') are desirably satisfied as follows:

$$2.0 < Bfw/Ya < 3.0, \text{ and} \quad (7')$$

$$1.5 < Bfw/fw < 3.0. \quad (8')$$

Conditional Expressions (7) and (8) are satisfied to ensure the back-focus amount by a certain degree, effectively attaining prevention of an increase in size of the whole system, and increasing performance of the whole system. The advantageous effect is further markedly exhibited when Conditional Expressions (7') and (8') are satisfied.

If the values are above the upper limits of Conditional Expressions (7) and (8), back focus excessively increases, and the whole lens system may increase in size (the lens total length may increase).

If the values are below the lower limits of Conditional Expressions (7) and (8), it is difficult to ensure the requested back-focus amount, which leads to a deterioration in optical performance.

The zoom lens system according to the embodiment desirably satisfies Conditional Expression (9) as follows:

$$2.5 < f1/fw < 6.0, \quad (9)$$

where f1 is a focal length of the first lens group, and fw is a focal length of the whole system at the short focal-length end in focus at infinity.

In the conditional-expression range that is satisfied by Conditional Expression (9), Conditional Expression (9') is desirably satisfied as follows:

$$2.5 < f1/fw < 4.5. \quad (9')$$

Conditional Expressions (9) and (9') each indicate "a proper range of the focal length of the first lens group with respect to the focal length of the whole system at the short focal-length end". Conditional Expression (9) is satisfied to decrease the size of the first lens group and the size of the whole lens system, and to prevent the focal length at the short focal-length end from excessively increasing, thereby properly controlling coma aberration and spherical aberration. The advantageous effect is further markedly exhibited when Conditional Expression (9') is satisfied.

If the value is above the upper limit of Conditional Expression (9), the focal length of the first lens group excessively increases, the height of rays passing through the first lens group increases, and hence the first lens group may increase in size in the radial direction.

If the value is below the lower limit of Conditional Expression (9), control on coma aberration and spherical aberration at the long focal-length end may become difficult and the aberrations may be increased, or the focal length at the short focal-length end may be increased.

One of the second lens group and the third lens group desirably includes at least one positive lens and satisfies Conditional Expression (10) as follows:

$$25 < vp\,MAX < 45, \quad (10)$$

where
vpMAX is an Abbe number for a d-line of a positive lens having a largest Abbe number and included in the at least one positive lens included in the one of the second lens group and the third lens group.

In the conditional-expression range that is satisfied by Conditional Expression (10), Conditional Expression (10') is desirably satisfied as follows:

$$30 < vp\,MAX < 45. \quad (10')$$

Conditional Expressions (10) and (10') each indicate "a proper range of the maximum Abbe number of a positive lens included in one of the second lens group and the third lens group". Conditional Expression (10) is satisfied to properly correct chromatic aberration. The advantageous effect is further markedly exhibited when Conditional Expression (10') is satisfied.

If the value is above the upper limit of Conditional Expression (10), the difference between Abbe numbers of a positive lens and a negative lens in one of the second lens group and the third lens group excessively decreases and chromatic aberration may be likely under-corrected.

If the value is below the lower limit of Conditional Expression (10), the difference between Abbe numbers of a positive lens and a negative lens in one of the second lens group and the third lens group excessively increases and chromatic aberration may be likely over-corrected.

During zooming from the short focal-length end to the long focal-length end, the first lens group moves from the image side toward the object side, and Conditional Expression (11) is desirably satisfied as follows:

$$1.5 < f1/Twt1 < 7.0, \quad (11)$$

where
f1 is a focal length of the first lens group, and
Twt1 is a moving amount of the first lens group during zooming from the short focal-length end to the long focal-length end, a moving amount to the object side being indicated by a positive sign, a moving amount to the image side being indicated by a negative sign.

In the conditional-expression range that is satisfied by Conditional Expression (11), Conditional Expression (11') is desirably satisfied as follows:

$$2.0 < f1/Twt1 < 5.0. \quad (11')$$

Conditional Expressions (11) and (11') each indicate "a proper range of the moving amount of the first lens group during zooming with respect to the focal length of the first lens group". Conditional Expression (11) is satisfied to optimize the moving distance of the first lens group and to reduce the height of rays in the first lens group, attaining a decrease in size in the radial direction. The advantageous effect is further markedly exhibited when Conditional Expression (11') is satisfied.

If the value is above the upper limit of Conditional Expression (11), the moving amount of the first lens group excessively decreases, and hence the first lens group may increase in size in the radial direction.

If the value is below the lower limit of Conditional Expression (11), the moving amount of the first lens group excessively increases, and hence the first lens group may increase in size in the optical-axis direction.

The zoom lens system according to the embodiment desirably satisfies Conditional Expression (12) as follows:

$$-20.0 < f1/f23w < -3.0, \quad (12)$$

where
f1 is a focal length of the first lens group, and
f23w is a composite focal length of the second lens group and the third lens group at the short focal-length end in focus at infinity.

In the conditional-expression range that is satisfied by Conditional Expression (12), Conditional Expression (12') is desirably satisfied as follows:

$$-10.0 < f1/f23w < -5.0. \quad (12')$$

Conditional Expressions (12) and (12') each indicate "a proper range of the focal length of the first lens group with respect to the composite focal length of the second lens group and the third lens group at the short focal-length end in focus at infinity". Conditional Expression (12) is satisfied to likely balance the correction on aberrations in the entire zoom range, thereby attaining an increase in performance. The advantageous effect is further markedly exhibited when Conditional Expression (12') is satisfied.

If the value is above the upper limit of Conditional Expression (12), the composite refractive power of the second lens group and the third lens group excessively increases, and aberrations, such as coma aberration, astigmatism, field curvature, and distortion, may be insufficiently corrected in the entire zoom range.

If the value is below the lower limit of Conditional Expression (12), the refractive power of the first lens group excessively increases, and spherical aberration or coma aberration at the long focal-length end may be insufficiently corrected.

The zoom lens system according to the embodiment desirably satisfies Conditional Expression (13) as follows:

$$0.20 < D(2R-3F)T/D(2F-3R)T < 0.60, \quad (13)$$

where
D(2R–3F)T is a distance in an optical-axis direction from a final surface of the second lens group to a foremost surface of the third lens group at the long focal-length end in focus at infinity, and
D(2F–3R)T is a total thickness in the optical-axis direction from a foremost surface of the second lens group to a surface disposed closest to the image surface of the third lens group at the long focal-length end in focus at infinity.

Conditional Expression (13) indicates "a proper range of the distance between the second lens group and the third lens group with respect to the total thickness of the second lens group and the third lens group at the long focal-length end in focus at infinity".

Conditional Expression (13) is satisfied to properly set the sensitivity of the focus group and to increase performance during focusing without an increase in size of the optical system.

If the value is above the upper limit of Conditional Expression (13), the distance between the second lens group and the third lens group excessively increases, the moving amount of the third lens group serving as the focus group increases, and hence the total length may increase.

If the value is below the lower limit of Conditional Expression (13), the focus sensitivity of the third lens group serving as the focus group excessively increases, the accuracy of autofocus decreases, the balance of correction on aberrations with respect to the groups in front and rear of the focus group likely collapses, and hence a decrease in imaging performance due to focusing may become worse.

The zoom lens system according to the embodiment desirably satisfies Conditional Expression (14) as follows:

$$1.00<(1-Mt^2)\times MRt^2<8.00, \quad (14)$$

where
Mt is a lateral magnification of the third lens group at the long focal-length end in focus at infinity, and
MRt is a lateral magnification of the rear lens group at the long focal-length end in focus at infinity.

In the conditional-expression range that is satisfied by Conditional Expression (14), Conditional Expression (14') is desirably satisfied as follows:

$$1.00<(1-Mt^2)\times MRt^2<4.00. \quad (14')$$

Conditional Expressions (14) and (14') each indicate "a proper range of the focus sensitivity of the third lens group serving as the focus group at the long focal-length end". Conditional Expression (14) is satisfied to properly set the sensitivity of the focus group and to increase performance during focusing without an increase in size of the optical system. The advantageous effect is further markedly exhibited when Conditional Expression (14') is satisfied.

If the value is above the upper limit of Conditional Expression (14), the focus sensitivity of the third lens group serving as the focus group excessively increases, the accuracy of autofocus decreases, the balance of correction on aberrations with respect to the groups in front and rear of the focus group likely collapses, and hence a decrease in imaging performance due to focusing may become worse.

If the value is below the lower limit of Conditional Expression (14), the focus sensitivity of the third lens group serving as the focus group excessively decreases, the distance between the second lens group and the third lens group is required to be increased, and hence the total length may increase.

The rear group having a positive power as a whole is one of further desirable embodiments that includes a positive fourth lens group including an aperture stop SP, a negative fifth lens group, and a positive sixth lens group. The fourth lens group G4 and the sixth lens group G6 having positive powers in the rear lens group GR exchange aberrations considerably and hence have a high sensitivity to a manufacturing error. With regard to this, the fourth lens group G4 and the sixth lens group G6 desirably move together during zooming. Thus, the sensitivity to a manufacturing error can be decreased while the performance of correcting aberrations is kept high.

The zoom lens system, which includes, as the above-described rear group having a positive power as a whole, the positive fourth lens group including the aperture stop, the negative fifth lens group, and the positive sixth lens group satisfies Conditional Expression (15) as follows to set a proper focal-length range of the sixth lens group G6 with respect to the fourth lens group G4 and to balance the correction on aberrations and the sensitivity to a manufacturing error:

$$0.3<f4/f6<0.9, \quad (15)$$

where
f4 is a focal length of the fourth lens group, and
f6 is a focal length of the sixth lens group.

In the conditional-expression range that is satisfied by Conditional Expression (15), Conditional Expression (15') is desirably satisfied as follows:

$$0.45<f4/f6<0.75. \quad (15')$$

Conditional Expression (15) is satisfied to balance the correction on aberrations and the sensitivity to a manufacturing error.

If the value is above the upper limit of Conditional Expression (15), the refractive power of the fourth lens group G4 excessively decreases, the performance of correcting aberrations decreases, and the load of correcting aberrations on the sixth lens group G6 increases, thereby collapsing the balance between the correction on aberrations and the sensitivity to a manufacturing error. In addition, the height of off-axis rays at the fourth lens group G4 and subsequent lens groups increases, and hence the whole lens system may increase in length.

If the value is below the lower limit of Conditional Expression (15), the refractive power of the sixth lens group G6 excessively decreases, the control on the position of the exit pupil becomes more difficult particularly at the wide-angle end (the short focal-length end), and the performance of correcting aberrations may decrease to ensure a proper back-focus amount.

Moreover, as the rear group having a positive power as a whole, one of further desirable embodiments includes a negative fourth lens group, a positive fifth lens group, and a positive sixth lens group. The fourth lens group G4 having a negative power in the rear lens group GR serves as a floating focus that is moved by an amount that varies in accordance with the focal length in combination with the third lens group G3. Thus, a variation in aberration due to focusing is controlled with higher performance, and a deterioration in imaging performance due to focusing can be prevented. In this case, the ratio of movement of the third lens group G3 and the fourth lens group G4 can be desirably set. Table 1A presents an example of the ratio of movement of the third lens group G3 and the fourth lens group G4. The second lens group and the fourth lens group disposed in front and rear of the third lens group serving as the focus group exchange aberrations considerably and hence have a high sensitivity to a manufacturing error. With regard to this, the fourth lens group G4 and the sixth lens group G6 desirably move together during zooming. Thus, the sensitivity to a manufacturing error can be decreased while the performance of correcting aberrations is kept high.

TABLE 1A

|  | Third group:Fourth group |
|---|---|
| f = 15.45 | 1:2 |
| f = 29.57 | 1:0.5 |
| f = 43.65 | 1:0.1 |

An N-th lens group (for example, the fifth lens group G5 according to any one of Numerical Examples 1 to 6) having a negative power in the rear lens group GR moves relative to the image surface during zooming, thereby increasing the performance of correcting aberrations of the whole system while contributing to zooming. Conditional Expression (16) is satisfied as follows to properly set the focal length of the N-th lens group and to obtain proper optical performance:

$$0.5<|fN/frm|<2.5, \quad (16)$$

where
fN is a focal length of the N-th lens group, and
frm is a focal length of the rear lens group at the intermediate focal length in focus at infinity, the intermediate focal length being expressed by fm=(fw·ft)$^{1/2}$, where fw is a focal length of the whole system at the short focal-length end, and ft is a focal length of the whole system at the long focal-length end.

In the conditional-expression range that is satisfied by Conditional Expression (16), Conditional Expression (16') is desirably satisfied as follows:

$$0.7<|fN/frm|<2.0. \quad (16')$$

Conditional Expression (16) is satisfied to properly set the focal length of the N-th lens group and to obtain proper optical performance.

If the value is above the upper limit of Conditional Expression (16), the refractive power of the N-th lens group excessively decreases, a large moving amount is required during zooming to ensure proper imaging performance, and the whole optical system may increase in length.

If the value is below the lower limit of Conditional Expression (16), the refractive power of the N-th lens group excessively increases, aberrations may be excessively exchanged between the N-th lens group and the lens groups disposed in front and rear of the N-th lens group, and the sensitivity to a manufacturing error may excessively increase.

As described above, the third lens group G3 serving as the focus lens group includes the two lenses of the negative lens 31 and the positive lens 32. Thus, the performance of correcting chromatic aberration by the third lens group G3 increases. Conditional Expressions (17), (18), and (19) determine parameters to be satisfied by the negative lens 31 and the positive lens 32 of the third lens group G3 as follows:

$$1.4<v3n/v3p<3.0, \quad (17)$$

$$N3p>1.85000, \text{ and} \quad (18)$$

$$N3a>1.70000, \quad (19)$$

where
v3n is an Abbe number for the d-line of the negative lens included in the third lens group,
v3p is an Abbe number for the d-line of the positive lens included in the third lens group,
N3p is a refractive index for the d-line of the positive lens included in the third lens group, and
N3a is an average value of refractive indices for the d-line of the negative lens and the positive lens included in the third lens group.

In this case, an Abbe number for the d-line is calculated by an expression as follows:

$$vd=(Nd-1)/(NF-NC),$$

where
Nd is a refractive index for the d-line,
NF is a refractive index for the F-line, and
NC is a refractive index for the C-line.

Conditional Expressions (17), (18), and (19) are satisfied to increase the performance of correcting chromatic aberration in the third lens group G3 and to prevent a variation in imaging performance due to focusing.

If the value is above the upper limit or below the lower limit of Conditional Expression (17), it is difficult to properly correct chromatic aberration, exchange of chromatic aberration with the other lens groups may increase, and a variation in imaging performance during focusing may become worse.

If the values are below the lower limits of Conditional Expressions (18) and (19), the third lens group G3 increases in size to ensure a proper power of the third lens group G3, the shortest shooting distance may increase, and the whole lens system may increase in length.

The positive first lens group desirably includes, sequentially from the object side, one negative lens and one positive lens. More specifically, the positive first lens group desirably includes, sequentially from the object side, two lenses including a negative meniscus lens having a convex surface facing the object side and a positive lens having a strong convex surface facing the object side; or desirably includes one positive lens or a plurality of lenses in rear of the former two lenses. With this configuration, the amount of aberration generated in the first lens group can be sufficiently decreased, and correction performance for mainly lateral chromatic aberration can be increased while an increase in the total length is avoided. In any one of the numerical examples, a certain lens group or a certain lens subgroup is moved in a direction substantially perpendicular to the optical axis to move an image, thereby constituting a so-called motion blur correction optical system. For example, the fifth lens group in any one of Numerical Examples 1 to 7, the fourth lens group in Numerical Example 8, the sixth lens group in Numerical Example 9, or a part of each lens group serves as a vibration-isolating lens group. Thus, motion blur correction can be performed with a relatively small lens, and an increase in size of the lens can be restricted.

Specific Numerical Examples 1 to 9 are described. In each aberration curve diagram, a solid line indicates meridional sectional aberration for the d-line, a broken line indicates sagittal sectional aberration for the d-line, a one-dot chain line indicates meridional sectional aberration for the g-line, and a two-dot chain line indicates sagittal sectional aberration for the g-line. In each aberration curve diagram and each table, f is a focal length of the whole system, F is an F-number, w is a half angle of view, y is an image height, Ya is the maximum image height, R is a curvature radius, D is a lens thickness or a lens distance, Nd is a refractive index for the d-line, vd is an Abbe number for the d-line, BF is a back focus, K is a conic constant of an aspherical surface, A4 is a fourth-order aspherical coefficient, A6 is a sixth-order aspherical coefficient, A8 is an eighth-order aspherical coefficient, and A10 is a tenth-order aspherical coefficient. The focal length of the whole system, F-numbers, and half angles of view are indicated sequentially from the short focal-length end, the intermediate focal length, and the long focal-length end. The unit of length is millimeter (mm). In this case, an aspherical surface is expressed by the following known expression using the reciprocal of a paraxial curvature radius (paraxial curvature) C, and a height H from the optical axis.

$$x=CH^2/[1+[1-(1+K)C^2H^2]^{1/2}]+A_4H^4A_6H^6A_8H^8+A_{10}H^{10}$$

Numerical Example 1

Figure 1B:
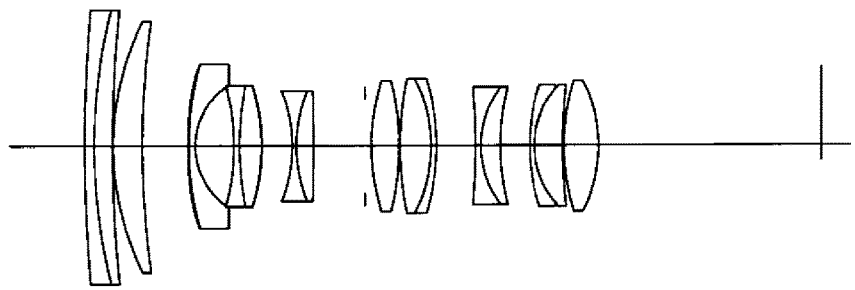
Figure 1C:
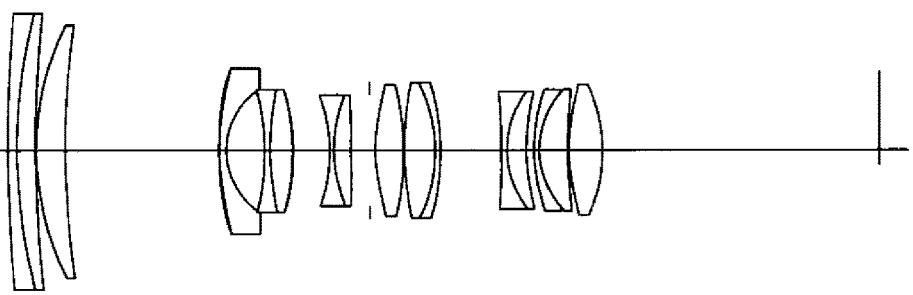
Figure 7A:
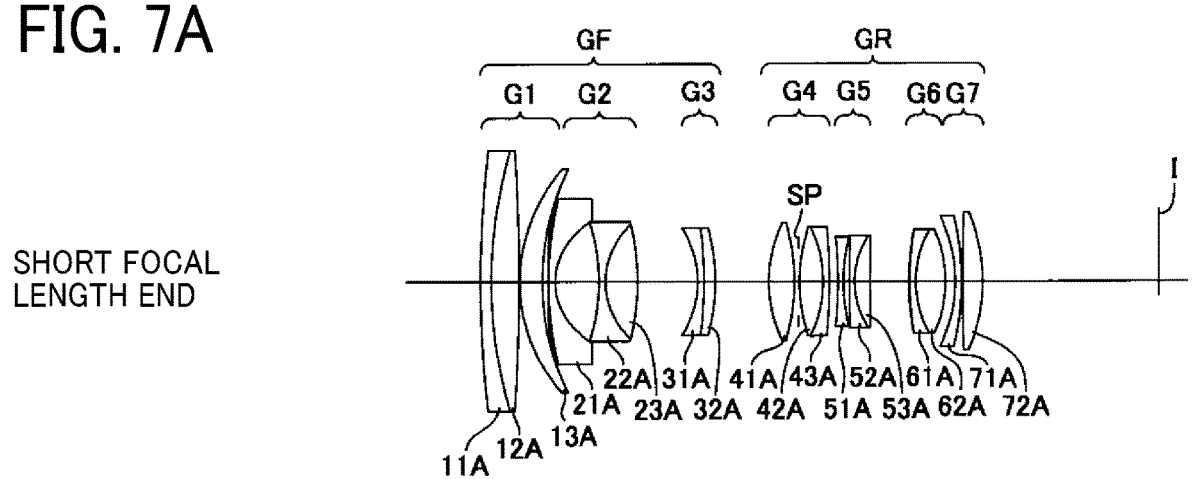
FIGS. 7A, 7B, and 7C each is a lens configuration diagram of a zoom lens system according to Numerical Example 7.
Figure 7B:
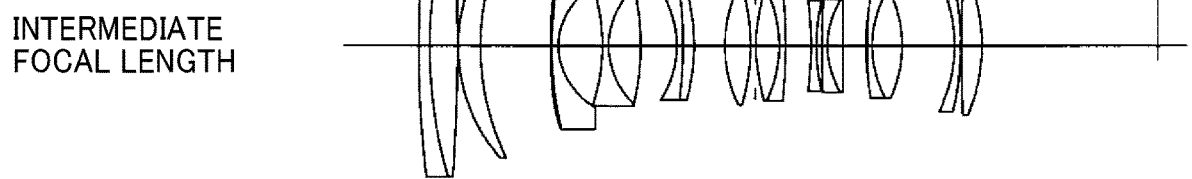
Figure 7C:
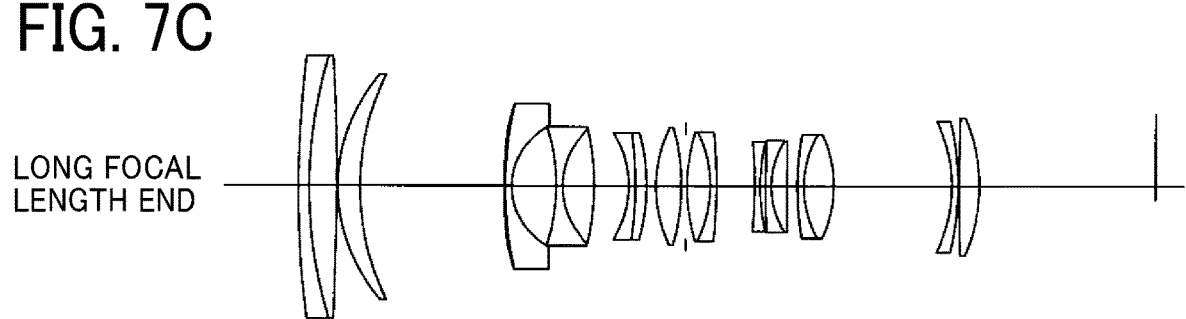
Figure 8A:
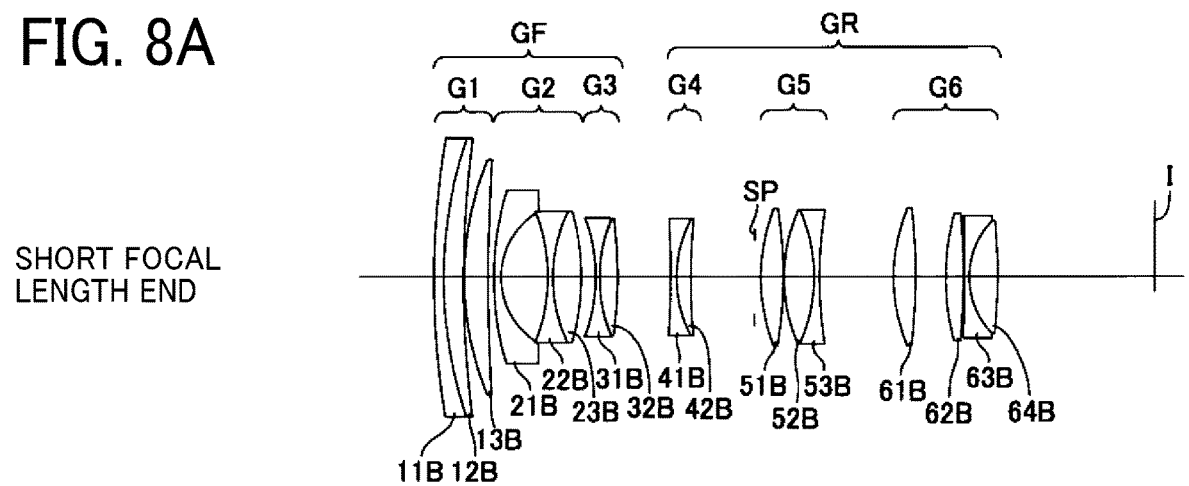
FIGS. 8A, 8B, and 8C each is a lens configuration diagram of a zoom lens system according to Numerical Example 8.
Figure 8B:
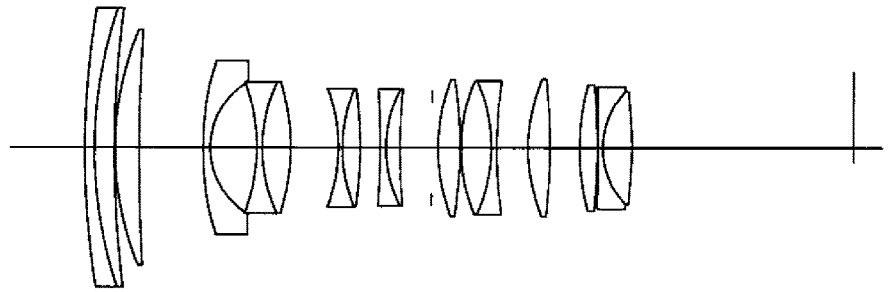
Figure 8C:
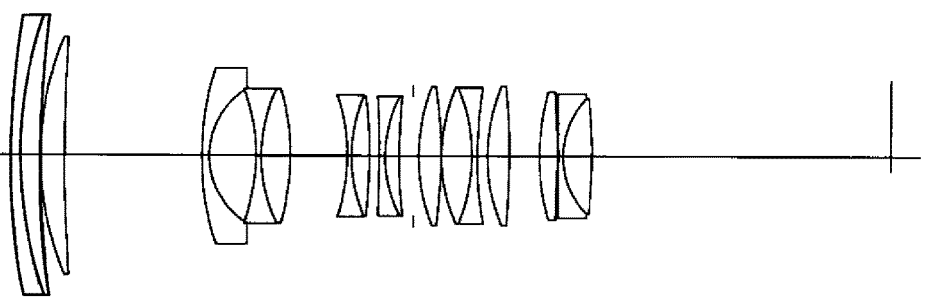
Figure 9A:
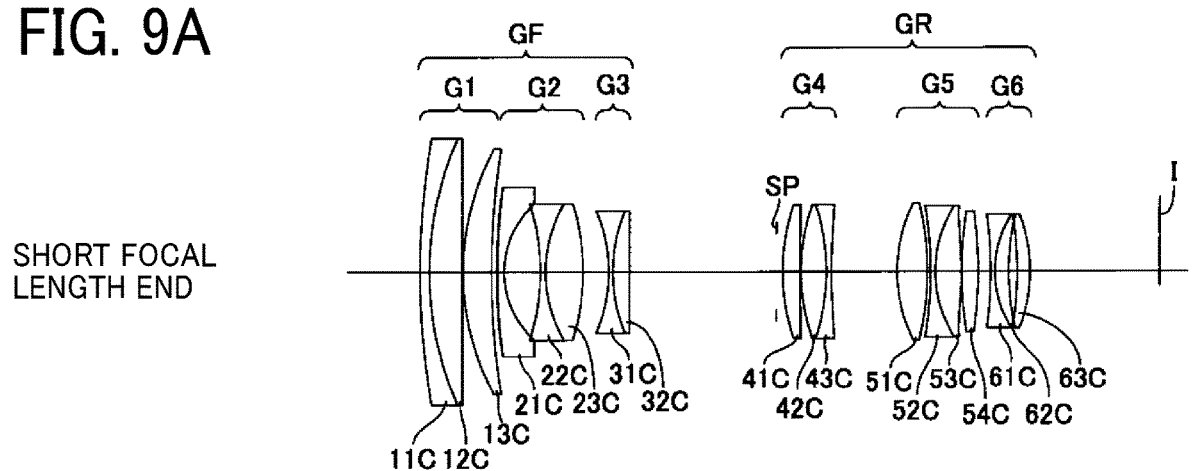
FIGS. 9A, 9B, and 9C each is a lens configuration diagram of a zoom lens system according to Numerical Example 9.
Figure 9B:
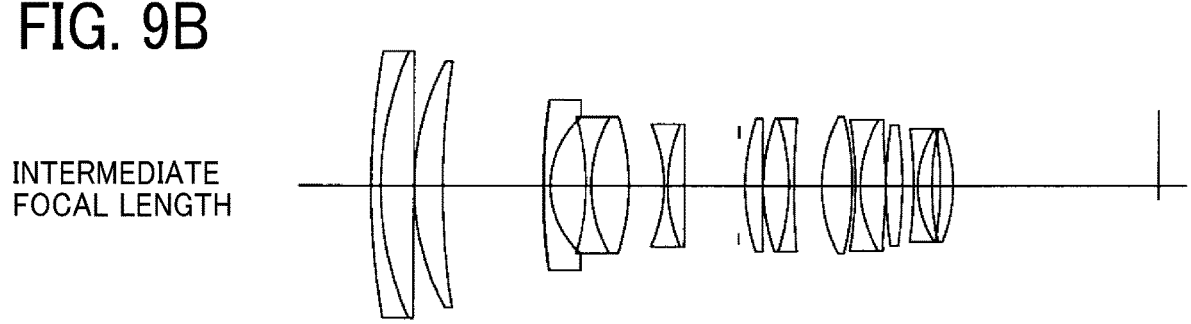
Figure 9C:
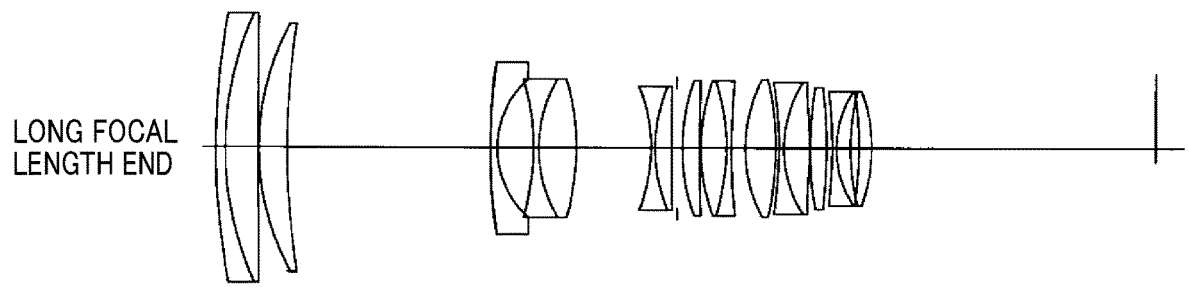

FIGS. 1, and 7 to 9, and Tables 1 to 5 indicate a zoom lens system according to Numerical Example 1. FIG. 1 is a lens configuration diagram. FIGS. 7, 8, and 9 are aberration curve diagrams at a short focal-length end, an intermediate focal length, and a long focal-length end. Table 1 presents surface data, Table 2 presents aspherical surface data, Table 3 presents variable distance data, Table 4 presents zoom lens group data, and Table 5 presents conditional expression data.

The zoom lens system according to Numerical Example 1 includes, sequentially from the object side, a front lens group GF and a rear lens group GR. The front lens group GF includes, sequentially from the object side, a first lens group G1 having a positive refractive power, a second lens group G2 having a negative refractive power, and a third lens group G3 having a negative refractive power. The rear lens group GR as a whole has a positive refractive power, and includes, sequentially from the object side, a fourth lens group G4 having a positive refractive power, a fifth lens group G5 having a negative refractive power, and a sixth lens group G6 having a positive refractive power.

The first lens group G1 includes, sequentially from the object side, a negative meniscus lens 11 being convex on the object side, a positive meniscus lens 12 being convex on the object side, and a positive meniscus lens 13 being convex on the object side. The negative meniscus lens 11 and the positive meniscus lens 12 are cemented to each other.

The second lens group G2 includes, sequentially from the object side, a negative meniscus lens 21 being convex on the object side, a biconcave negative lens 22, and a biconvex positive lens 23. The negative meniscus lens 21 is made of a hybrid lens in which an aspherical layer made of a synthetic resin material is bonded on a surface on the object side of a glass lens. The biconvex positive lens 23 is made of a hybrid lens in which an aspherical layer made of a synthetic resin material is bonded on a surface on the image side of a glass lens. The biconcave negative lens 22 and the biconvex positive lens 23 are cemented to each other.

The third lens group G3 includes, sequentially from the object side, a biconcave negative lens 31 and a biconvex positive lens 32. The biconcave negative lens 31 and the biconvex positive lens 32 are cemented to each other.

The fourth lens group G4 includes, sequentially from the object side, an aperture stop SP, a biconvex positive lens 41, a biconvex positive lens 42, and a negative meniscus lens 43 being convex on the image side. The biconvex positive lens 41 has aspherical surfaces on both sides. The biconvex positive lens 42 and the negative meniscus lens 43 are cemented to each other.

The fifth lens group G5 includes, sequentially from the object side, a biconcave negative lens 51 and a positive meniscus lens 52 being convex on the object side. The biconcave negative lens 51 and the positive meniscus lens 52 are cemented to each other.

The sixth lens group G6 includes, sequentially from the object side, a negative meniscus lens 61 being convex on the object side, a positive meniscus lens 62 being convex on the object side, and a biconvex positive lens 63. The negative meniscus lens 61 and the positive meniscus lens 62 are cemented to each other. The biconvex positive lens 63 has aspherical surfaces on both sides.

TABLE 1 f = 16.5~28.0~48.6, F = 2.9~2.9~2.9,
w = 42.0~27.0~16.1, Ya = 14.24

| Surface No. | R | D | Nd | vd | Glass type (glass member) |
|---|---|---|---|---|---|
| 1 | 349.940 | 2.17 | 1.85896 | 22.73 | S-NPH5 (OHARA) |
| 2 | 125.000 | 4.08 | 1.74100 | 52.64 | S-LAL61 (OHARA) |
| 3 | 303.720 | 0.15 | | | |
| 4 | 63.693 | 6.42 | 1.73400 | 51.47 | S-LAL59 (OHARA) |
| 5 | 198.470 | D1 | | | |
| 6* | 123.440 | 0.10 | 1.52970 | 42.70 | Optical resin |
| 7 | 68.456 | 1.50 | 1.80400 | 46.53 | S-LAH65VS (OHARA) |
| 8 | 16.537 | 8.56 | | | |
| 9 | −51.212 | 1.20 | 1.80400 | 46.53 | S-LAH65VS (OHARA) |
| 10 | 66.763 | 5.00 | 1.73800 | 32.33 | S-NBH53V (OHARA) |
| 11 | −47.401 | 0.12 | 1.52970 | 42.70 | Optical resin |
| 12* | −44.020 | D2 | | | |
| 13 | −33.451 | 0.90 | 1.73400 | 51.47 | S-LAL59 (OHARA) |
| 14 | 33.451 | 3.75 | 1.85883 | 30.00 | NBFD30 (HOYA) |
| 15 | −424.930 | D3 | | | |
| 16 | Stop | 1.40 | | | |
| 17* | 41.636 | 6.20 | 1.49700 | 81.54 | S-FPL51 (OHARA) |
| 18* | −62.583 | 0.20 | | | |
| 19 | 75.999 | 6.88 | 1.59522 | 67.73 | S-FPM2 (OHARA) |
| 20 | −33.020 | 1.21 | 1.84666 | 23.78 | S-TIH53W (OHARA) |
| 21 | −51.212 | D4 | | | |
| 22 | −140.160 | 1.20 | 1.80100 | 34.97 | S-LAM66 (OHARA) |
| 23 | 22.069 | 4.32 | 1.92286 | 20.88 | E-FDS1-W (HOYA) |
| 24 | 53.657 | D5 | | | |
| 25 | 43.199 | 1.10 | 2.00100 | 29.13 | TAFD55 (HOYA) |
| 26 | 19.825 | 6.30 | 1.49700 | 81.61 | FCD1 (HOYA) |
| 27 | 116.850 | 0.32 | | | |
| 28* | 47.716 | 7.65 | 1.49700 | 81.54 | S-FPL51 (OHARA) |
| 29* | −33.842 | BF | | | |

*is a rotation-symmetrical aspherical surface.

TABLE 2

| Surface No | K | A4 | A6 | A8 | A10 |
|---|---|---|---|---|---|
| 6 | 0 | 1.55019E−05 | −2.22450E−08 | 2.51370E−11 | 1.87942E−15 |
| 12 | 0 | 3.29948E−06 | −4.54242E−09 | −6.26158E−11 | 3.89206E−13 |
| 17 | 0 | −9.95529E−06 | −2.30967E−09 | −2.60998E−11 | 9.49283E−14 |
| 18 | 0 | −1.02858E−06 | −2.30427E−09 | −3.63509E−11 | 9.32441E−14 |
| 28 | 0 | −3.22716E−06 | 5.53584E−09 | −3.85931E−11 | 8.74751E−14 |
| 29 | 0 | 1.10134E−06 | −1.08719E−08 | 2.37398E−12 | −1.65988E−13 |

TABLE 3

|  | D1 | D2 | D3 | D4 | D5 | BF |
|---|---|---|---|---|---|---|
| Short focal-length end f = 16.5 | 1.250 | 6.218 | 27.029 | 1.491 | 13.817 | 39.247 |
| Itermediate focal length f = 28.1 | 10.231 | 6.796 | 11.477 | 8.698 | 6.610 | 50.002 |
| Long focal-length end f = 48.5 | 34.205 | 8.317 | 4.050 | 13.562 | 1.751 | 61.927 |

TABLE 4

| Group | Focal length |
|---|---|
| First lens group | 142.6 |
| Second lens group | −27.25 |
| Third lens group | −62.31 |
| Fourth lens group | 29.34 |
| Fifth lens group | −57.33 |
| Sixth lens group | 53.89 |
| First to third lens groups | Short focal-length end: −19.03, |
|  | Long focal-length end: −20.54 |
| Rear lens group | Short focal-length end: 39.57, |
|  | Long focal-length end: 37.44 |

TABLE 5

| | |
|---|---|
| (1) Twt/Twm | −0.43 |
| (2) frw/Ya | 2.78 |
| (3) |f3/ffw| | 3.27 |
| (4) |f3/fft| | 2.38 |
| (5) f2/f3 | 0.44 |
| (6) R3gf/R2gr | 0.76 |
| (7) Bfw/Ya | 2.76 |
| (8) Bfw/fw | 2.39 |
| (9) f1/fw | 3.60 |
| (10) vpMAX | 32.3 |
| (11) f1/Twt1 | 4.10 |
| (12) f1/f23w | −9.29 |
| (13) D(2R − 3F)T/D(2F − 3R)T | 0.28 |
| (14) (1 − Mt^2) × MRt^2 | 2.55 |
| (15) f4/f6 | 0.54 |
| (16) |fN/frm| | 1.53 |
| (17) v3n/v3p | 1.72 |
| (18) N3p | 1.85883 |
| (19) N3a | 1.79462 |

Numerical Example 2

Figure 2A:
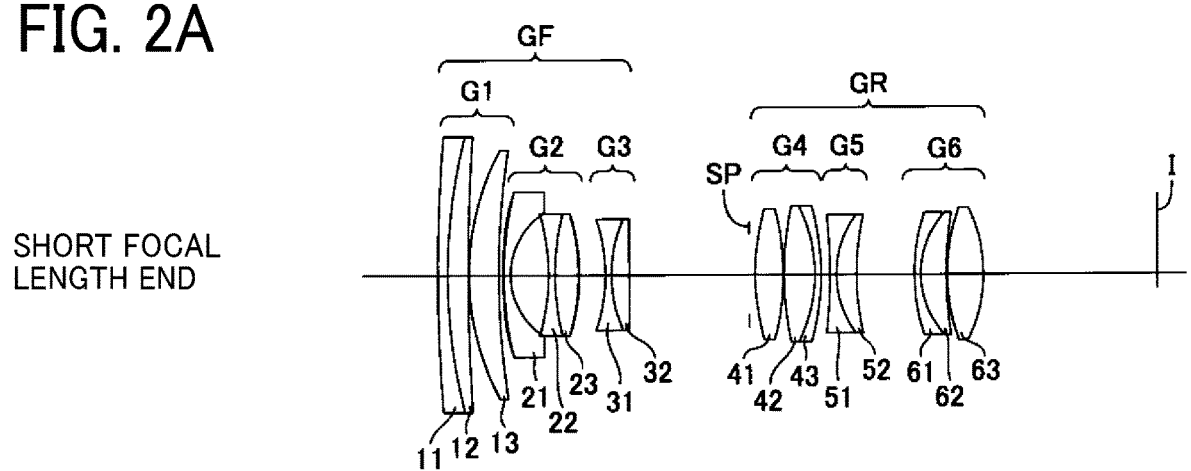
FIGS. 2A, 2B, 2C each is a lens configuration diagram of a zoom lens system according to Numerical Example 2.
Figure 2B:
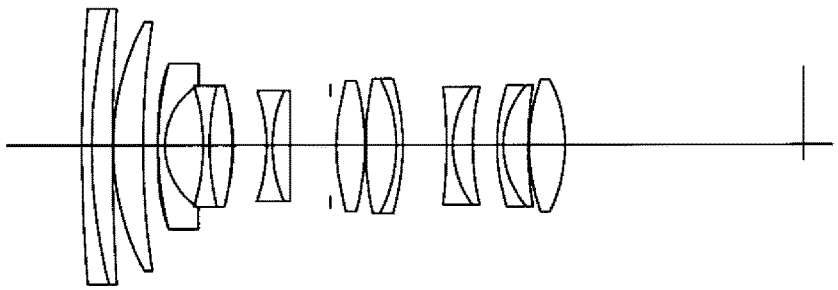
Figure 2C:
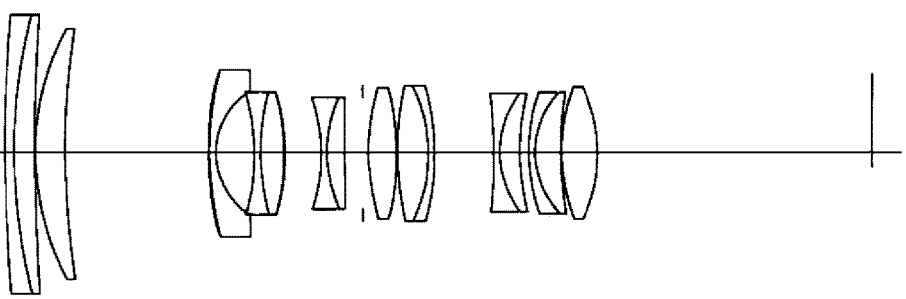
Figure 10:
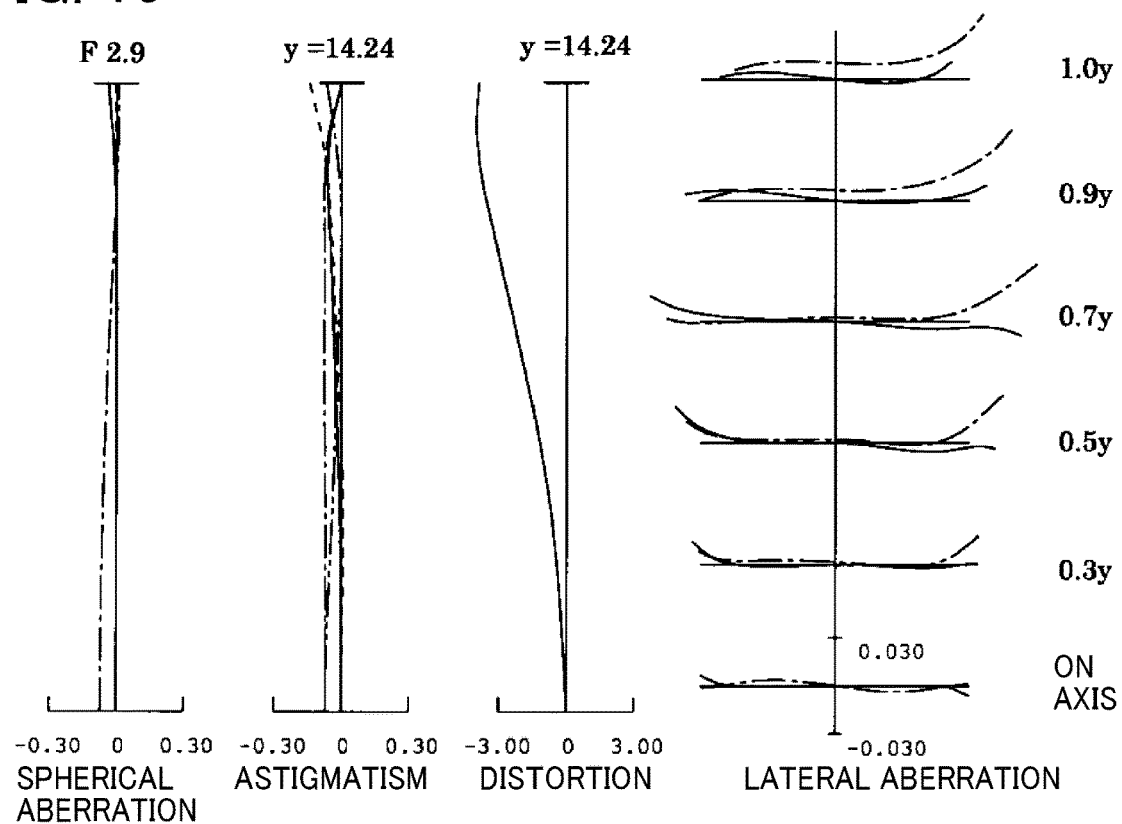
FIG. 10 includes aberration curve diagrams at a short focal-length end of the zoom lens system according to Numerical Example 1.
Figure 11:
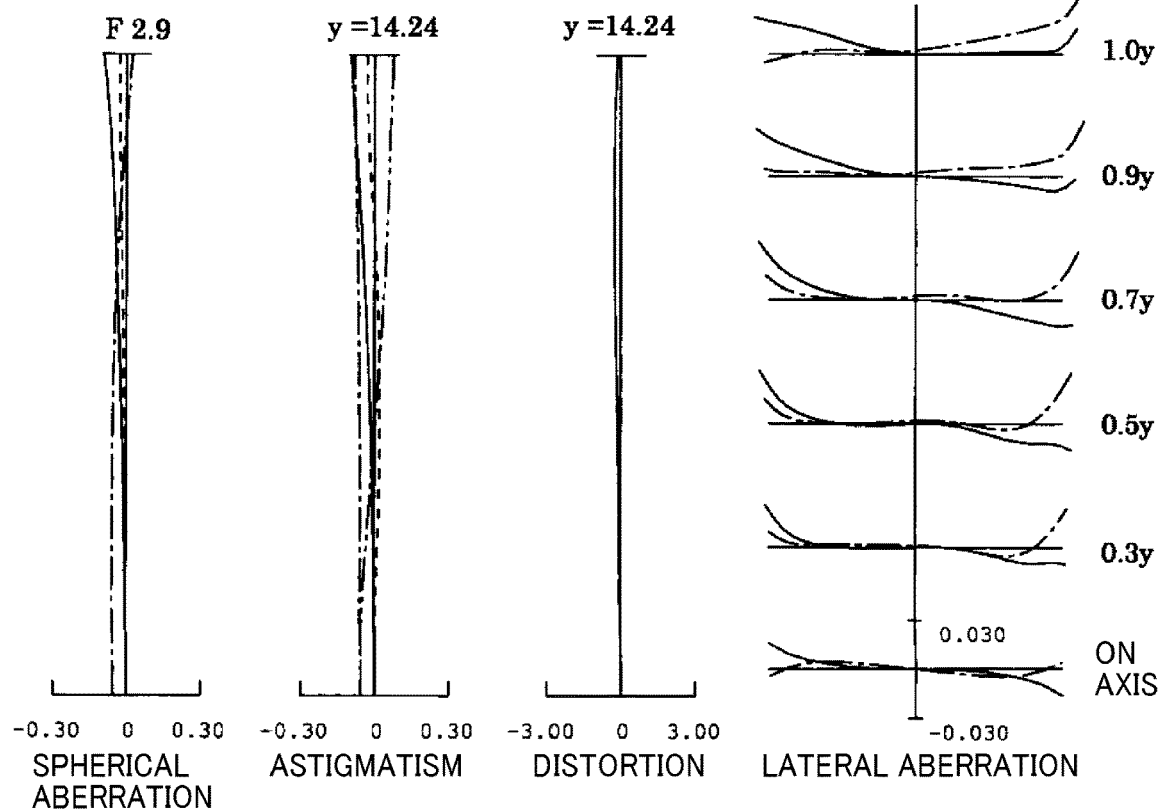
FIG. 11 includes aberration curve diagrams at an intermediate focal length of the zoom lens system according to Numerical Example 1.
Figure 12:
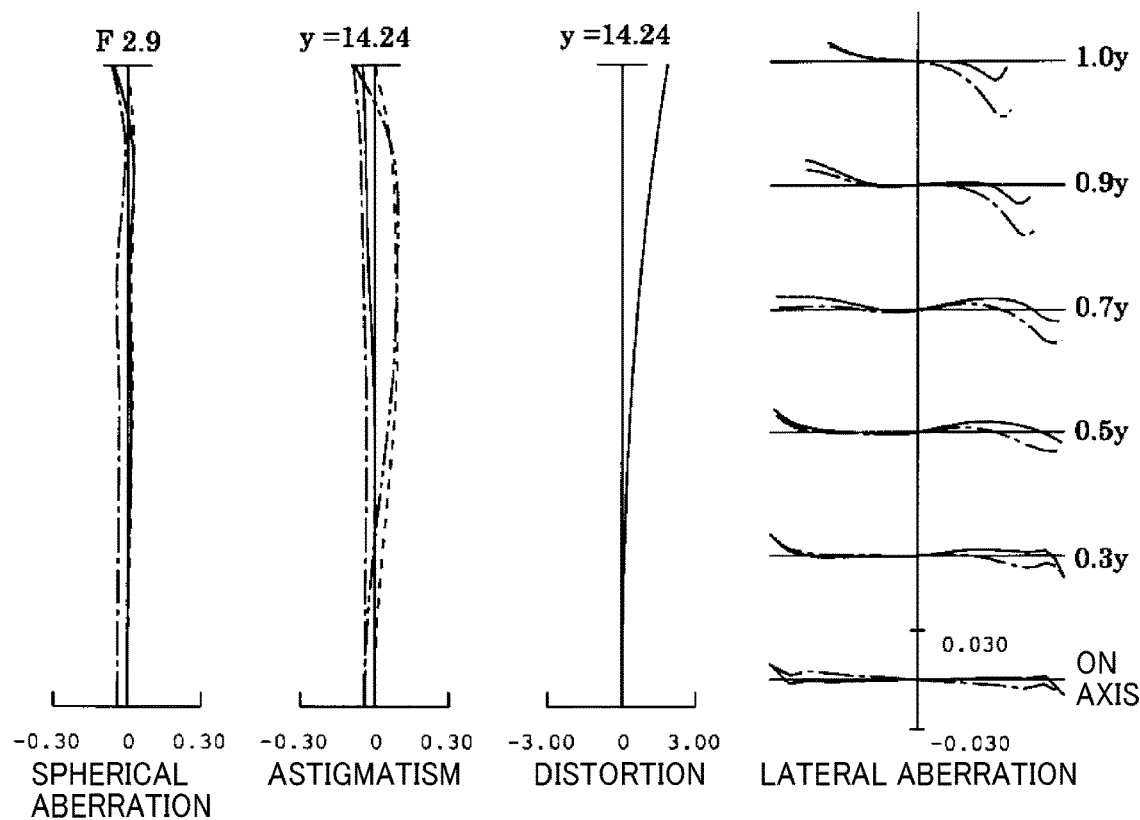
FIG. 12 includes aberration curve diagrams at a long focal-length end of the zoom lens system according to Numerical Example 1.

FIGS. 2, and 10 to 12, and Tables 6 to 10 indicate a zoom lens system according to Numerical Example 2. FIG. 2 is a lens configuration diagram. FIGS. 10, 11, and 12 are aberration curve diagrams at a short focal-length end, an intermediate focal length, and a long focal-length end. Table 6 presents surface data, Table 7 presents aspherical surface data, Table 8 presents variable distance data, Table 9 presents zoom lens group data, and Table 10 presents conditional expression data.

The lens configuration of the zoom lens system according to Numerical Example 2 is similar to the lens configuration of the zoom lens system according to Numerical Example 1 except the following points.

(1) The positive lens 32 of the third lens group G3 is not a biconvex positive lens, but is a planoconvex positive lens being convex on the object side.

TABLE 6 f = 16.5~28.5~48.6, F = 2.9~2.9~2.9,
w = 42.0~26.8~16.1, Ya = 14.24

| Surface No. | R | D | Nd | vd | Glass type (glass member) |
|---|---|---|---|---|---|
| 1 | 368.508 | 2.17 | 1.85896 | 22.73 | S-NPH5 (OHARA) |
| 2 | 125.000 | 4.58 | 1.74100 | 52.64 | S-LAL61 (OHARA) |
| 3 | 480.387 | 0.15 |  |  |  |
| 4 | 59.429 | 6.61 | 1.67790 | 55.34 | S-LAL12 (OHARA) |
| 5 | 182.982 | D1 |  |  |  |
| 6* | 151.330 | 0.10 | 1.52970 | 42.70 | Optical resin |
| 7 | 74.978 | 1.50 | 1.80400 | 46.53 | S-LAH65VS (OHARA) |
| 8 | 16.435 | 8.49 |  |  |  |
| 9 | −46.380 | 1.40 | 1.77250 | 49.60 | S-LAH66 (OHARA) |
| 10 | 55.204 | 5.22 | 1.73800 | 32.33 | S-NBH53V (OHARA) |
| 11 | −49.343 | 0.20 | 1.52970 | 42.70 | Optical resin |
| 12* | −42.716 | D2 |  |  |  |
| 13 | −36.457 | 1.30 | 1.72000 | 50.23 | S-LAL10 (OHARA) |
| 14 | 30.646 | 3.90 | 1.85025 | 30.05 | S-NBH57 (OHARA) |
| 15 | ∞ | D3 |  |  |  |
| 16 | Stop | 1.30 |  |  |  |
| 17* | 42.436 | 6.32 | 1.49710 | 81.56 | M-FCD1 (HOYA) |
| 18* | −60.195 | 0.20 |  |  |  |
| 19 | 72.187 | 6.87 | 1.59522 | 67.73 | S-FPM2 (OHARA) |
| 20 | −33.293 | 1.40 | 1.84666 | 23.78 | S-TIH53W (OHARA) |
| 21 | −53.968 | D4 |  |  |  |
| 22 | −113.518 | 1.40 | 1.80100 | 34.97 | S-LAM66 (OHARA) |
| 23 | 22.123 | 4.47 | 1.92286 | 20.88 | E-FDS1-W (HOYA) |
| 24 | 57.089 | D5 |  |  |  |
| 25 | 42.894 | 1.40 | 2.00100 | 29.13 | TAFD55 (HOYA) |
| 26 | 19.871 | 5.70 | 1.49700 | 81.61 | FCD1 (HOYA) |
| 27 | 84.692 | 0.20 |  |  |  |
| 28* | 40.337 | 8.14 | 1.49710 | 81.56 | M-FCD1 (HOYA) |
| 29* | −34.034 | BF |  |  |  |

*is a rotation-symmetrical aspherical surface.

TABLE 7

| Surface No. | K | A4 | A6 | A8 | A10 |
|---|---|---|---|---|---|
| 6 | 0 | 1.69364E−05 | −3.01171E−08 | 4.58285E−11 | −1.94966E−14 |
| 12 | 0 | 4.53006E−06 | 2.78274E−09 | −1.18907E−10 | 5.85653E−13 |
| 17 | 0 | −9.60746E−06 | −4.72907E−09 | −8.90566E−12 | 3.79932E−14 |
| 18 | 0 | −1.89625E−06 | −7.40575E−09 |  |  |

TABLE 7-continued

| Surface No. | K | A4 | A6 | A8 | A10 |
|---|---|---|---|---|---|
| 28 | 0 | −3.77184E−06 | −6.97085E−09 | 2.12525E−11 | 8.54793E−14 |
| 29 | 0 | 2.03163E−06 | −1.59070E−08 | | |

TABLE 8

| | D1 | D2 | D3 | D4 | D5 | BF |
|---|---|---|---|---|---|---|
| Short focal-length end f = 16.5 | 1.000 | 6.038 | 26.757 | 2.000 | 13.175 | 38.990 |
| Itermediate focal length f = 28.5 | 3.259 | 7.502 | 9.030 | 9.763 | 5.412 | 53.533 |
| Long focal-length end f = 48.6 | 31.922 | 8.255 | 3.950 | 13.175 | 2.000 | 61.584 |

TABLE 9

| Group | Focal length |
|---|---|
| First lens group | 130.3 |
| Second lens group | −26.17 |
| Third lens group | −64.79 |
| Fourth lens group | 29.53 |
| Fifth lens group | −56.09 |
| Sixth lens group | 52.93 |
| First to third lens groups | Short focal-length end: −19.01, Long focal-length end: −26.63 |
| Rear lens group | Short focal-length end: 39.61, Long focal-length end: 35.59 |

TABLE 10

| | |
|---|---|
| (1) Twt/Twm | −1.16 |
| (2) frw/Ya | 2.78 |
| (3) |f3/ffw| | 3.41 |
| (4) |f3/fft| | 2.43 |
| (5) f2/f3 | 0.40 |
| (6) R3gf/R2gr | 0.85 |
| (7) Bfw/Ya | 2.74 |
| (8) Bfw/fw | 2.37 |
| (9) f1/fw | 3.29 |
| (10) vpMAX | 32.3 |
| (11) f1/Twt1 | 3.96 |
| (12) f1/f23w | −8.64 |
| (13) D(2R − 3F)T/D(2F − 3R)T | 0.28 |
| (14) (1 − Mt^2) × MRt^2 | 2.00 |
| (15) f4/f6 | 0.56 |
| (16) |fN/frm| | 1.51 |
| (17) v3n/v3p | 1.67 |
| (18) N3p | 1.85025 |
| (19) N3a | 1.78513 |

Numerical Example 3

Figure 3A:
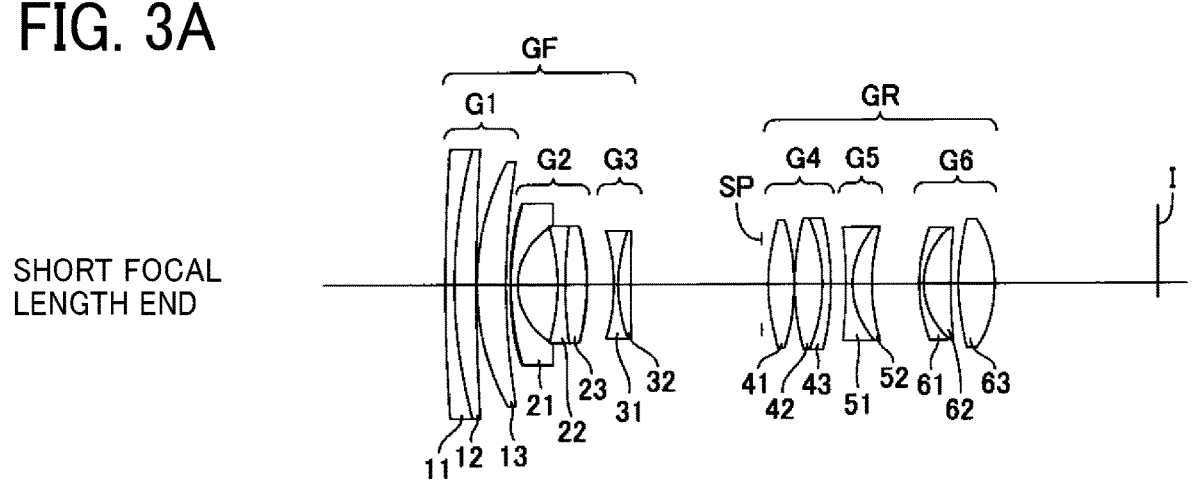
FIGS. 3A, 3B, and 3C each is a lens configuration diagram of a zoom lens system according to Numerical Example 3.
Figure 3B:
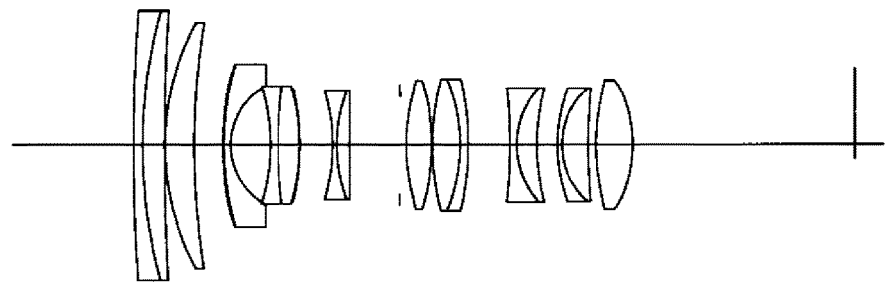
Figure 3C:
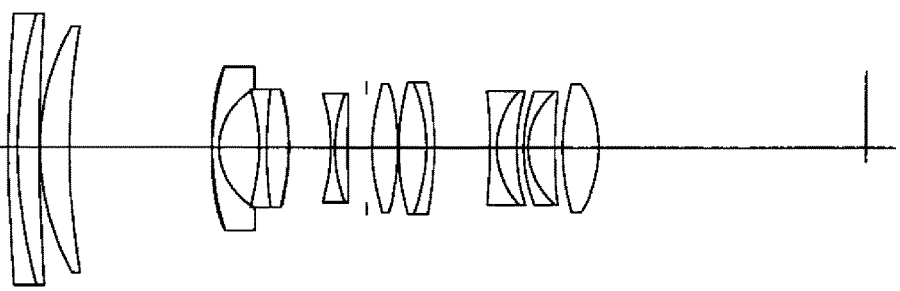
Figure 13:
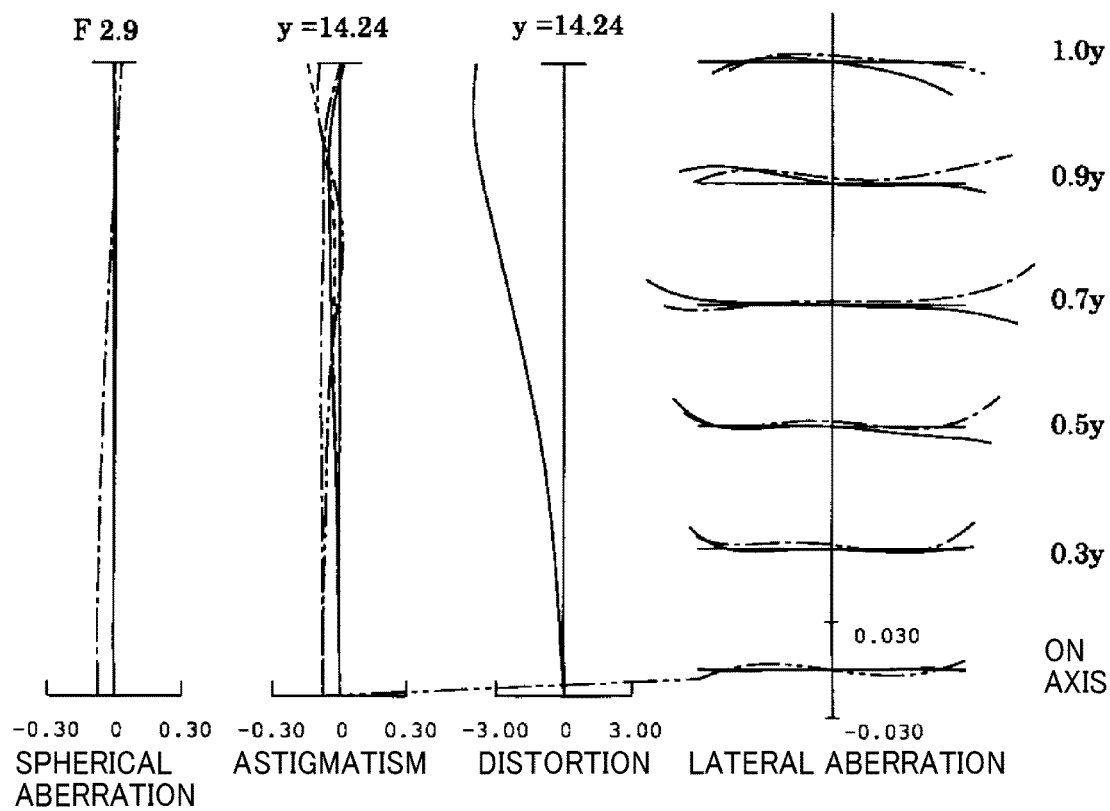
FIG. 13 includes aberration curve diagrams at a short focal-length end of the zoom lens system according to Numerical Example 2.
Figure 14:
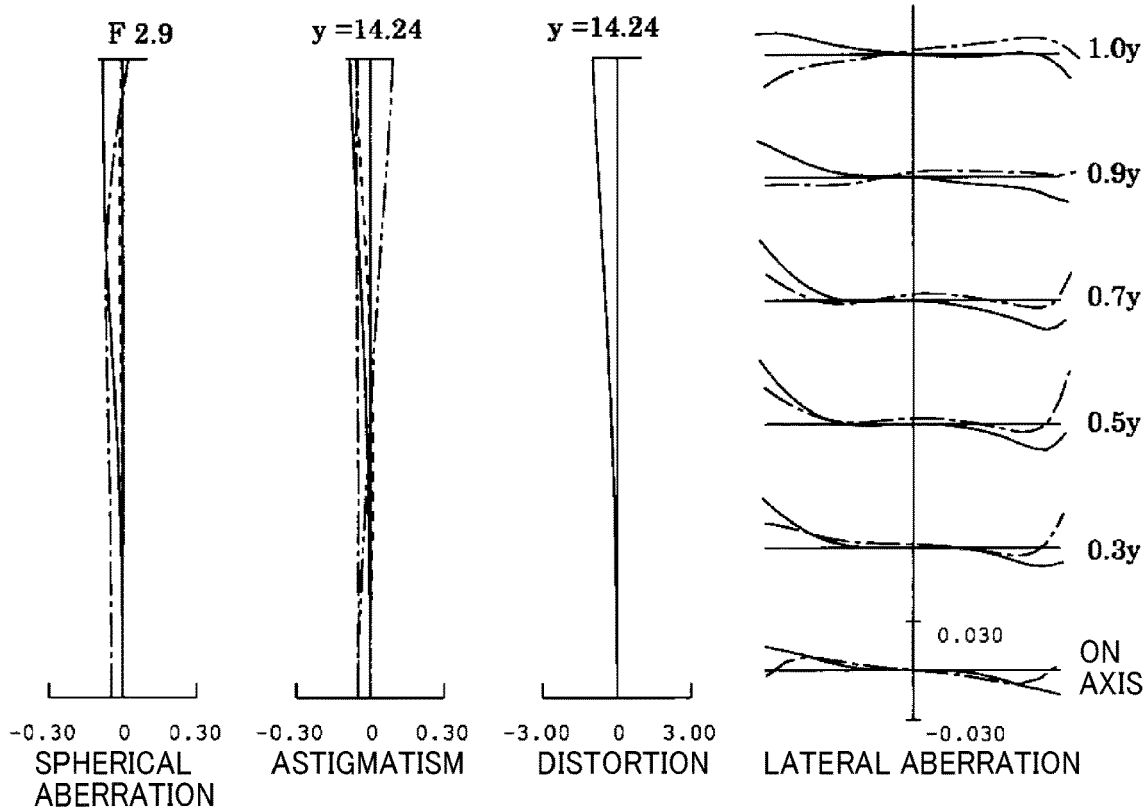
FIG. 14 includes aberration curve diagrams at an intermediate focal length of the zoom lens system according to Numerical Example 2.
Figure 15:
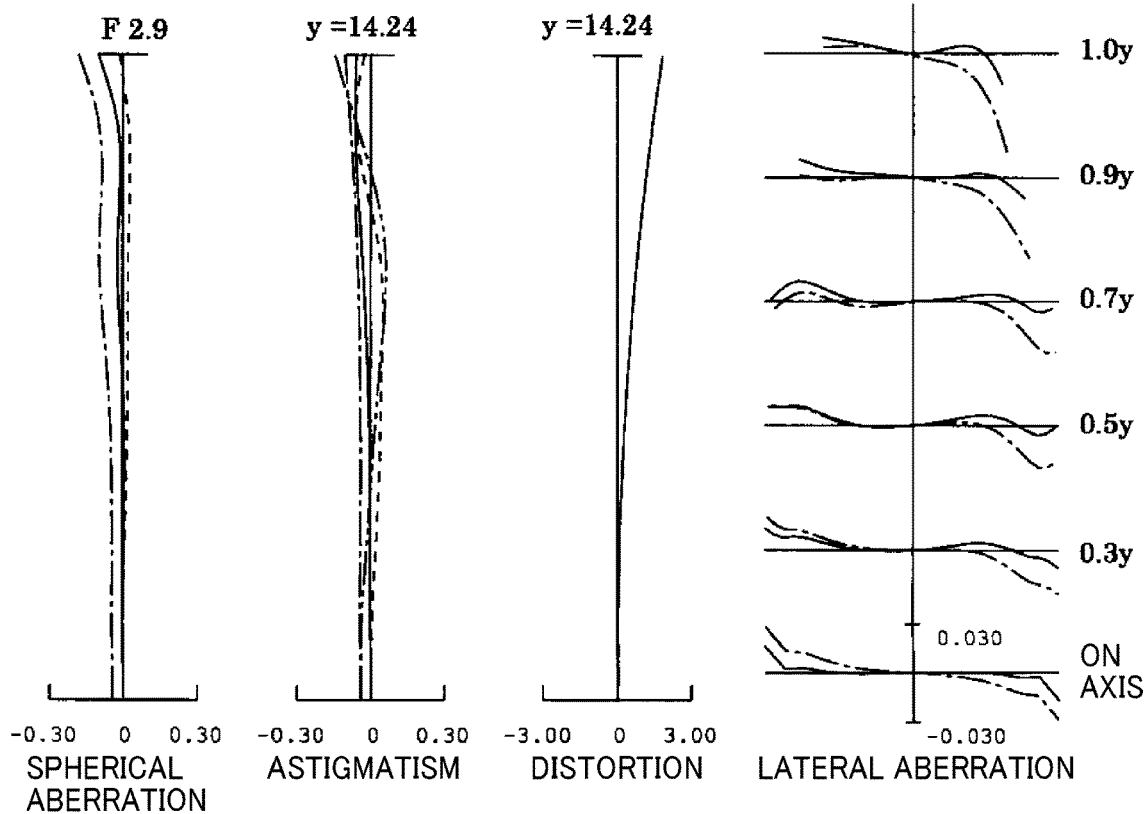
FIG. 15 includes aberration curve diagrams at a long focal-length end of the zoom lens system according to Numerical Example 2.

FIGS. 3, and 13 to 15, and Tables 11 to 15 indicate a zoom lens system according to Numerical Example 3. FIG. 3 is a lens configuration diagram. FIGS. 13, 14, and 15 are aberration curve diagrams at a short focal-length end, an intermediate focal length, and a long focal-length end. Table 11 presents surface data, Table 12 presents aspherical surface data, Table 13 presents variable distance data, Table 14 presents zoom lens group data, and Table 15 presents conditional expression data.

The lens configuration of the zoom lens system according to Numerical Example 3 is similar to the lens configuration of the zoom lens system according to Numerical Example 1 except the following points.

(1) The positive lens 32 of the third lens group G3 is not a biconvex positive lens, but is a positive meniscus lens being convex on the object side.

TABLE 11 f = 16.5~28.2~48.6, F = 2.9~2.9~2.9, w = 41.9~26.9~16.1, Ya = 14.24

| Surface No. | R | D | Nd | vd | Glass type (glass member) |
|---|---|---|---|---|---|
| 1 | 444.922 | 2.00 | 1.84666 | 23.78 | S-TIH53W (OHARA) |
| 2 | 119.286 | 4.81 | 1.72916 | 54.68 | S-LAL18 (OHARA) |
| 3 | 517.614 | 0.15 | | | |
| 4 | 60.346 | 6.50 | 1.75500 | 52.32 | S-LAH97 (OHARA) |
| 5 | 177.527 | D1 | | | |
| 6* | 123.260 | 0.10 | 1.52970 | 42.70 | Optical resin |
| 7 | 67.227 | 1.50 | 1.77250 | 49.60 | S-LAH66 (OHARA) |
| 8 | 15.727 | 8.82 | | | |
| 9 | −47.511 | 1.70 | 1.83481 | 42.74 | S-LAH55VS (OHARA) |
| 10 | 108.989 | 4.86 | 1.74077 | 27.79 | S-TIH13 (OHARA) |
| 11 | −49.540 | 0.10 | 1.52970 | 42.70 | Optical resin |
| 12* | −50.382 | D2 | | | |
| 13 | −43.191 | 0.90 | 1.71300 | 53.87 | S-LAL8 (OHARA) |
| 14 | 36.368 | 2.83 | 1.90366 | 31.34 | S-LAH95 (OHARA) |
| 15 | 1014.485 | D3 | | | |
| 16 | Stop | 1.30 | | | |
| 17* | 40.844 | 5.72 | 1.49700 | 81.54 | S-FPL51 (OHARA) |
| 18* | −58.146 | 0.20 | | | |
| 19 | 59.425 | 6.16 | 1.60300 | 65.44 | S-PHM53 (OHARA) |
| 20 | −39.266 | 1.80 | 1.84666 | 23.78 | S-TIH53W (OHARA) |
| 21 | −67.092 | D4 | | | |
| 22 | −119.956 | 1.50 | 1.80100 | 34.97 | S-LAM66 (OHARA) |
| 23 | 19.726 | 4.42 | 1.92286 | 20.88 | E-FDS1-W (HOYA) |
| 24 | 48.277 | D5 | | | |
| 25 | 37.619 | 1.00 | 2.00100 | 29.13 | TAFD55 (HOYA) |
| 26 | 16.997 | 5.95 | 1.49700 | 81.61 | FCD1 (HOYA) |
| 27 | 143.659 | 1.69 | | | |
| 28* | 49.008 | 8.14 | 1.49700 | 81.54 | S-FPL51 (OHARA) |
| 29* | −32.352 | BF | | | |

*is a rotation-symmetrical aspherical surface.

TABLE 12

| Surface No. | K | A4 | A6 | A8 | A10 |
|---|---|---|---|---|---|
| 6 | 0 | 1.61683E−05 | −2.82648E−08 | 4.04557E−11 | −1.88010E−14 |
| 12 | 0 | 4.69990E−06 | −9.81276E−09 | −5.19004E−11 | 4.01179E−13 |
| 17 | 0 | −9.89042E−06 | −5.22417E−09 | −3.25786E−11 | 5.66871E−14 |
| 18 | 0 | −3.00384E−06 | −3.99768E−09 | −4.11839E−11 | 3.58618E−14 |

TABLE 12-continued

| Surface No. | K | A4 | A6 | A8 | A10 |
|---|---|---|---|---|---|
| 28 | 0 | −6.28769E−06 | 1.27418E−08 | −1.65986E−10 | 5.48898E−13 |
| 29 | 0 | −3.21298E−06 | −1.46508E−08 | −8.55460E−11 | −9.52581E−14 |

TABLE 13

| | D1 | D2 | D3 | D4 | D5 | BF |
|---|---|---|---|---|---|---|
| Short focal-length end f = 16.5 | 1.000 | 5.987 | 29.148 | 3.380 | 10.469 | 36.363 |
| Itermediate focal length f = 28.2 | 6.434 | 7.273 | 11.186 | 9.219 | 4.634 | 49.517 |
| Long focal-length end f = 48.6 | 31.516 | 9.410 | 4.067 | 12.327 | 1.527 | 59.479 |

TABLE 14

| Group | Focal length |
|---|---|
| First lens group | 126.1 |
| Second lens group | −23.68 |
| Third lens group | −82.42 |
| Fourth lens group | 28.57 |
| Fifth lens group | −50.74 |
| Sixth lens group | 51.94 |
| First to third lens groups | Short focal-length end: −19.62, Long focal-length end: −27.61 |
| Rear lens group | Short focal-length end: 40.00, Long focal-length end: 36.20 |

TABLE 15

| (1) Twt/Twm | −0.42 |
|---|---|
| (2) frw/Ya | 2.81 |
| (3) |f3/ffw| | 4.20 |
| (4) |f3/fft| | 2.99 |
| (5) f2/f3 | 0.29 |
| (6) R3gf/R2gr | 0.86 |
| (7) Bfw/Ya | 2.55 |
| (8) Bfw/fw | 2.21 |
| (9) f1/fw | 3.15 |
| (10) vpMAX | 31.3 |
| (11) f1/Twt1 | 3.95 |
| (12) f1/f23w | −8.16 |
| (13) D(2R − 3F)T/D(2F − 3R)T | 0.31 |
| (14) (1 − Mt^2) × MRt^2 | 2.00 |
| (15) f4/f6 | 0.55 |
| (16) |fN/frm| | 1.34 |
| (17) v3n/v3p | 1.72 |
| (18) N3p | 1.90366 |
| (19) N3a | 1.80833 |

Numerical Example 4

Figure 4A:
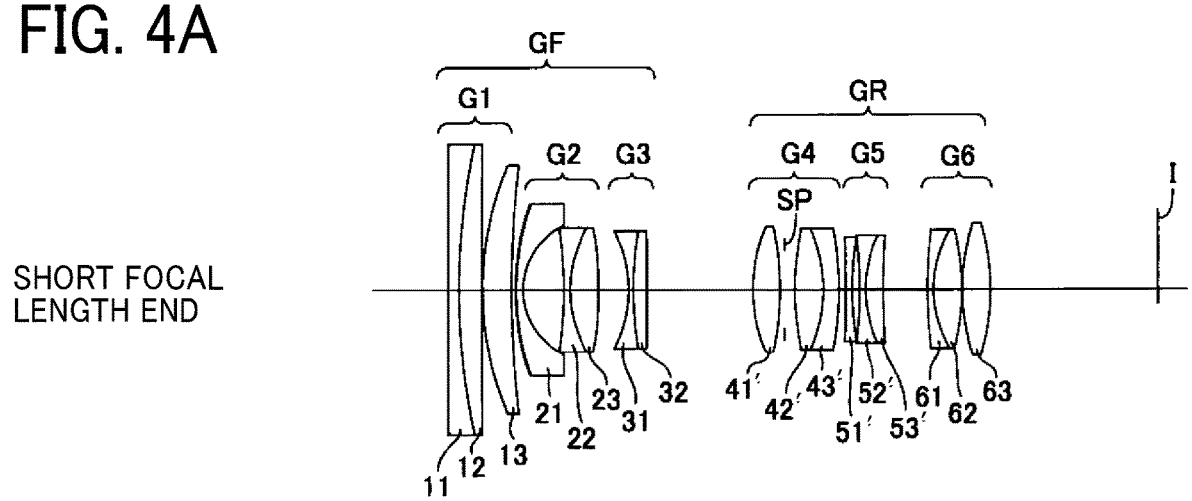
FIGS. 4A, 4B, and 4C each is a lens configuration diagram of a zoom lens system according to Numerical Example 4.
Figure 4B:
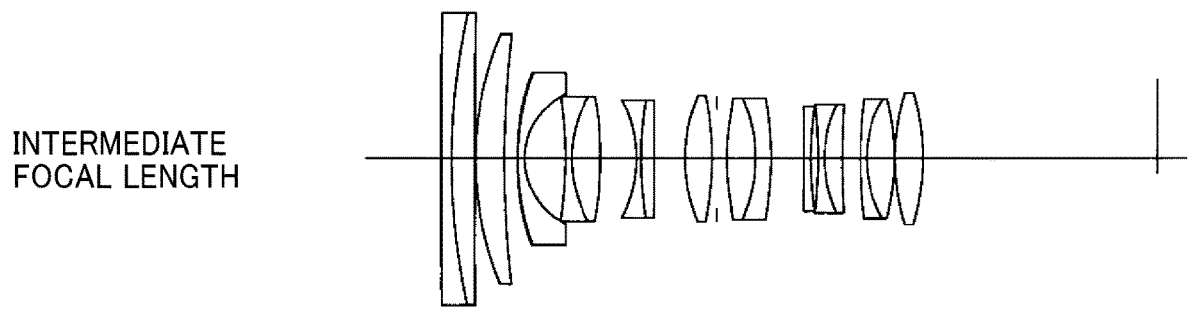
Figure 4C:
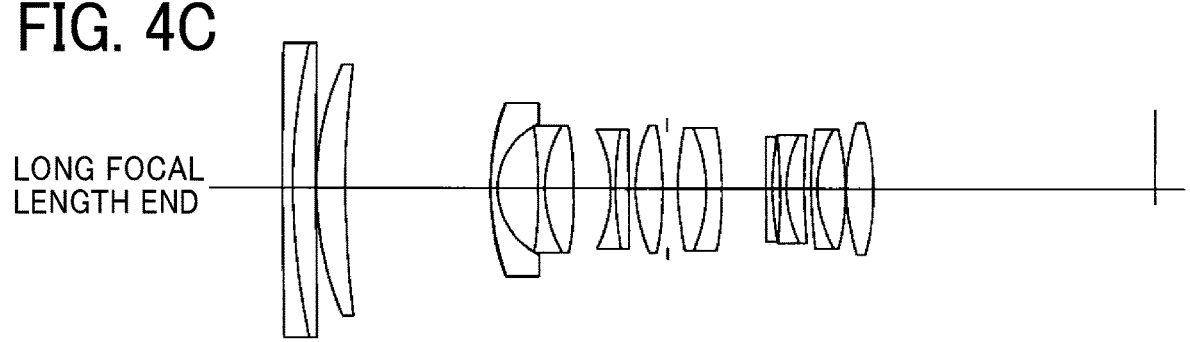
Figure 16:
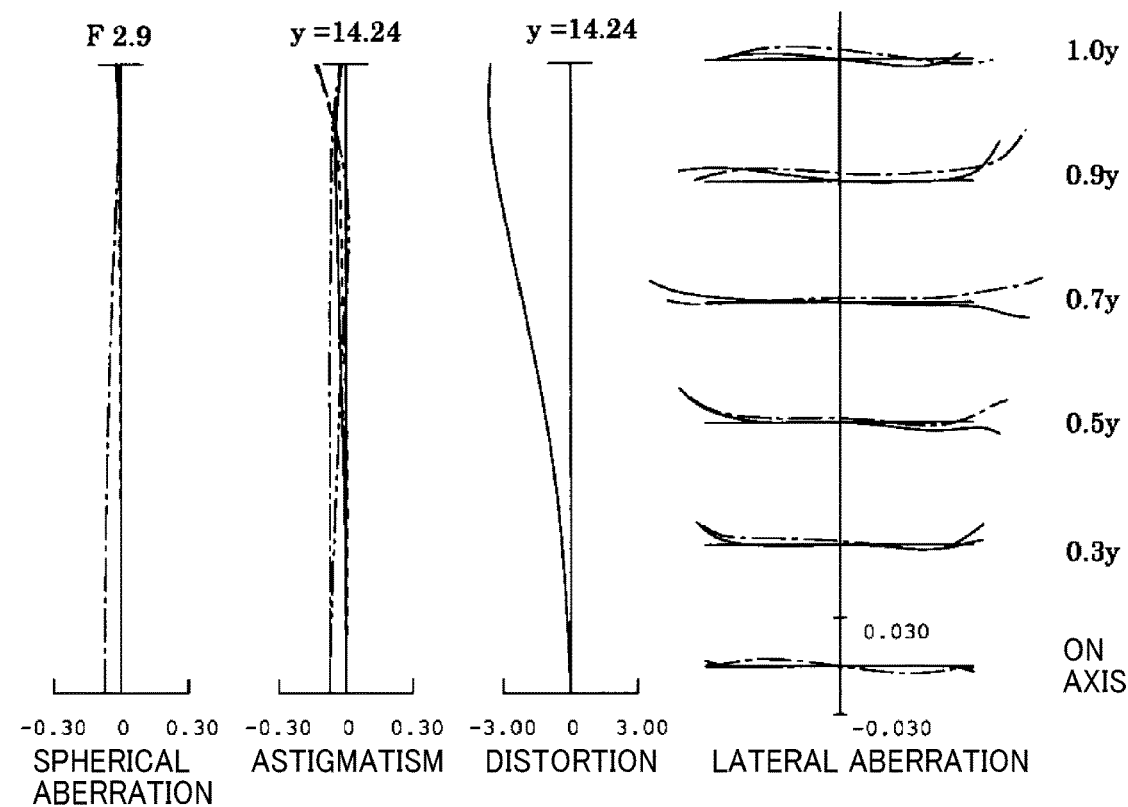
FIG. 16 includes aberration curve diagrams at a short focal-length end of the zoom lens system according to Numerical Example 3.
Figure 17:
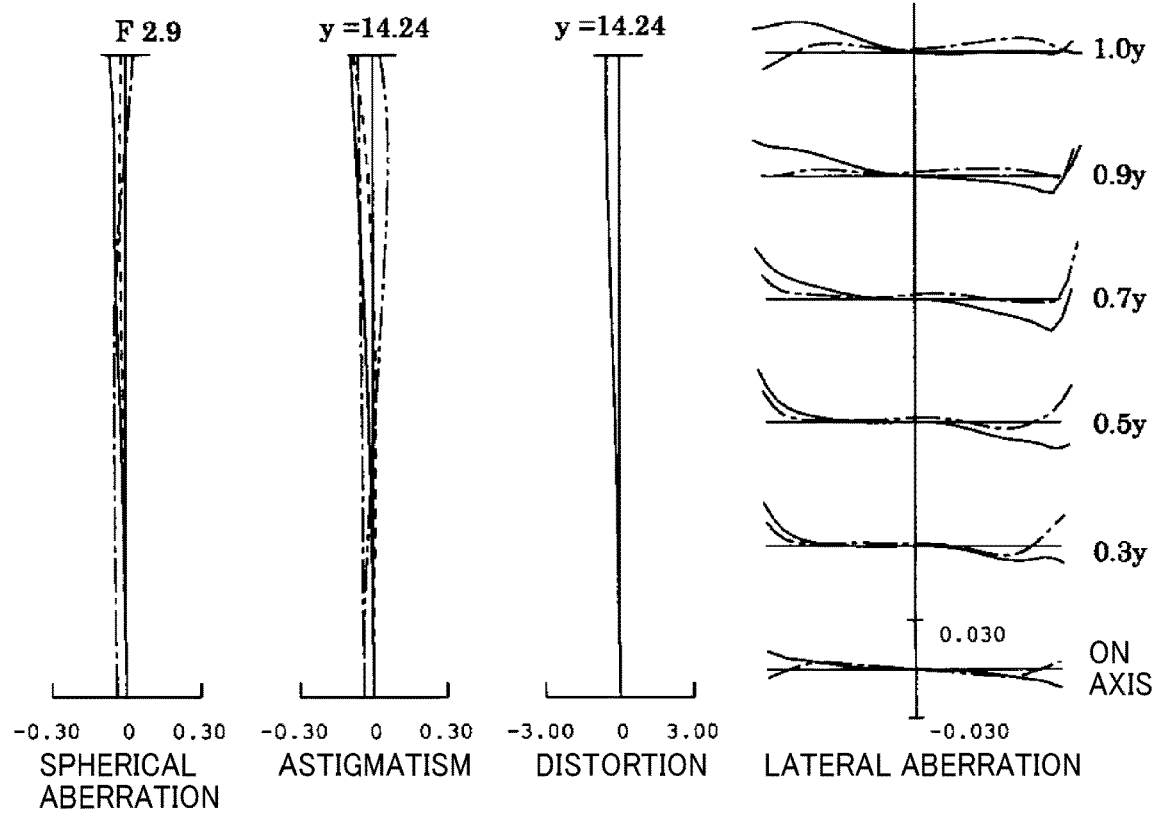
FIG. 17 includes aberration curve diagrams at an intermediate focal length of the zoom lens system according to Numerical Example 3.
Figure 18:
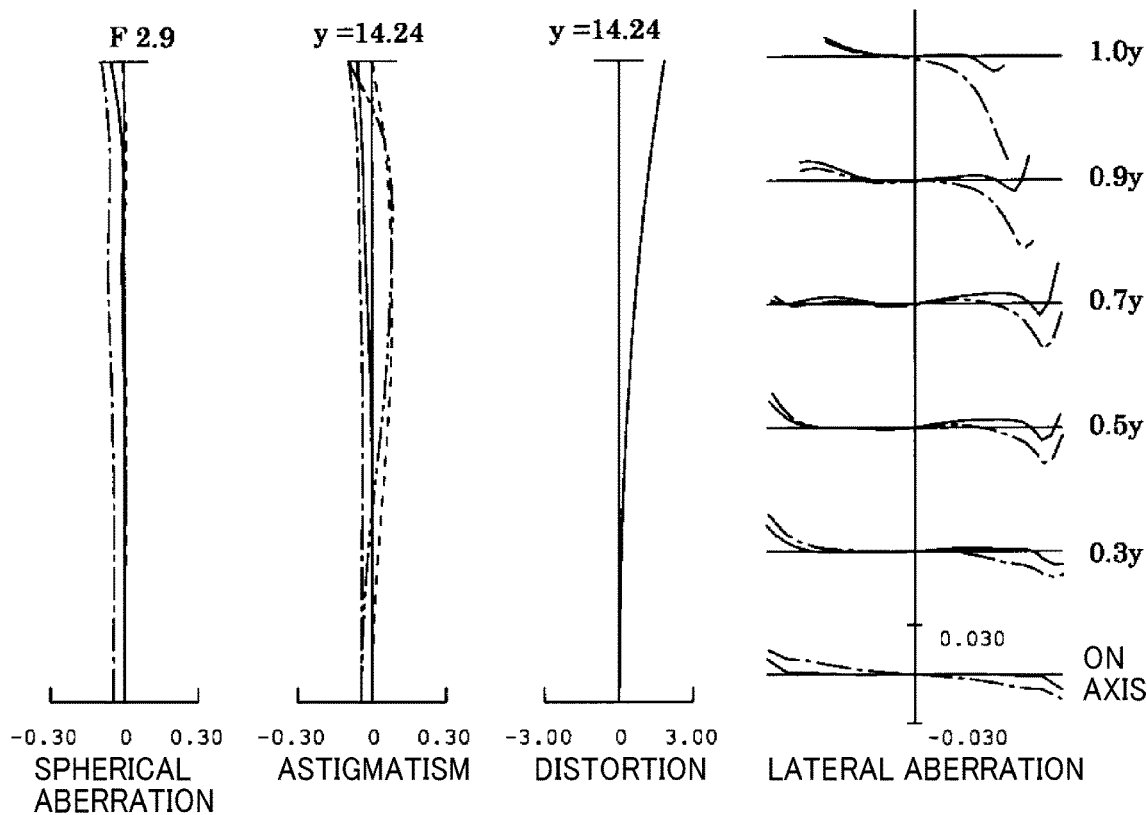
FIG. 18 includes aberration curve diagrams at a long focal-length end of the zoom lens system according to Numerical Example 3.

FIGS. 4, and 16 to 18, and Tables 16 to 20 indicate a zoom lens system according to Numerical Example 4. FIG. 4 is a lens configuration diagram. FIGS. 16, 17, and 18 are aberration curve diagrams at a short focal-length end, an intermediate focal length, and a long focal-length end. Table 16 presents surface data, Table 17 presents aspherical surface data, Table 18 presents variable distance data, Table 19 presents zoom lens group data, and Table 20 presents conditional expression data.

The lens configuration of the zoom lens system according to Numerical Example 4 is similar to the lens configuration of the zoom lens system according to Numerical Example 1 except the following points.

(1) The positive lens 23 of the second lens group G2 is not a hybrid lens, but is an aspherical lens having an aspherical surface on a surface on the image side.

(2) The positive lens 32 of the third lens group G3 is not a biconvex positive lens, but is a positive meniscus lens being convex on the object side.

(3) The fourth lens group G4 includes, sequentially from the object side, a biconvex positive lens 41', an aperture stop SP, a biconvex positive lens 42', and a negative meniscus lens 43' being convex on the image side. The biconvex positive lens 42' has an aspherical surface on a surface on the object side. The biconvex positive lens 42' and the negative meniscus lens 43' are cemented to each other.

(4) The fifth lens group G5 includes, sequentially from the object side, a biconcave negative lens 51', a biconcave negative lens 52', and a positive meniscus lens 53' being convex on the object side. The biconcave negative lens 52' and the positive meniscus lens 53' are cemented to each other.

(5) The positive lens 62 of the sixth lens group G6 is not a positive meniscus lens being convex on the object side, but is a biconvex positive lens.

(6) The biconvex positive lens 63 of the sixth lens group G6 does not have aspherical surfaces on both sides, but has an aspherical surface on a surface on the object side.

TABLE 16 f = 16.4~28.2~48.5, F = 2.9~2.9~2.9, w = 42.0~27.1~16.1, Ya = 14.24

| Surface No. | R | D | Nd | vd | Glass type (glass member) |
|---|---|---|---|---|---|
| 1 | 2692.178 | 2.37 | 1.84666 | 23.78 | S-TIH53W (OHARA) |
| 2 | 151.356 | 5.10 | 1.80400 | 46.53 | S-LAH65VS (OHARA) |
| 3 | 3686.730 | 0.15 | | | |
| 4 | 71.758 | 6.39 | 1.75500 | 52.32 | S-LAH97 (OHARA) |
| 5 | 233.756 | D1 | | | |
| 6* | 78.496 | 0.05 | 1.52970 | 42.70 | Optical resin |
| 7 | 57.064 | 1.50 | 1.83481 | 42.74 | S-LAH55VS (OHARA) |
| 8 | 15.892 | 9.04 | | | |
| 9 | −91.408 | 1.40 | 1.69680 | 55.53 | S-LAL14 (OHARA) |
| 10 | 27.396 | 6.42 | 1.68948 | 31.02 | L-TIM28 (OHARA) |
| 11* | −103.276 | D2 | | | |
| 12 | −27.881 | 1.00 | 1.53775 | 74.70 | S-FPM3 (OHARA) |
| 13 | 80.466 | 2.98 | 1.90366 | 31.34 | S-LAH95 (OHARA) |
| 14 | −1034.624 | D3 | | | |
| 15 | 34.665 | 6.01 | 1.55332 | 71.68 | M-FCD500 (HOYA) |
| 16 | −68.601 | 1.00 | | | |
| 17 | Stop | 2.30 | | | |
| 18* | 52.301 | 6.32 | 1.61881 | 63.85 | M-PCD4 (HOYA) |
| 19 | −32.784 | 3.48 | 1.84666 | 23.78 | S-TIH53W (OHARA) |
| 20 | −73.735 | D4 | | | |
| 21 | −437.375 | 1.40 | 2.00100 | 29.13 | TAFD55 (HOYA) |
| 22 | 69.701 | 1.67 | | | |
| 23 | −103.385 | 1.40 | 1.80610 | 40.93 | S-LAH53V (OHARA) |
| 24 | 27.165 | 3.97 | 1.94595 | 17.98 | FDS18-W (HOYA) |
| 25 | 166.724 | D5 | | | |
| 26 | 104.775 | 1.40 | 1.84666 | 23.78 | S-TIH53W (OHARA) |

TABLE 16-continued f = 16.4~28.2~48.5, F = 2.9~2.9~2.9,
w = 42.0~27.1~16.1, Ya = 14.24

| Surface No. | R | D | Nd | vd | Glass type (glass member) |
|---|---|---|---|---|---|
| 27 | 26.064 | 6.25 | 1.49700 | 81.54 | S-FPL51 (OHARA) |
| 28 | −52.988 | 0.15 | | | |
| 29* | 46.590 | 6.20 | 1.49710 | 81.56 | M-FCD1 (HOYA) |
| 30 | −51.757 | BF | | | |

*is a rotation-symmetrical aspherical surface.

TABLE 17

| Surface No. | K | A4 | A6 | A8 | A10 |
|---|---|---|---|---|---|
| 6 | 0 | 1.09778E−05 | −1.68183E−08 | 1.45658E−11 | −1.22128E−14 |
| 11 | 44.65936 | 1.20183E−06 | 1.13729E−08 | −2.02364E−10 | 7.90405E−13 |
| 18 | 0 | −8.72559E−06 | −8.20277E−09 | −1.07667E−12 | −3.25462E−14 |
| 29 | 0 | −3.33429E−06 | 1.13062E−08 | −4.50608E−11 | 1.15988E−13 |

TABLE 18

| | D1 | D2 | D3 | D4 | D5 | BF |
|---|---|---|---|---|---|---|
| Short focal-length end f = 16.2 | 1.000 | 6.696 | 23.511 | 1.500 | 9.848 | 37.499 |
| Itermediate focal length f = 28.2 | 2.967 | 8.038 | 6.739 | 7.349 | 4.039 | 52.387 |
| Long focal-length end f = 48.5 | 32.172 | 8.363 | 1.500 | 9.848 | 1.500 | 62.838 |

TABLE 19

| Group | Focal length |
|---|---|
| First lens group | 138.4 |
| Second lens group | −25.00 |
| Third lens group | −72.58 |
| Fourth lens group | 27.48 |
| Fifth lens group | −39.26 |
| Sixth lens group | 41.23 |
| First to third lens groups | Short focal-length end: −18.94, Long focal-length end: −25.92 |
| Rear lens group | Short focal-length end: 40.53, Long focal-length end: 36.73 |

TABLE 20

| | |
|---|---|
| (1) Twt/Twm | −9.96 |
| (2) frw/Ya | 2.85 |
| (3) |f3/ffw| | 3.83 |
| (4) |f3/fft| | 2.80 |
| (5) f2/f3 | 0.34 |
| (6) R3gf/R2gr | 0.27 |
| (7) Bfw/Ya | 2.63 |
| (8) Bfw/fw | 2.28 |
| (9) f1/fw | 3.42 |
| (10) vpMAX | 31.3 |
| (11) f1/Twt1 | 3.83 |
| (12) f1/f23w | −9.04 |
| (13) D(2R − 3F)T/D(2F − 3R)T | 0.27 |
| (14) (1 − Mt^2) × MRt^2 | 2.39 |
| (15) f4/f6 | 0.67 |
| (16) |fN/frm| | 1.02 |
| (17) v3n/v3p | 2.38 |
| (18) N3p | 1.90366 |
| (19) N3a | 1.72071 |

Numerical Example 5

Figure 5A:
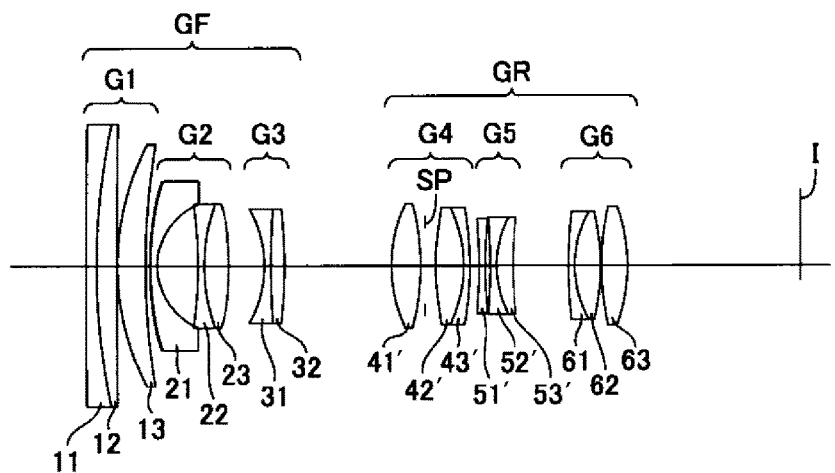
FIGS. 5A, 5B, 5C each is a lens configuration diagram of a zoom lens system according to Numerical Example 5.
Figure 5B:
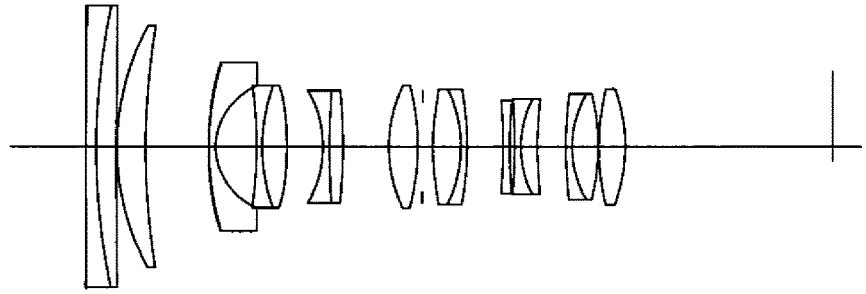
Figure 5C:
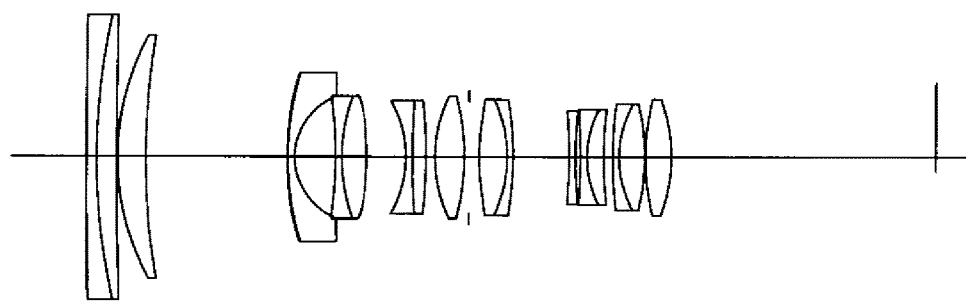
Figure 19:
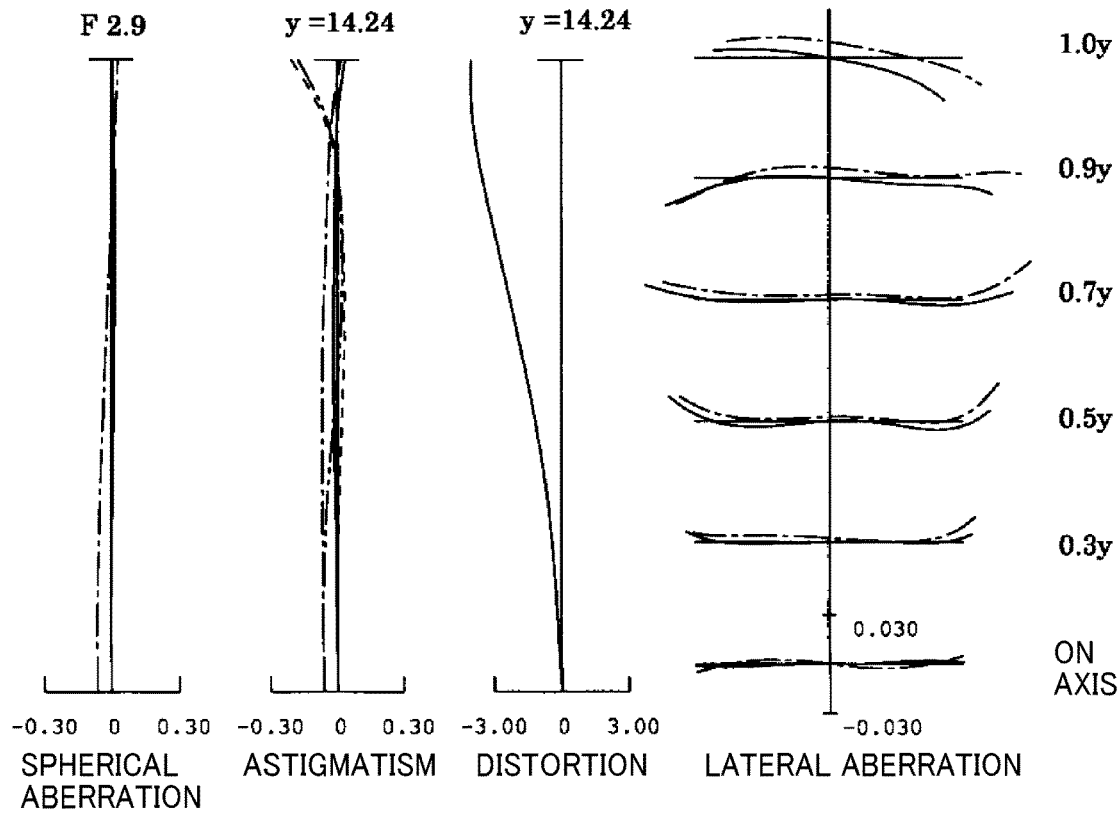
FIG. 19 includes aberration curve diagrams at a short focal-length end of the zoom lens system according to Numerical Example 4.
Figure 20:
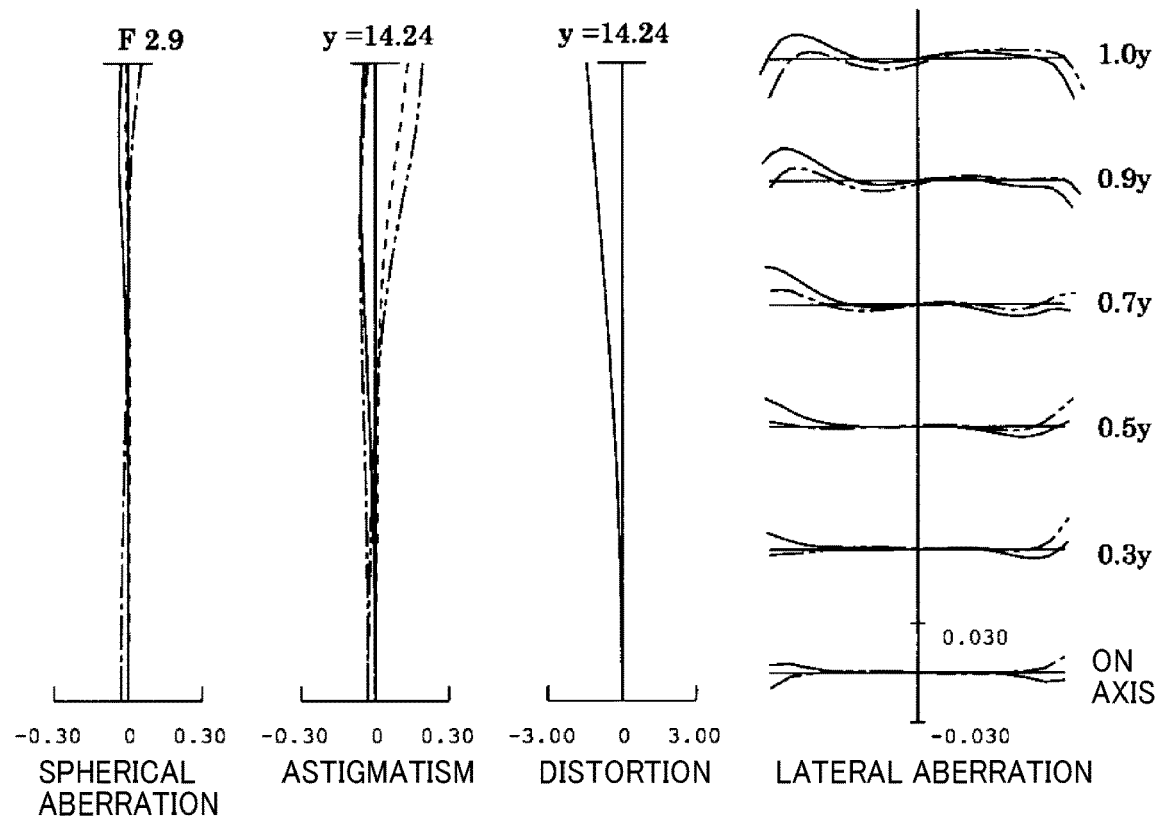
FIG. 20 includes aberration curve diagrams at an intermediate focal length of the zoom lens system according to Numerical Example 4.
Figure 21:
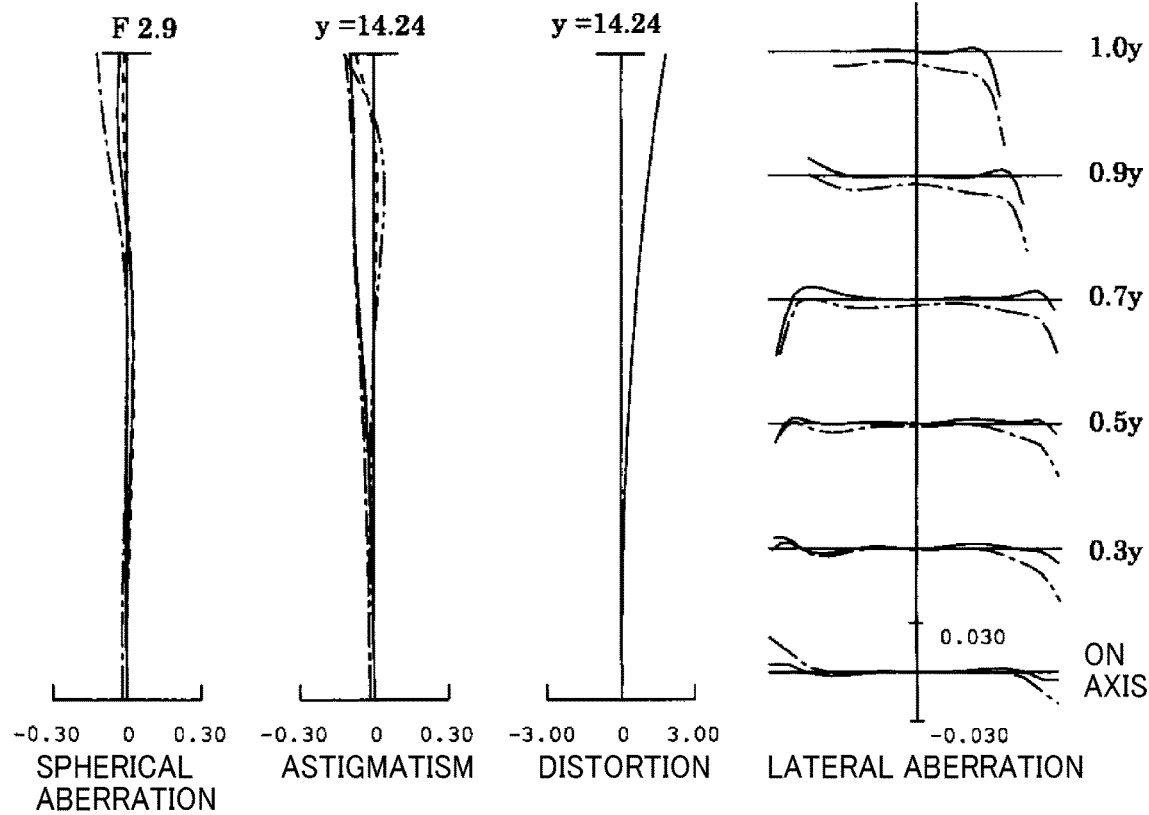
FIG. 21 includes aberration curve diagrams at a long focal-length end of the zoom lens system according to Numerical Example 4.

FIGS. 5, and 19 to 21, and Tables 21 to 25 indicate a zoom lens system according to Numerical Example 5. FIG. 5 is a lens configuration diagram. FIGS. 19, 20, and 21 are aberration curve diagrams at a short focal-length end, an intermediate focal length, and a long focal-length end. Table 21 presents surface data, Table 22 presents aspherical surface data, Table 23 presents variable distance data, Table 24 presents zoom lens group data, and Table 25 presents conditional expression data.

The lens configuration of the zoom lens system according to Numerical Example 5 is similar to the lens configuration of the zoom lens system according to Numerical Example 4 except the following point.

(1) The positive lens 32 of the third lens group G3 is not a positive meniscus lens being convex on the object side, but is a biconvex positive lens.

TABLE 21 f = 16.5~28.1~48.5, F = 2.9~2.9~2.9,
w = 42.0~26.7~46.1, Ya = 14.24

| Surface No. | R | D | Nd | vd | Glass type (glass member) |
|---|---|---|---|---|---|
| 1 | 2451.756 | 2.26 | 1.84666 | 23.78 | S-TIH53W (OHARA) |
| 2 | 165.561 | 4.46 | 1.78800 | 47.37 | S-LAH64 (OHARA) |
| 3 | 2335.532 | 0.15 | | | |
| 4 | 63.208 | 6.26 | 1.75500 | 52.32 | S-LAH97 (OHARA) |
| 5 | 181.795 | D1 | | | |
| 6* | 114.364 | 0.05 | 1.52970 | 42.70 | Optical resin |
| 7 | 73.287 | 1.50 | 1.83481 | 42.74 | S-LAH55VS (OHARA) |
| 8 | 16.000 | 9.01 | | | |
| 9 | −112.009 | 1.40 | 1.73400 | 51.47 | S-LAL59 (OHARA) |
| 10 | 44.410 | 5.52 | 1.68948 | 31.02 | L-TIM28 (OHARA) |
| 11* | −85.317 | D2 | | | |
| 12 | −27.853 | 1.40 | 1.60300 | 65.44 | S-PHM53 (OHARA) |
| 13 | 191.609 | 3.02 | 1.85478 | 24.80 | S-NBH56 (OHARA) |
| 14 | −128.098 | D3 | | | |
| 15 | 34.776 | 6.49 | 1.55332 | 71.68 | M-FCD500 (HOYA) |
| 16 | −58.842 | 1.00 | | | |
| 17 | Stop | 2.30 | | | |
| 18* | 56.494 | 6.22 | 1.61881 | 63.85 | M-PCD4 (HOYA) |
| 19 | −33.032 | 1.40 | 1.84666 | 23.78 | S-TIH53W (OHARA) |
| 20 | −79.415 | D4 | | | |
| 21 | −147.237 | 1.40 | 2.00100 | 29.13 | TAFD55 (HOYA) |
| 22 | 107.016 | 1.16 | | | |
| 23 | −135.833 | 1.40 | 1.80610 | 40.93 | S-LAH53V (OHARA) |
| 24 | 25.162 | 3.71 | 1.94595 | 17.98 | FDS18-W (HOYA) |
| 25 | 102.481 | D5 | | | |
| 26 | 107.499 | 1.40 | 1.85478 | 24.80 | S-NBH56 (OHARA) |
| 27 | 26.020 | 5.78 | 1.49700 | 81.54 | S-FPL51 (OHARA) |
| 28 | −54.639 | 0.15 | | | |

TABLE 21-continued f = 16.5~28.1~48.5, F = 2.9~2.9~2.9,
w = 42.0~26.7~46.1, Ya = 14.24

| Surface No. | R | D | Nd | vd | Glass type (glass member) |
|---|---|---|---|---|---|
| 29* | 58.071 | 5.89 | 1.49710 | 81.56 | M-FCD1 (HOYA) |
| 30 | −40.822 | BF | | | |

*is a rotation-symmetrical aspherical surface.

TABLE 22

| Surface No. | K | A4 | A6 | A8 | A10 |
|---|---|---|---|---|---|
| 6 | 0 | 1.20367E−05 | −2.07979E−08 | 1.96627E−11 | −1.80585E−14 |
| 11 | 28.84614 | −6.92047E−08 | 9.39420E−10 | −1.20445E−10 | 4.12078E−13 |
| 18 | 0 | −9.05652E−06 | −1.05668E−08 | 3.82396E−12 | −4.30322E−14 |
| 29 | 0 | −3.22815E−06 | 1.43652E−08 | −6.60275E−11 | 2.01020E−13 |

TABLE 23

| | D1 | D2 | D3 | D4 | D5 | BF |
|---|---|---|---|---|---|---|
| Short focal-length end f = 16.5 | 1.000 | 7.993 | 23.724 | 2.000 | 12.349 | 38.614 |
| Itermediate focal length f = 28.1 | 13.985 | 8.005 | 10.125 | 7.970 | 6.419 | 46.297 |
| Long focal-length end f = 48.5 | 31.376 | 8.847 | 2.000 | 12.349 | 2.000 | 58.980 |

TABLE 24

| Group | Focal length |
|---|---|
| First lens group | 131.3 |
| Second lens group | −24.65 |
| Third lens group | −75.24 |
| Fourth lens group | 27.40 |
| Fifth lens group | −37.90 |
| Sixth lens group | 41.67 |
| First to third lens groups | Short focal-length end: −19.11, Long focal-length end: −26.69 |
| Rear lens group | Short focal-length end: 42.50, Long focal-length end: 37.16 |

TABLE 25

| (1) Twt/Twm | 0.09 |
|---|---|
| (2) frw/Ya | 2.98 |
| (3) |f3/ffw| | 3.94 |
| (4) |f3/fft| | 2.82 |
| (5) f2/f3 | 0.33 |
| (6) R3gf/R2gr | 0.33 |
| (7) Bfw/Ya | 2.71 |
| (8) Bfw/fw | 2.35 |
| (9) f1/fw | 3.09 |
| (10) vpMAX | 31.0 |
| (11) f1/Twt1 | 4.40 |
| (12) f1/t23w | −8.65 |
| (13) D(2R − 3F)T/D(2F − 3R)T | 0.29 |
| (14) (1 − Mt^2) × MRt^2 | 2.21 |
| (15) f4/f6 | 0.66 |
| (16) |fN/frm| | 0.94 |
| (17) v3n/v3p | 2.64 |
| (18) N3p | 1.85478 |
| (19) N3a | 1.72889 |

Numerical Example 6

Figure 6A:
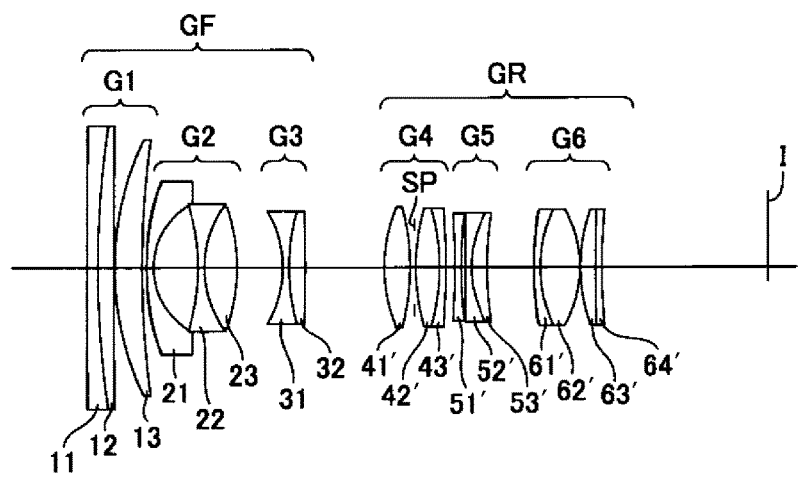
FIGS. 6A, 6B, and 6C each is a lens configuration diagram of a zoom lens system according to Numerical Example 6.
Figure 6B:
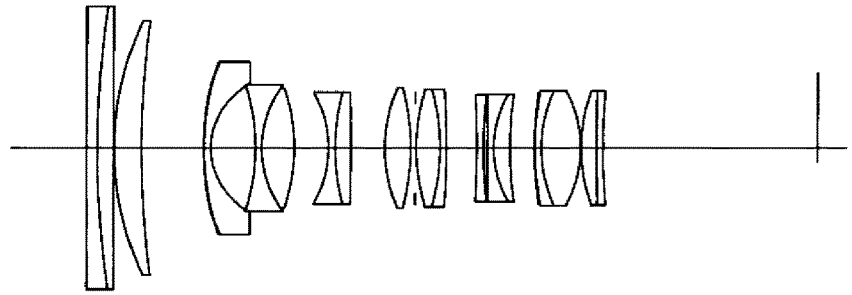
Figure 6C:
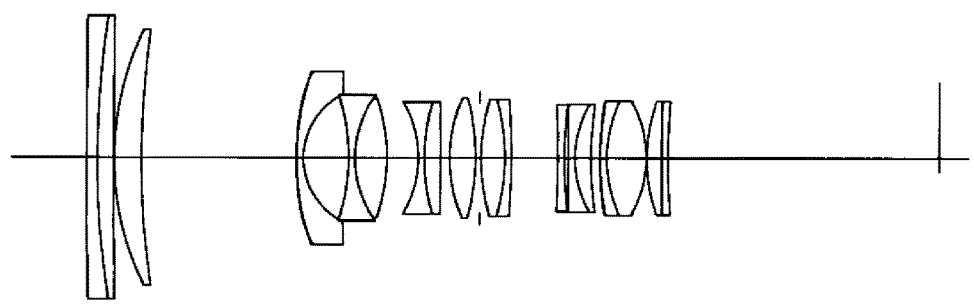
Figure 22:
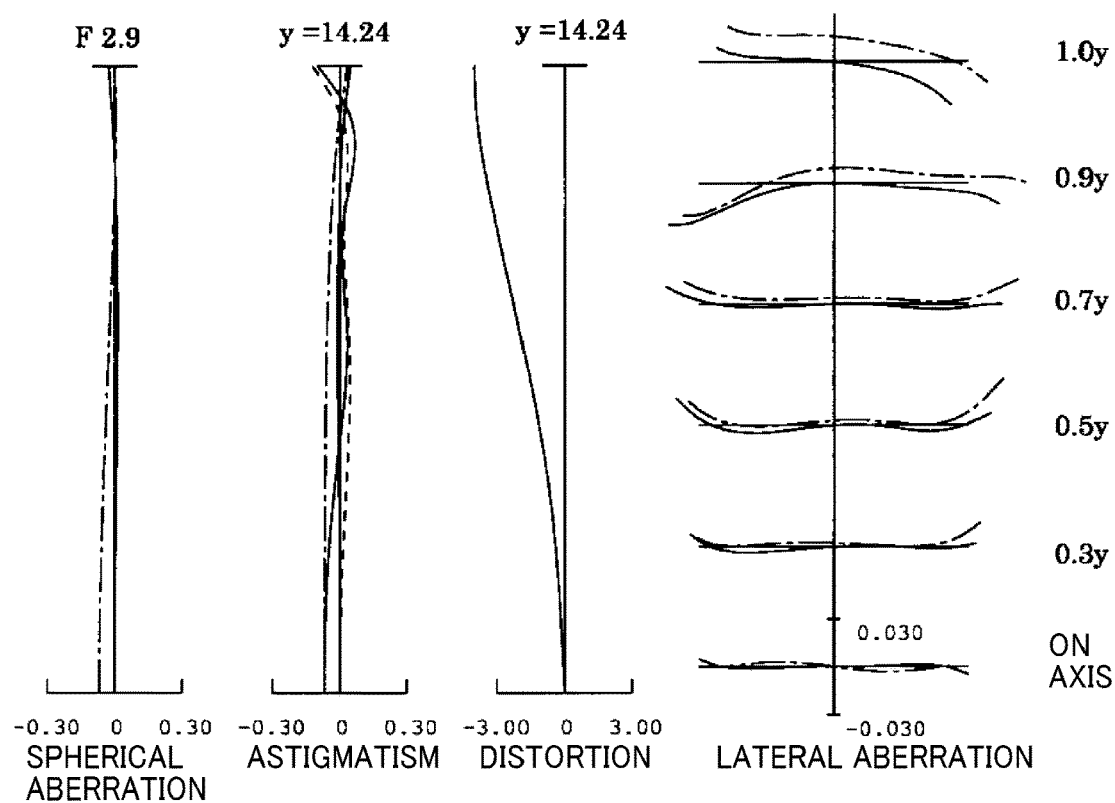
FIG. 22 includes aberration curve diagrams at a short focal-length end of the zoom lens system according to Numerical Example 5.
Figure 23:
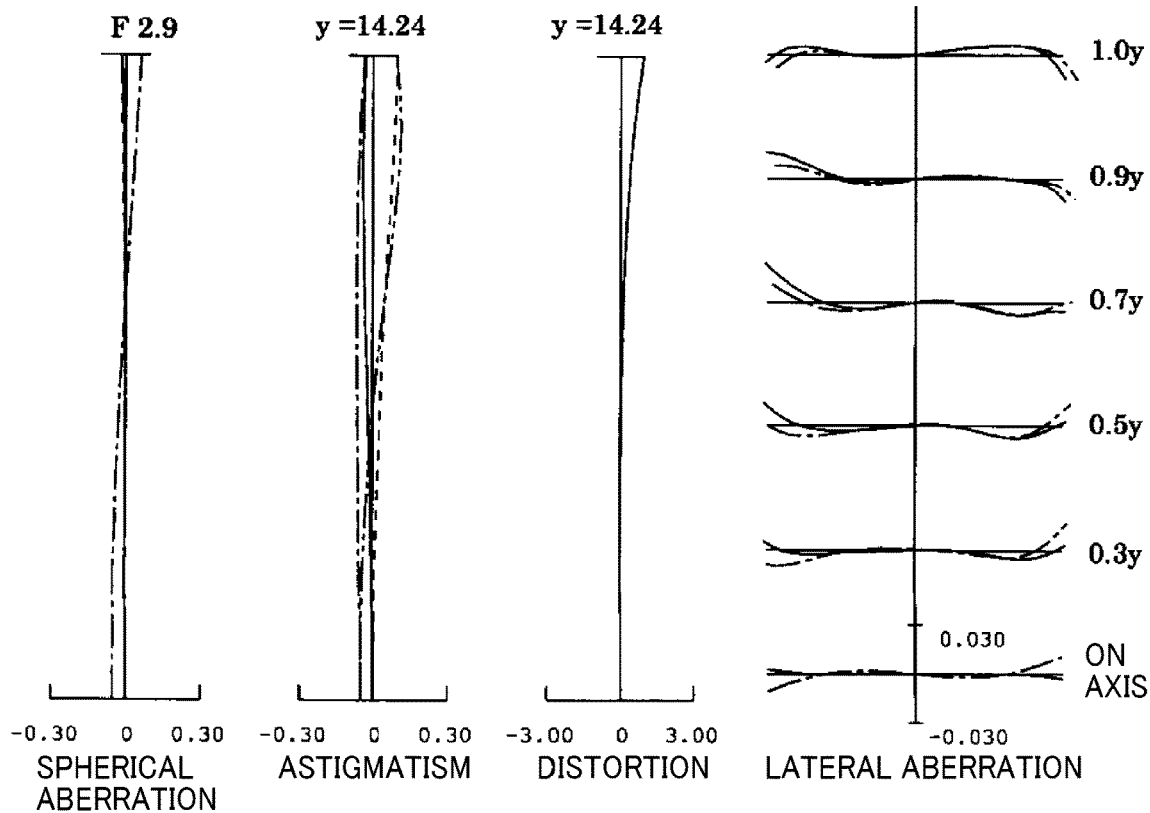
FIG. 23 includes aberration curve diagrams at an intermediate focal length of the zoom lens system according to Numerical Example 5.
Figure 24:
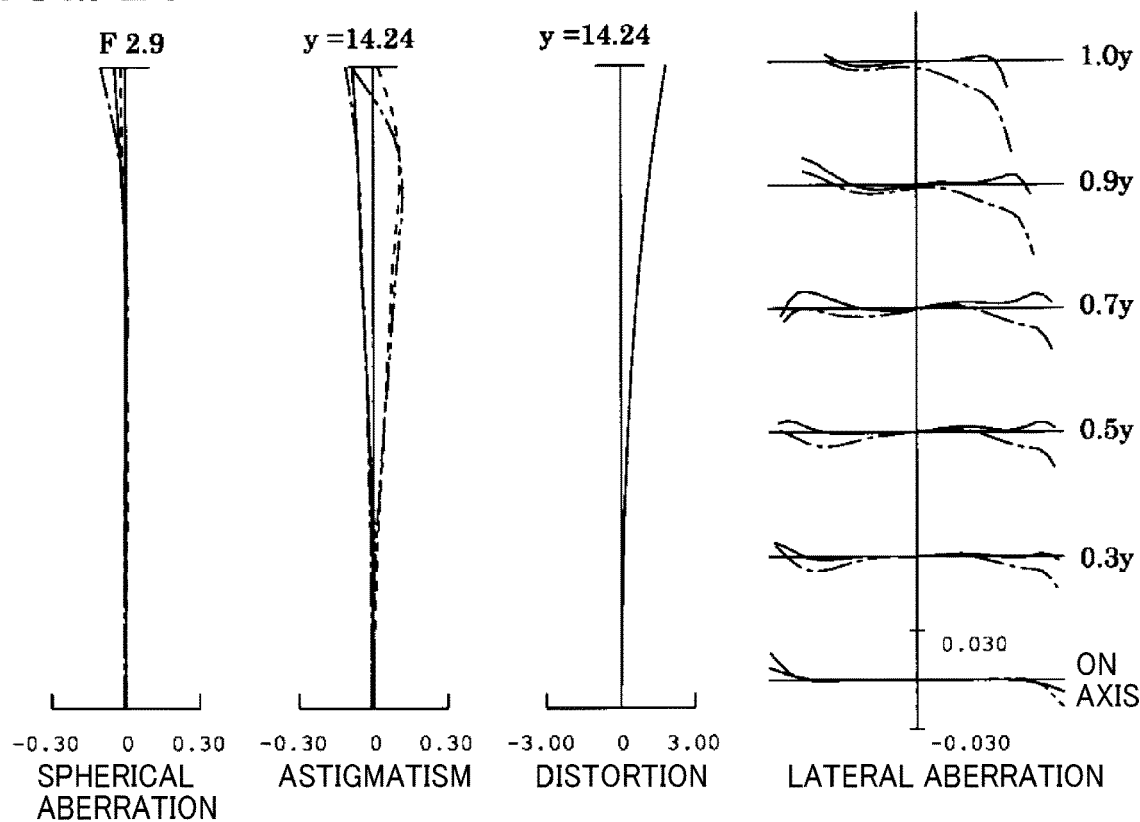
FIG. 24 includes aberration curve diagrams at a long focal-length end of the zoom lens system according to Numerical Example 5.
Figure 25:
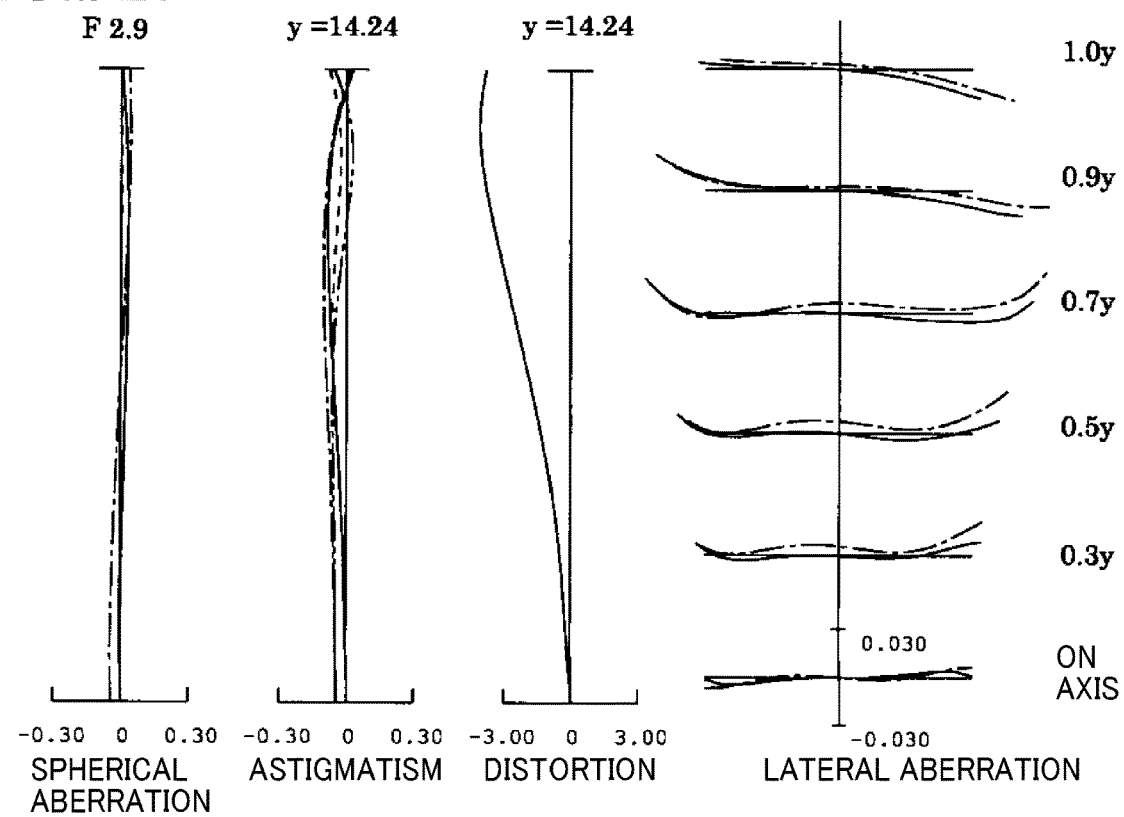
FIG. 25 includes aberration curve diagrams at a short focal-length end of the zoom lens system according to Numerical Example 6.
Figure 26:
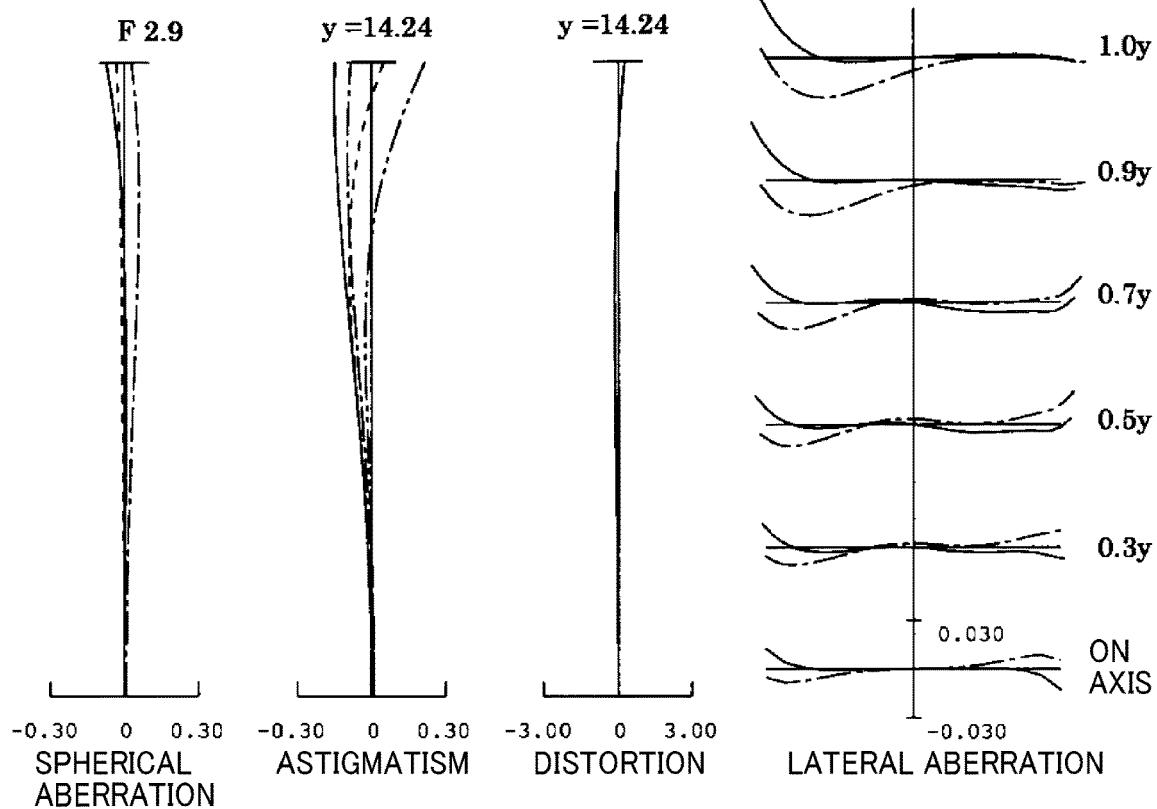
FIG. 26 includes aberration curve diagrams at an intermediate focal length of the zoom lens system according to Numerical Example 6.
Figure 27:
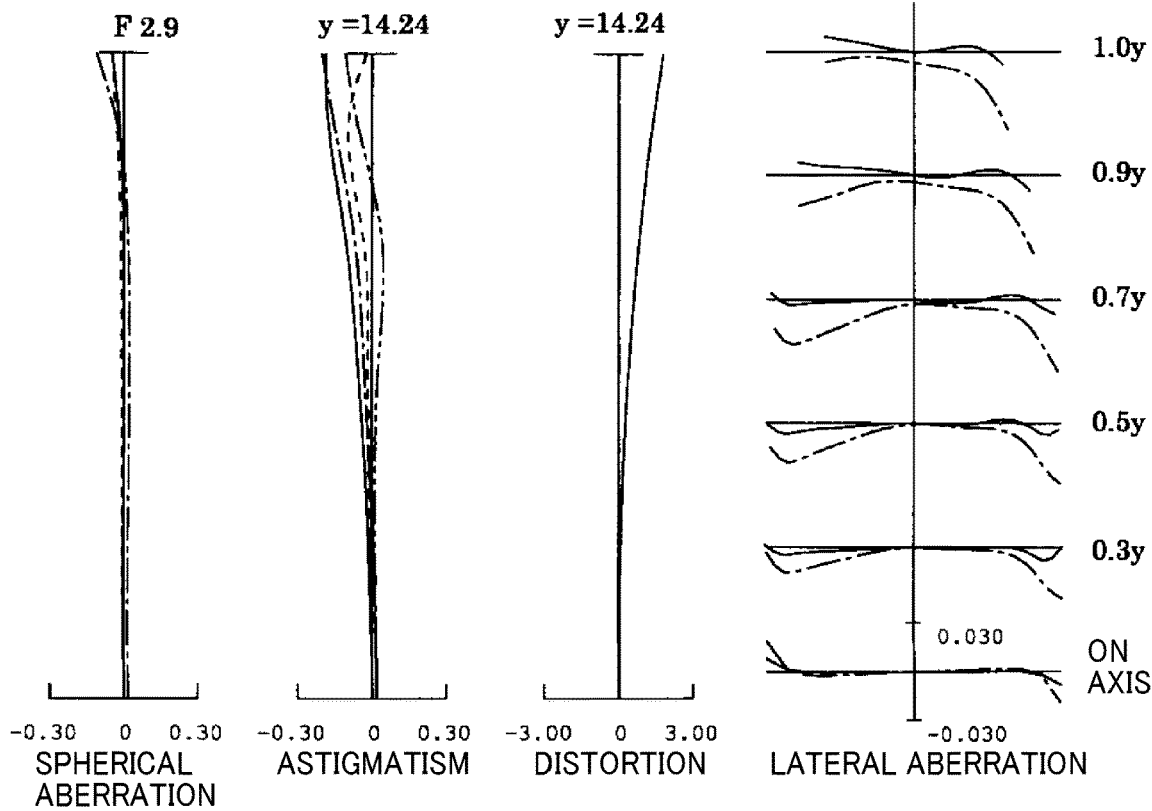
FIG. 27 includes aberration curve diagrams at a long focal-length end of the zoom lens system according to Numerical Example 6.

FIGS. 6, and 22 to 24, and Tables 26 to 30 indicate a zoom lens system according to Numerical Example 6. FIG. 6 is a lens configuration diagram. FIGS. 22, 23, and 24 are aberration curve diagrams at a short focal-length end, an intermediate focal length, and a long focal-length end. Table 26 presents surface data, Table 27 presents aspherical surface data, Table 28 presents variable distance data, Table 29 presents zoom lens group data, and Table 30 presents conditional expression data.

The lens configuration of the zoom lens system according to Numerical Example 6 is similar to the lens configuration of the zoom lens system according to Numerical Example 5 except the following points.

(1) The biconvex positive lens 23 of the second lens group G2 is not an aspherical lens.

(2) The negative lens 52' of the fifth lens group G5 is not a biconcave negative lens, but is a negative meniscus lens being convex on the object side.

(3) The sixth lens group G6 includes, sequentially from the object side, a negative meniscus lens 61' being convex on the object side, a biconvex positive lens 62', a positive meniscus lens 63' being convex on the object side, and a negative meniscus lens 64' being convex on the object side. The negative meniscus lens 61' is made of a hybrid lens in which an aspherical layer made of a synthetic resin material is bonded on a surface on the object side of a glass lens. The negative meniscus lens 61' and the biconvex positive lens 62' are cemented to each other. The positive meniscus lens 63' and the negative meniscus lens 64' are cemented to each other.

TABLE 26 f = 16.4~28.2~48.6, F = 2.9~2.9~2.9, w = 42.0~26.7~16.1,
Ya = 14.24

| Surface No. | R | D | Nd | vd | Glass type (glass member) |
|---|---|---|---|---|---|
| 1 | 2691.580 | 2.40 | 1.94595 | 17.98 | FDS18-W (HOYA) |
| 2 | 236.756 | 3.54 | 1.80400 | 46.53 | S-LAH65VS (OHARA) |
| 3 | 5547.365 | 0.15 | | | |
| 4 | 72.410 | 6.02 | 1.80400 | 46.53 | S-LAH65VS (OHARA) |
| 5 | 230.547 | D1 | | | |
| 6* | 95.297 | 0.05 | 1.51640 | 52.20 | Optical resin |
| 7 | 64.508 | 1.50 | 1.80400 | 46.53 | S-LAH65VS (OHARA) |
| 8 | 17.355 | 9.98 | | | |
| 9 | −50.114 | 1.40 | 1.80400 | 46.53 | S-LAH65VS (OHARA) |
| 10 | 25.471 | 7.21 | 1.69895 | 30.13 | S-TIM35 (OHARA) |
| 11 | −45.259 | D2 | | | |

TABLE 26-continued f = 16.4~28.2~48.6, F = 2.9~2.9~2.9, w = 42.0~26.7~16.1, Ya = 14.24

| Surface No. | R | D | Nd | vd | Glass type (glass member) |
|---|---|---|---|---|---|
| 12 | -27.255 | 1.40 | 1.65160 | 58.55 | S-LAL7 (OHARA) |
| 13 | 51.605 | 3.55 | 1.90366 | 31.31 | TAFD25 (HOYA) |
| 14 | -486.016 | D3 | | | |
| 15 | 37.238 | 5.71 | 1.59522 | 67.73 | S-FPM2 (OHARA) |
| 16 | -56.263 | 1.00 | | | |
| 17 | Stop | 0.20 | | | |
| 18* | 43.481 | 5.28 | 1.59201 | 67.02 | M-PCD51 (HOYA) |
| 19 | -51.709 | 1.40 | 1.94595 | 17.98 | FDS18-W (HOYA) |
| 20 | -216.709 | D4 | | | |
| 21 | -226.901 | 1.40 | 1.90525 | 35.04 | S-LAH93 (OHARA) |
| 22 | 107.748 | 0.91 | | | |
| 23 | 2425.350 | 1.40 | 1.89190 | 37.13 | S-LAH92 (OHARA) |
| 24 | 26.148 | 3.55 | 1.94595 | 17.98 | FDS18-W (HOYA) |
| 25 | 89.414 | D5 | | | |
| 26* | 74.669 | 0.08 | 1.51640 | 52.20 | Optical resin |
| 27 | 78.667 | 1.40 | 1.92119 | 23.96 | FDS24 (HOYA) |
| 28 | 32.953 | 8.72 | 1.49700 | 81.61 | FCD1 (HOYA) |
| 29 | -28.987 | 0.15 | | | |
| 30 | 41.11 | 3.40 | 1.49700 | 81.61 | FCD1 (HOYA) |
| 31 | 535.828 | 1.40 | 1.90043 | 37.37 | TAFD37 (HOYA) |
| 32 | 159.099 | BF | | | |

*is a rotation-symmetrical aspherical surface.

TABLE 27

| Surface No. | K | A4 | A6 | A8 | A10 |
|---|---|---|---|---|---|
| 6 | 0 | 1.13949E-05 | -1.29877E-08 | 1.78064E-11 | -7.48111E-15 |
| 18 | 0 | -7.64091E-06 | -5.79808E-09 | -2.39943E-11 | 1.32093E-14 |
| 26 | 0 | -8.66387E-06 | -2.62725E-10 | 6.88313E-11 | -1.98047E-13 |

TABLE 28

| | D1 | D2 | D3 | D4 | D5 | BF |
|---|---|---|---|---|---|---|
| Short focal-length end f = 16.4 | 1.000 | 10.133 | 17.453 | 2.000 | 10.344 | 37.004 |
| Itermediate focal length f = 28.2 | 13.764 | 7.581 | 7.477 | 6.726 | 5.622 | 47.897 |
| Long focal-length end f = 48.6 | 34.142 | 6.947 | 2.000 | 10.344 | 2.000 | 60.358 |

TABLE 29

| Group | Focal length |
|---|---|
| First lens group | 136.1 |
| Second lens group | -26.47 |
| Third lens group | -58.96 |
| Fourth lens group | 27.53 |
| Fifth lens group | -47.75 |
| Sixth lens group | 41.79 |
| First to third lens group | Short focal-length end: -17.14, Long focal-length end: -25.18 |
| Rear lens group | Short focal-length end: 35.87, Long focal-length end: 33.13 |

TABLE 30

| (1) | Twt/Twm | -2.89 |
|---|---|---|
| (2) | frw/Ya | 2.52 |
| (3) | |f3/ffw| | 3.44 |
| (4) | |f3/fft| | 2.34 |
| (5) | f2/f3 | 0.45 |
| (6) | R3gf/R2gr | 0.60 |
| (7) | Bfw/Ya | 2.60 |
| (8) | Bfw/fw | 2.25 |
| (9) | f1/fw | 3.79 |
| (10) | vpMAX | 31.3 |
| (11) | f1/Twt1 | 3.60 |
| (12) | f1/f23w | -9.82 |
| (13) | D(2R - 3F)T/D(2F - 3R)T | 0.22 |
| (14) | (1 - Mt^2) × MRt^2 | 2.81 |
| (15) | f4/f6 | 0.66 |
| (16) | |fN/frm| | 1.38 |
| (17) | v3n/v3p | 1.87 |
| (18) | N3p | 1.90366 |
| (19) | N3a | 1.77763 |

Numerical Example 7

Figure 28:
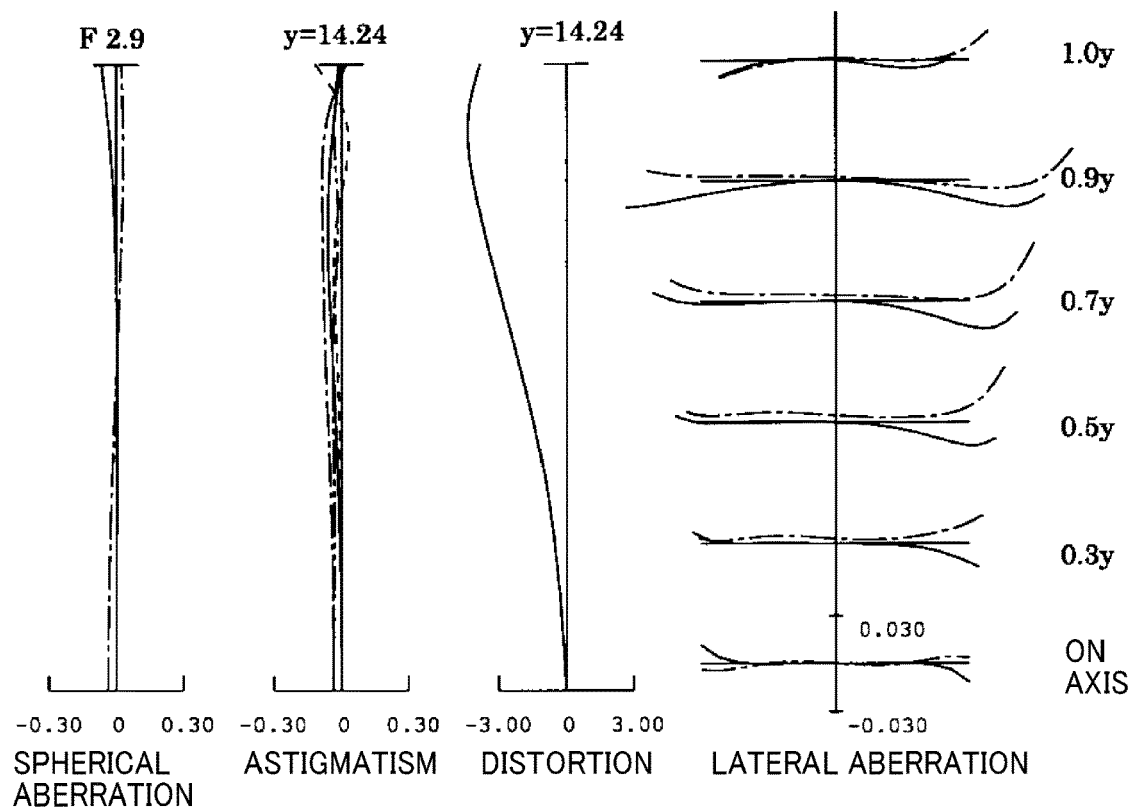
FIG. 28 includes aberration curve diagrams at a short focal-length end of the zoom lens system according to Numerical Example 7.
Figure 29:
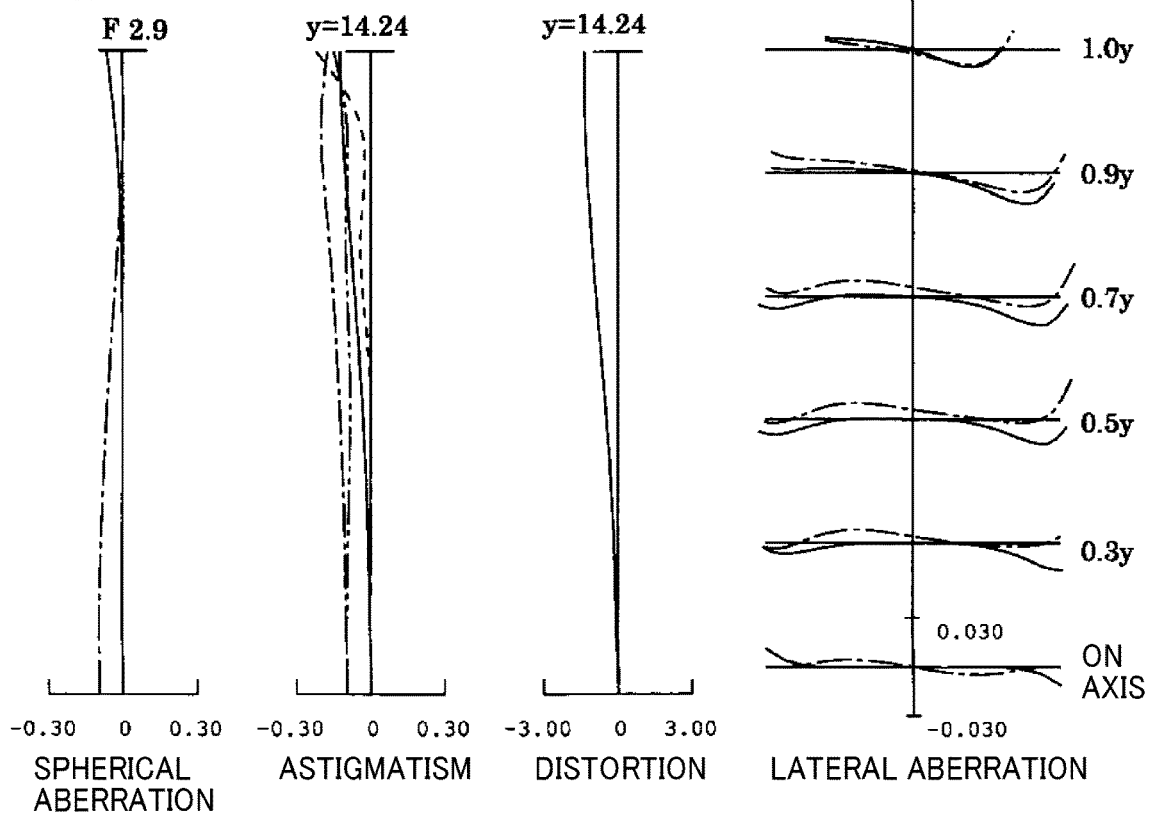
FIG. 29 includes aberration curve diagrams at an intermediate focal length of the zoom lens system according to Numerical Example 7.
Figure 30:
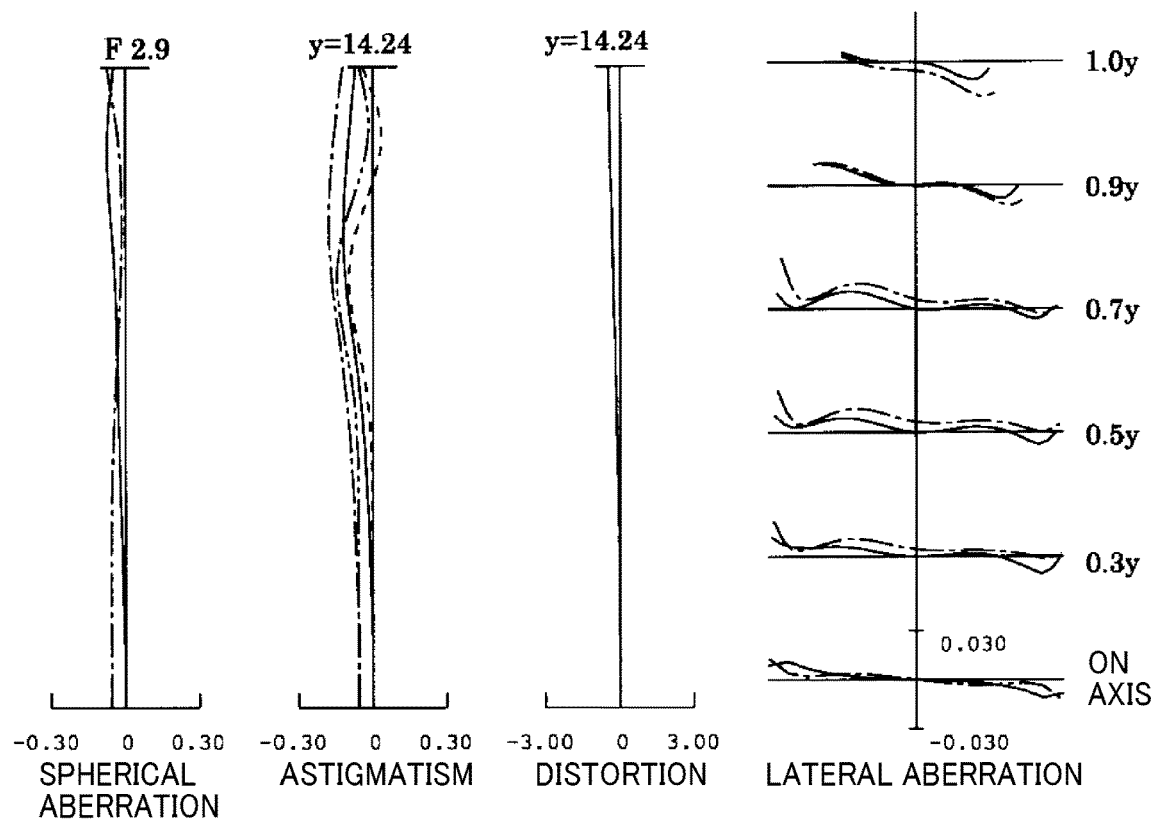
FIG. 30 includes aberration curve diagrams at a long focal-length end of the zoom lens system according to Numerical Example 7.

FIGS. 7, and 28 to 30, and Tables 31 to 35 indicate a zoom lens system according to Numerical Example 7. FIG. 7 is a lens configuration diagram. FIGS. 28, 29, and 30 are aberration curve diagrams at a short focal-length end, an intermediate focal length, and a long focal-length end. Table 31 presents surface data, Table 32 presents aspherical surface data, Table 33 presents variable distance data, Table 34 presents zoom lens group data, and Table 35 presents conditional expression data.

The zoom lens system according to Numerical Example 7 includes, sequentially from the object side, a front lens group GF and a rear lens group GR. The front lens group GF includes, sequentially from the object side, a first lens group G1 having a positive refractive power, a second lens group G2 having a negative refractive power, and a third lens group G3 having a negative refractive power. The rear lens group GR as a whole has a positive refractive power, and includes, sequentially from the object side, a fourth lens group G4 having a positive refractive power, a fifth lens group G5 having a negative refractive power, a sixth lens group G6 having a positive refractive power, and a seventh lens group G7 having a positive refractive power.

The first lens group G1 includes, sequentially from the object side, a negative meniscus lens 11A being convex on the object side, a biconvex positive lens 12A, and a positive meniscus lens 13A being convex on the object side. The negative meniscus lens 11A and the biconvex positive lens 12A are cemented to each other.

The second lens group G2 includes, sequentially from the object side, a negative meniscus lens 21A being convex on the object side, a biconcave negative lens 22A, and a biconvex positive lens 23A. The negative meniscus lens 21A is made of a hybrid lens in which an aspherical layer made of a synthetic resin material is bonded on a surface on the object side of a glass lens. The biconcave negative lens 22A and the biconvex positive lens 23A are cemented to each other.

The third lens group G3 includes, sequentially from the object side, a negative meniscus lens 31A being convex on the image side, and a positive meniscus lens 32A being convex on the image side. The negative meniscus lens 31A and the positive meniscus lens 32A are cemented to each other.

The fourth lens group G4 includes, sequentially from the object side, a biconvex positive lens 41A, an aperture stop SP, a biconvex positive lens 42A, and a negative meniscus lens 43A being convex on the image side. The biconvex positive lens 42A has an aspherical surface on a surface on the object side. The biconvex positive lens 42A and the negative meniscus lens 43A are cemented to each other.

The fifth lens group G5 includes, sequentially from the object side, a biconcave negative lens 51A, a negative meniscus lens 52A being convex on the object side, and a positive meniscus lens 53A being convex on the object side. The negative meniscus lens 52A and the positive meniscus lens 53A are cemented to each other.

The sixth lens group G6 includes, sequentially from the object side, a negative meniscus lens 61A being convex on the object side, and a biconvex positive lens 62A. The negative meniscus lens 61A is made of a hybrid lens in which an aspherical layer made of a synthetic resin material is bonded on a surface on the object side of a glass lens. The negative meniscus lens 61A and the biconvex positive lens 62A are cemented to each other.

The seventh lens group G7 includes, sequentially from the object side, a negative meniscus lens 71A being convex on the image side, and a biconvex positive lens 72A.

TABLE 31 f = 16.5~28.3~48.5, F = 2.9~2.9~2.9, w = 41.9~27.0~16.4, Ya = 14.24

| Surface No. | R | D | Nd | vd | Glass type (glass member) |
|---|---|---|---|---|---|
| 1 | 291.692 | 2.400 | 1.92286 | 20.88 | E-FDS1-W (HOYA) |
| 2 | 120.449 | 6.220 | 1.65100 | 56.16 | S-LAL54 (OHARA) |
| 3 | -548.226 | 0.150 | | | |
| 4 | 43.818 | 5.020 | 1.71299 | 53.87 | S-LAL8 (OHARA) |
| 5 | 66.449 | D1 | | | |
| 6* | 336.420 | 0.150 | 1.52972 | 42.53 | Optical resin |
| 7 | 93.659 | 1.500 | 1.77250 | 49.60 | S-LAH66 (OHARA) |
| 8 | 17.192 | 9.980 | | | |
| 9 | -49.824 | 1.400 | 1.83481 | 42.74 | S-LAH55VS (OHARA) |
| 10 | 19.857 | 7.210 | 1.78880 | 28.43 | S-NBH58 (OHARA) |
| 11 | -65.958 | D2 | | | |
| 12 | -25.418 | 1.400 | 1.81600 | 46.62 | S-LAH59 (OHARA) |
| 13 | -114.054 | 2.550 | 1.95375 | 32.32 | TAFD45 (HOYA) |
| 14 | -51.081 | D3 | | | |

TABLE 31-continued f = 16.5~28.3~48.5, F = 2.9~2.9~2.9, w = 41.9~27.0~16.4, Ya = 14.24

| Surface No. | R | D | Nd | vd | Glass type (glass member) |
|---|---|---|---|---|---|
| 15 | 35.236 | 5.710 | 1.67300 | 38.25 | S-NBH52V (OHARA) |
| 16 | -56.235 | 1.000 | | | |
| 17 | Stop | 0.200 | | | |
| 18* | 41.527 | 5.280 | 1.61881 | 63.85 | M-PCD4 (HOYA) |
| 19 | -32.696 | 1.400 | 1.92286 | 20.88 | E-FDS1-W (HOYA) |
| 20 | -146.106 | D4 | | | |
| 21 | -104.542 | 1.200 | 2.00100 | 29.13 | TAFD55 (HOYA) |
| 22 | 47.405 | 1.310 | | | |
| 23 | 404.479 | 1.200 | 2.00100 | 29.13 | TAFD55 (HOYA) |
| 24 | 22.161 | 3.550 | 1.94595 | 17.98 | FDS18-W (HOYA) |
| 25 | 2810.371 | D5 | | | |
| 26* | 64.096 | 0.162 | 1.52972 | 42.53 | Optical resin |
| 27 | 80.539 | 1.400 | 1.92119 | 23.96 | FDS24 (HOYA) |
| 28 | 27.502 | 6.720 | 1.61800 | 63.33 | S-PHM52 (OHARA) |
| 29 | -31.729 | D6 | | | |
| 30 | -38.041 | 1.400 | 1.85883 | 30.00 | NBFD30 (HOYA) |
| 31 | -74.136 | 0.200 | | | |
| 32 | 494.049 | 4.600 | 1.75500 | 52.32 | S-LAH97 (OHARA) |
| 33 | -45.462 | BF | | | |

*is a rotation-symmetrical aspherical surface.

TABLE 32

| Surface No. | K | A4 | A6 | A8 | A10 |
|---|---|---|---|---|---|
| 6 | 0 | 1.67962E-05 | -2.80721E-08 | 4.50181E-11 | -3.41388E-14 |
| 18 | 0 | -6.55265E-06 | -1.22352E-08 | 1.11553E-11 | -8.32023E-14 |
| 26 | 0 | -7.85801E-06 | 1.97385E-08 | -2.73144E-11 | 0.00000E+00 |

TABLE 33

| | D1 | D2 | D3 | D4 | D5 | D6 | BF |
|---|---|---|---|---|---|---|---|
| Short focal-length end f = 16.5 | 1.270 | 13.559 | 12.011 | 2.000 | 8.843 | 2.200 | 39.805 |
| Intermediate focal length f = 28.3 | 15.791 | 8.124 | 6.877 | 5.729 | 5.114 | 11.880 | 39.805 |
| Long focal-length end f = 48.5 | 32.305 | 7.824 | 2.148 | 8.595 | 2.248 | 26.784 | 39.805 |

TABLE 34

| Group | Focal length |
|---|---|
| First lens group | 122.4 |
| Second lens group | -21.35 |
| Third lens group | -74.65 |
| Fourth lens group | 24.24 |
| Fifth lens group | -32.01 |
| Sixth lens group | 46.93 |
| Seventh lens group | 123.6 |
| First to third lens groups | Short focal-length end: -16.83, Long focal-length end: -26.15 |
| Rear lens group | Short focal-length end: 37.33, Long focal-length end: 44.70 |

TABLE 35

| (1) | Twt/Twm | -10.11 |
|---|---|---|
| (2) | frw/Ya | 2.62 |
| (3) | |f3/ffw| | 4.44 |
| (4) | |f3/fft| | 2.85 |
| (5) | f2/f3 | 0.29 |
| (6) | R3gf/R2gr | 0.39 |
| (7) | Bfw/Ya | 2.80 |
| (8) | Bfw/fw | 2.42 |
| (9) | f1/fw | 3.28 |
| (10) | vpMAX | 32.3 |

TABLE 35-continued

| (11) | f1/Twt1 | 3.06 |
|---|---|---|
| (12) | f1/f23w | −9.39 |
| (13) | D(2R − 3F)T/D(2F − 3R)T | 0.24 |
| (14) | (1 − Mt^2) × MRt^2 | 2.19 |
| (15) | f4/f6 | 0.52 |
| (16) | \|fN/frm\| | 0.80 |
| (17) | v3n/v3p | 1.44 |
| (18) | N3p | 1.9538 |
| (19) | N3a | 1.8849 |

Numerical Example 8

Figure 31:
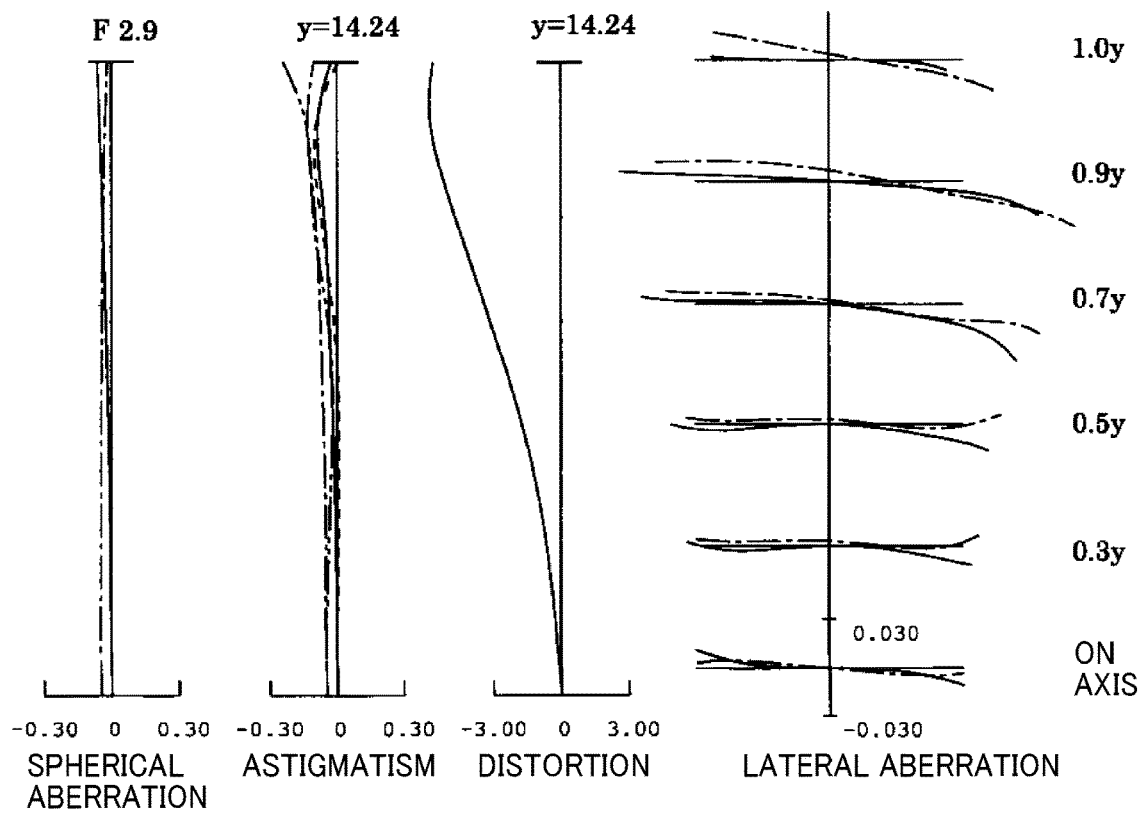
FIG. 31 includes aberration curve diagrams at a short focal-length end of the zoom lens system according to Numerical Example 8.
Figure 32:
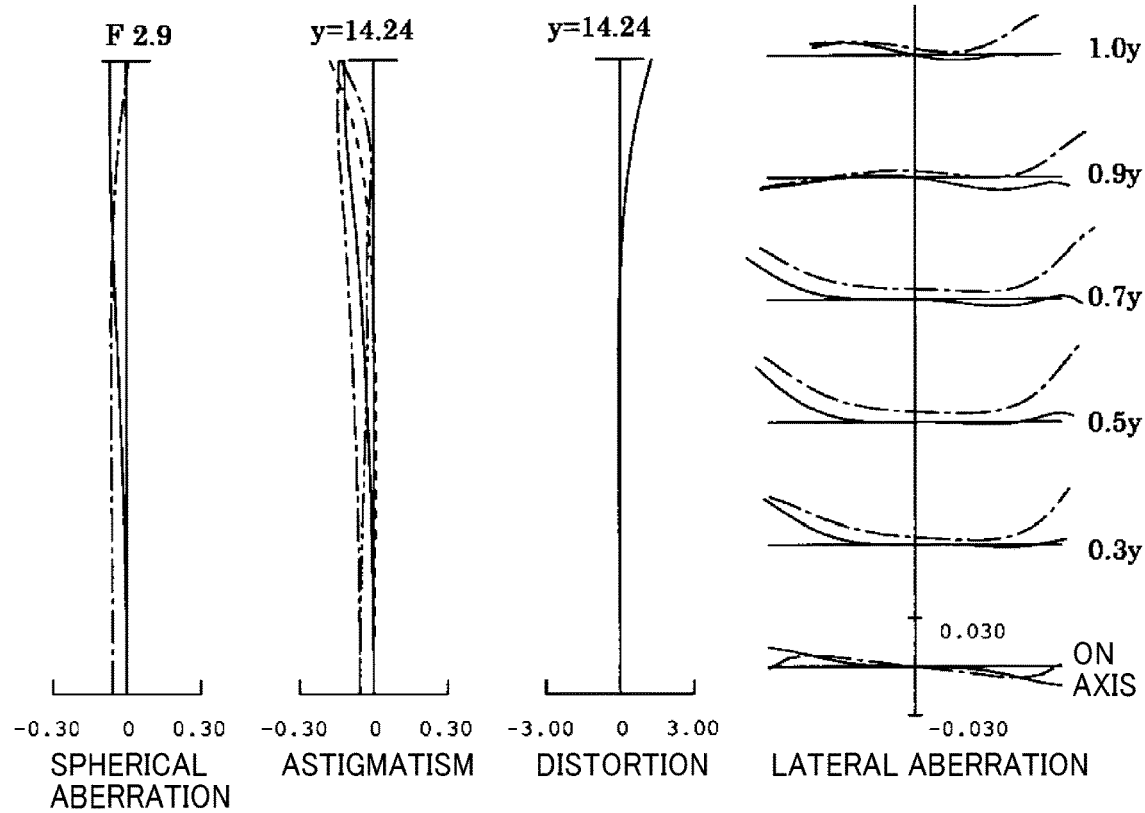
FIG. 32 includes aberration curve diagrams at an intermediate focal length of the zoom lens system according to Numerical Example 8.
Figure 33:
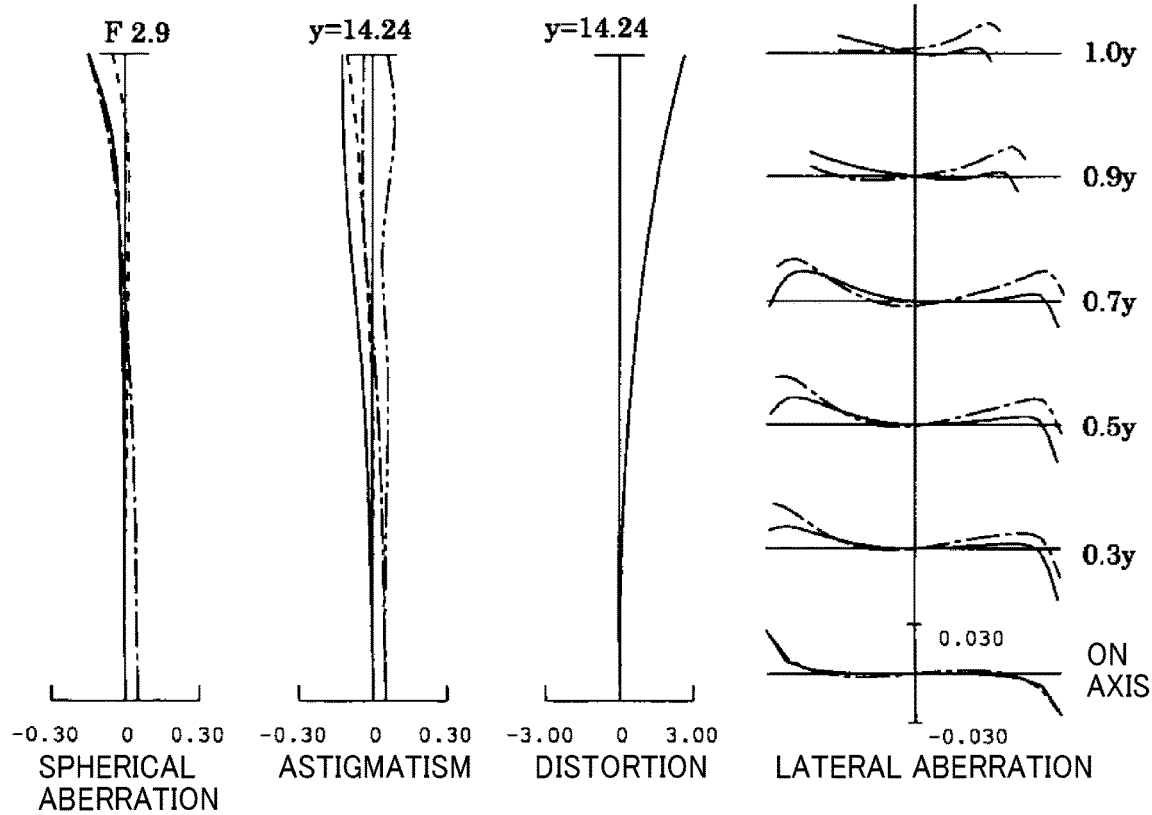
FIG. 33 includes aberration curve diagrams at a long focal-length end of the zoom lens system according to Numerical Example 8.

FIGS. 8, and 31 to 33, and Tables 36 to 40 indicate a zoom lens system according to Numerical Example 8. FIG. 8 is a lens configuration diagram. FIGS. 31, 32, and 33 are aberration curve diagrams at a short focal-length end, an intermediate focal length, and a long focal-length end. Table 36 presents surface data, Table 37 presents aspherical surface data, Table 38 presents variable distance data, Table 39 presents zoom lens group data, and Table 40 presents conditional expression data.

The zoom lens system according to Numerical Example 8 includes, sequentially from the object side, a front lens group GF and a rear lens group GR. The front lens group GF includes, sequentially from the object side, a first lens group G1 having a positive refractive power, a second lens group G2 having a negative refractive power, and a third lens group G3 having a negative refractive power. The rear lens group GR as a whole has a positive refractive power, and includes, sequentially from the object side, a fourth lens group G4 having a negative refractive power, a fifth lens group G5 having a positive refractive power, and a sixth lens group G6 having a positive refractive power.

The first lens group G1 includes, sequentially from the object side, a negative meniscus lens 11B being convex on the object side, a positive meniscus lens 12B being convex on the object side, and a positive meniscus lens 13B being convex on the object side. The negative meniscus lens 11B and the positive meniscus lens 12B are cemented to each other.

The second lens group G2 includes, sequentially from the object side, a negative meniscus lens 21B being convex on the object side, a biconcave negative lens 22B, and a biconvex positive lens 23B. The negative meniscus lens 21A has an aspherical surface on a surface on the object side. The biconcave negative lens 22B and the biconvex positive lens 23B are cemented to each other.

The third lens group G3 includes, sequentially from the object side, a biconcave negative lens 31B and a biconvex positive lens 32B. The biconcave negative lens 31B and the biconvex positive lens 32B are cemented to each other.

The fourth lens group G4 includes, sequentially from the object side, a biconcave negative lens 41B and a positive meniscus lens 42B being convex on the object side. The biconcave negative lens 41B has an aspherical surface on a surface on the object side. The biconcave negative lens 41B and the positive meniscus lens 42B are cemented to each other.

The fifth lens group G5 includes, sequentially from the object side, an aperture stop SP, a biconvex positive lens 51B, a biconvex positive lens 52B, and a biconcave negative lens 53B. The biconvex positive lens 51B has an aspherical surface on a surface on the object side. The biconvex positive lens 52B and the biconcave negative lens 53B are cemented to each other.

The sixth lens group G6 includes, sequentially from the object side, a biconvex positive lens 61B, a biconvex positive lens 62B, a biconcave negative lens 63B, and a biconvex positive lens 64B. The biconvex positive lens 61B has an aspherical surface on a surface on the object side. The biconcave negative lens 63B and the biconvex positive lens 64B are cemented to each other.

TABLE 36 f = 15.5~26.0~43.7, F = 2.9~2.9~2.9, w = 44.3~28.4~17.6,
Ya = 14.24

| Surface No. | R | D | Nd | vd | Glass type (glass member) |
|---|---|---|---|---|---|
| 1 | 199.785 | 2.170 | 1.89286 | 20.36 | S-NPH4 (OHARA) |
| 2 | 102.000 | 4.500 | 1.51742 | 52.43 | S-NSL36 (OHARA) |
| 3 | 252.412 | 0.150 | | | |
| 4 | 73.641 | 5.400 | 1.69680 | 55.53 | S-LAL14 (OHARA) |
| 5 | 462.457 | D1 | | | |
| 6* | 81.668 | 1.600 | 1.95150 | 29.83 | M-TAFD405 (HOYA) |
| 7 | 18.244 | 10.500 | | | |
| 8 | −43.000 | 1.200 | 1.72916 | 54.09 | S-LAL19 (OHARA) |
| 9 | 36.802 | 6.500 | 1.90366 | 31.31 | TAFD25 (HOYA) |
| 10 | −52.610 | D2 | | | |
| 11 | −40.000 | 0.900 | 1.78800 | 47.37 | S-LAH64 (OHARA) |
| 12 | 36.096 | 4.020 | 1.85478 | 24.80 | S-NBH56 (OHARA) |
| 13 | −110.287 | D3 | | | |
| 14* | −172.999 | 1.300 | 1.80139 | 45.45 | M-TAF31 (HOYA) |
| 15 | 30.000 | 3.200 | 1.67270 | 32.10 | S-T1M25 (OHARA) |
| 16 | 141.865 | D4 | | | |
| 17 | Stop | 1.400 | | | |
| 18* | 45.066 | 5.000 | 1.88202 | 37.22 | M-TAFD307 (HOYA) |
| 19 | −104.442 | 0.200 | | | |
| 20 | 40.401 | 6.800 | 1.43875 | 94.94 | S-FPL53 (OHARA) |
| 21 | −39.367 | 1.200 | 2.05090 | 26.94 | TAFD65 (HOYA) |
| 22 | 102.564 | D5 | | | |
| 23* | 39.054 | 5.000 | 1.59201 | 67.02 | M-PCD51 (HOYA) |
| 24 | −142.331 | 6.804 | | | |
| 25 | 57.370 | 4.000 | 1.90043 | 37.37 | TAFD37A (HOYA) |
| 26 | −169.112 | 0.200 | | | |
| 27 | −721.402 | 1.100 | 1.88300 | 40.80 | TAFD30 (HOYA) |
| 28 | 19.345 | 6.500 | 1.49710 | 81.56 | M-FCD1 (HOYA) |
| 29* | −84.510 | BF | | | |

*is a rotation-symmetrical aspherical surface.

TABLE 37

| Surface No. | K | A4 | A6 | A8 | A10 |
|---|---|---|---|---|---|
| 6 | 0 | 3.64346E−06 | −2.47870E−09 | −4.61506E−13 | −7.42412E−17 |
| 14 | 0 | 3.17941E−06 | 4.43317E−09 | 0.00000E+00 | 0.00000E+00 |
| 18 | 0 | −9.18320E−07 | 1.42386E−09 | 4.71883E−13 | 0.00000E+00 |
| 23 | 0 | −4.01194E−06 | −2.63557E−10 | 0.00000E+00 | 0.00000E+00 |
| 29 | 0 | 8.71569E−06 | 1.73183E−09 | 1.40611E−11 | 0.00000E+00 |

TABLE 38

| | D1 | D2 | D3 | D4 | D5 | BF |
|---|---|---|---|---|---|---|
| Short focal-length end f = 15.5 | 1.270 | 3.251 | 11.988 | 14.454 | 16.804 | 35.592 |
| Intermediate focal length f = 26.0 | 14.385 | 10.741 | 4.498 | 7.158 | 7.047 | 50.304 |
| Long focal-length end f = 43.7 | 30.919 | 13.039 | 2.200 | 3.000 | 2.270 | 67.802 |

TABLE 39

| Group | Focal length |
|---|---|
| First lens group | 149.1 |
| Second lens group | −34.85 |
| Third lens group | −103.0 |
| Fourth lens group | −72.60 |
| Fifth lens group | 54.75 |
| Sixth lens group | 41.02 |
| First to third lens groups | Short focal-length end: −27.82, Long focal-length end: −35.09 |
| Rear lens group | Short focal-length end: 34.64, Long focal-length end: 38.60 |

TABLE 40

| (1) Twt/Twm | −2.66 |
|---|---|
| (2) few/Ya | 2.43 |
| (3) |f3/ffw| | 3.70 |
| (4) |f3/fft| | 2.94 |
| (5) f2/f3 | 0.34 |
| (6) R3gf/R2gr | 0.76 |
| (7) Bfw/Ya | 2.50 |
| (8) Bfw/fw | 2.30 |
| (9) f1/fw | 4.30 |
| (10) vpMAX | 31.3 |
| (11) f1/Twt1 | 4.82 |
| (12) f1/f23w | −6.71 |
| (13) D(2R − 3F)T/D(2F − 3R)T | 0.35 |
| (14) (1 _31 _0 Mt^2) × MRt^2 | 1.07 |
| (15) f4/f6 | — (not applicable) |
| (16) |fN/frm| | 1.98 |
| (17) v3n/v3p | 1.91 |
| (18) N3p | 1.8548 |
| (19) N3a | 1.8214 |

Numerical Example 9

Figure 34:
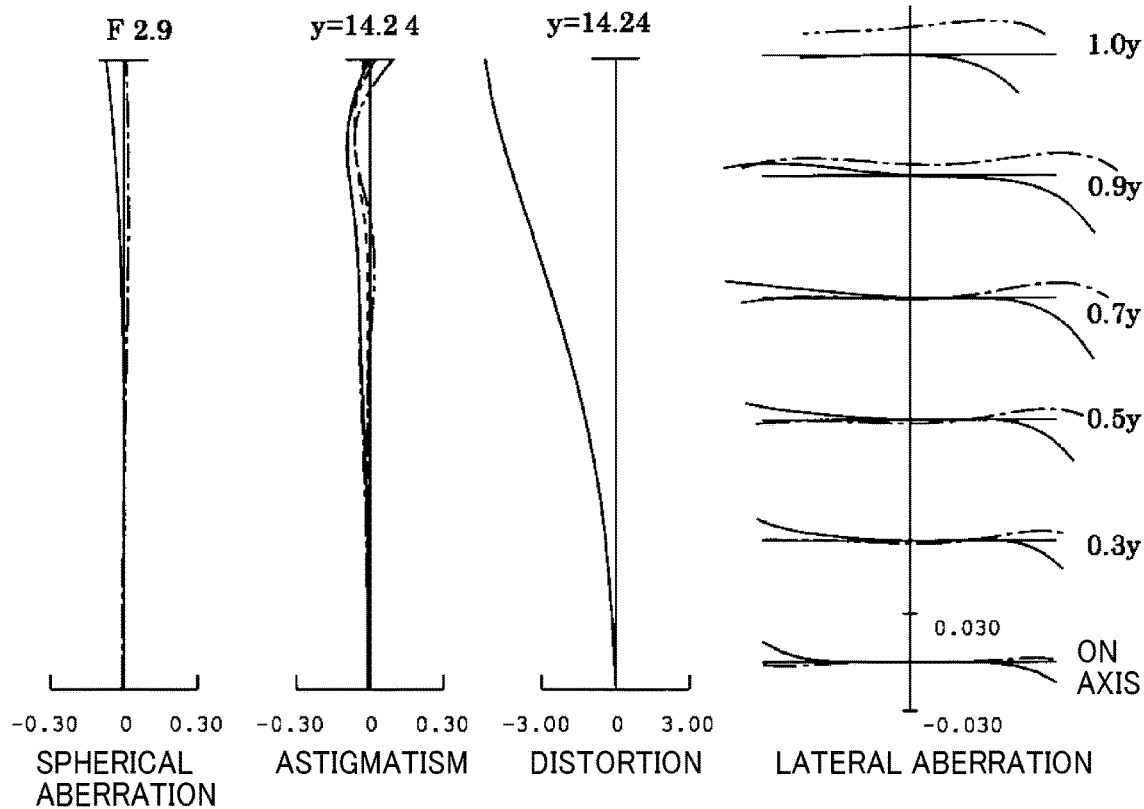
FIG. 34 includes aberration curve diagrams at a short focal-length end of the zoom lens system according to Numerical Example 9.
Figure 35:
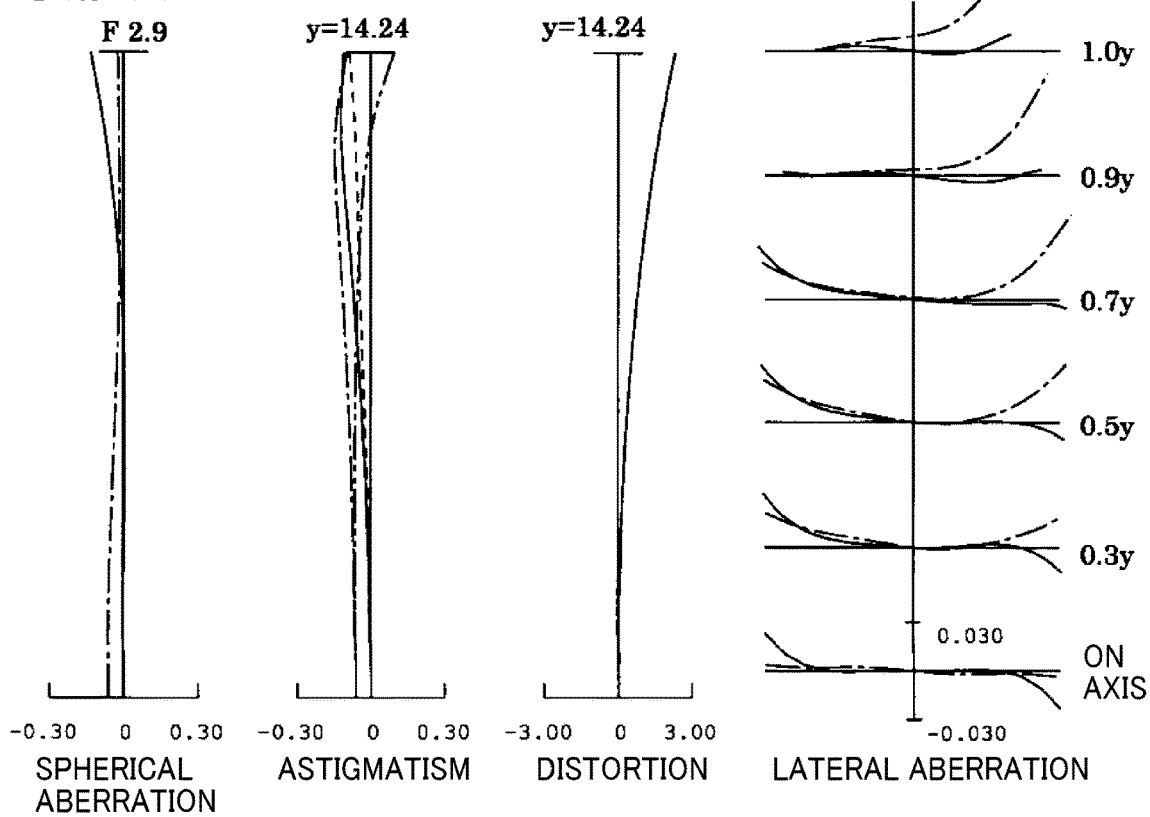
FIG. 35 includes aberration curve diagrams at an intermediate focal length of the zoom lens system according to Numerical Example 9.
Figure 36:
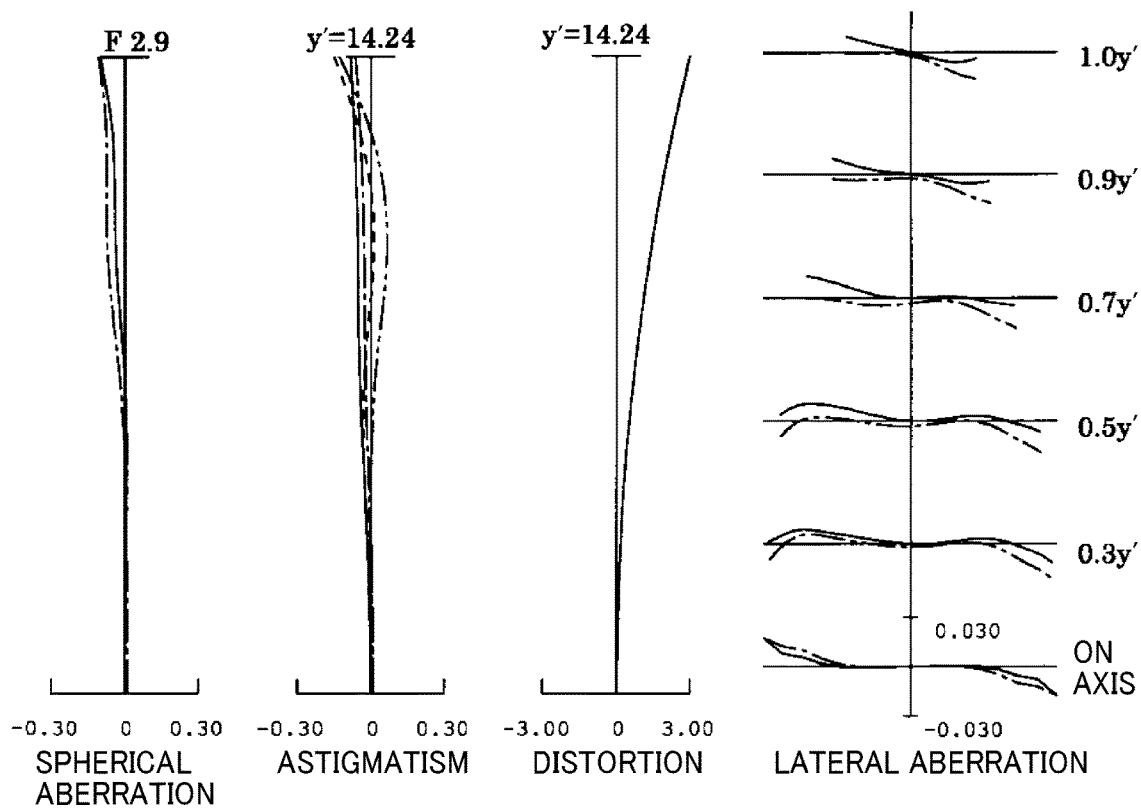
FIG. 36 includes aberration curve diagrams at a long focal-length end of the zoom lens system according to Numerical Example 9.

FIGS. 9, and 34 to 36, and Tables 41 to 45 indicate a zoom lens system according to Numerical Example 9. FIG. 9 is a lens configuration diagram. FIGS. 34, 35, and 36 are aberration curve diagrams at a short focal-length end, an intermediate focal length, and a long focal-length end. Table 41 presents surface data, Table 42 presents aspherical surface data, Table 43 presents variable distance data, Table 44 presents zoom lens group data, and Table 45 presents conditional expression data.

The zoom lens system according to Numerical Example 9 includes, sequentially from the object side, a front lens group GF and a rear lens group GR. The front lens group GF includes, sequentially from the object side, a first lens group G1 having a positive refractive power, a second lens group G2 having a negative refractive power, and a third lens group G3 having a negative refractive power. The rear lens group GR as a whole has a positive refractive power, and includes, sequentially from the object side, a fourth lens group G4 having a positive refractive power, a fifth lens group G5 having a positive refractive power, and a sixth lens group G6 having a negative refractive power.

The first lens group G1 includes, sequentially from the object side, a negative meniscus lens 11C being convex on the object side, a planoconvex positive lens 12C being convex on the object side, and a positive meniscus lens 13C being convex on the object side. The negative meniscus lens 11C and the planoconvex positive lens 12C are cemented to each other.

The second lens group G2 includes, sequentially from the object side, a negative meniscus lens 21C being convex on the object side, a biconcave negative lens 22C, and a biconvex positive lens 23C. The negative meniscus lens 21C is made of a hybrid lens in which an aspherical layer made of a synthetic resin material is bonded on a surface on the object side of a glass lens. The biconcave negative lens 22C and the biconvex positive lens 23C are cemented to each other.

The third lens group G3 includes, sequentially from the object side, a biconcave negative lens 31C and a positive meniscus lens 32C being convex on the object side. The biconcave negative lens 31C and the positive meniscus lens 32C are cemented to each other.

The fourth lens group G4 includes, sequentially from the object side, an aperture stop SP, a positive meniscus lens 41C being convex on the object side, a biconvex positive lens 42C, and a biconcave negative lens 43C. The biconvex positive lens 42C and the biconcave negative lens 43C are cemented to each other.

The fifth lens group G5 includes, sequentially from the object side, a biconvex positive lens 51C, a biconcave negative lens 52C, a biconvex positive lens 53C, and a biconvex positive lens 54C. The biconvex positive lens 51C has an aspherical surface on a surface on the object side. The biconvex positive lens 53C has an aspherical surface on a surface on the image side. The biconcave negative lens 52C and the biconvex positive lens 53C are cemented to each other.

The sixth lens group G6 includes, sequentially from the object side, a biconcave negative lens 61C, a positive meniscus lens 62C being convex on the object side, and a positive meniscus lens 63C being convex on the image side. The biconcave negative lens 61C and the positive meniscus lens 62C are cemented to each other.

TABLE 41 f = 18.5~43.5~101.9, F = 2.9~2.9~2 9, w = 39.0~17.8~7.7, Ya = 14.24

| Surface No. | R | D | Nd | vd | Glass type (glass member) |
|---|---|---|---|---|---|
| 1 | 187.168 | 2.170 | 1.85478 | 24.80 | S-NBH56 (OHARA) |
| 2 | 80.603 | 7.600 | 1.59410 | 60.47 | FCD600 (HOYA) |
| 3 | ∞ | 0.150 | | | |
| 4 | 63.500 | 6.520 | 1.75500 | 52.32 | S-LAH97 (OHARA) |
| 5 | 192.516 | D1 | | | |
| 6* | 239.004 | 0.100 | 1.52972 | 42.53 | Optical resin |
| 7 | 160.004 | 1.500 | 1.88300 | 40.80 | TAFD30 (HOYA) |
| 8 | 22.078 | 8.359 | | | |
| 9 | −55.226 | 1.200 | 1.83481 | 42.74 | S-LAH55VS (OHARA) |
| 10 | 33.000 | 8.670 | 1.90366 | 31.31 | TAFD25 (HOYA) |
| 11 | −55.650 | D2 | | | |
| 12 | −37.260 | 0.900 | 1.72000 | 50.23 | S-LAL10 (OHARA) |

TABLE 41-continued f = 18.5~43.5~101.9, F = 2.9~2.9~2 9, w = 39.0~17.8~7.7, Ya = 14.24

| Surface No. | R | D | Nd | vd | Glass type (glass member) |
|---|---|---|---|---|---|
| 13 | 38.462 | 3.882 | 1.85478 | 24.80 | S-NBH56 (OHARA) |
| 14 | 51649.350 | D3 | | | |
| 15 | Stop | 1.400 | | | |
| 16 | 50.801 | 4.000 | 1.90043 | 37.37 | TAFD37A (HOYA) |
| 17 | 975.716 | 0.200 | | | |
| 18 | 48.000 | 5.900 | 1.49700 | 81.55 | S-FPL51 (OHARA) |
| 19 | −51.398 | 1.200 | 2.00100 | 29.13 | TAFD55 (HOYA) |
| 20 | 187.444 | D4 | | | |
| 21* | 35.764 | 7.028 | 1.59201 | 67.02 | M-PCD51 (HOYA) |
| 22 | −70.613 | 0.757 | | | |
| 23 | −93.412 | 1.100 | 1.65412 | 39.68 | S-NBH5 (OHARA) |
| 24 | 29.706 | 6.000 | 1.49710 | 81.56 | M-FCD1 (HOYA) |
| 25* | −83.798 | 0.120 | | | |
| 26 | 95.634 | 3.800 | 2.00100 | 29.13 | TAFD55 (HOYA) |
| 27 | −104.300 | D5 | | | |
| 28 | −102.465 | 1.000 | 1.95375 | 32.32 | TAFD45 (HOYA) |
| 29 | 25.594 | 3.200 | 1.72825 | 28.46 | S-TIH10 (OHARA) |
| 30 | 57.718 | 2.000 | | | |
| 31 | −82.802 | 3.000 | 1.72916 | 54.09 | S-LAL19 (OHARA) |
| 32 | −37.073 | FB | | | |

*is a rotation-symmetrical aspherical surface.

TABLE 42

| Surface No. | K | A4 | A6 | A8 | A10 |
|---|---|---|---|---|---|
| 6 | 0 | 4.78916E−06 | −6.98122E−09 | 9.90946E−12 | −7.96602E−15 |
| 21 | 0 | −3.33582E−06 | 7.06755E−09 | 0.00000E+00 | 0.00000E+00 |
| 25 | 0 | 1.37019E−05 | 5.59672E−09 | 2.30684E−11 | 0.00000E+00 |

TABLE 43

| | D1 | D2 | D3 | D4 | D5 | BF |
|---|---|---|---|---|---|---|
| Short focal-length end f = 18.5 | 1.270 | 6.060 | 33.889 | 15.290 | 2.904 | 30.120 |
| Intermediate focal length f = 43.5 | 23.139 | 8.060 | 12.538 | 6.435 | 2.587 | 47.793 |
| Long focal-length end f = 102 | 46.858 | 17.379 | 1.027 | 3.167 | 1.282 | 66.140 |

TABLE 44

| Group | Focal length |
|---|---|
| First lens group | 106.2 |
| Second lens group | −37.37 |
| Third lens group | −63.36 |
| Fourth lens group | 71.96 |
| Fifth lens group | 28.89 |
| Sixth lens group | −55.85 |
| First to third lens groups | Short focal-length end: −25.99, Long focal-length end: −61.90 |
| Rear lens group | Short focal-length end: 37.98, Long focal-length end: 34.86 |

TABLE 45

| (1) | Twt/Twm | −0.07 |
|---|---|---|
| (2) | frw/Ya | 2.67 |
| (3) | |f3/ffw| | 2.43 |
| (4) | |f3/fft| | 1.02 |
| (5) | f2/f3 | 0.59 |
| (6) | R3gf/R2gr | 0.67 |
| (7) | Bfw/Ya | 2.12 |
| (8) | Bfw/fw | 1.62 |
| (9) | f1/fw | 2.80 |
| (10) | vpMAX | 31.3 |

TABLE 45-continued

| (11) | f1/Twt1 | 2.29 |
|---|---|---|
| (12) | f1/f23w | −5.74 |
| (13) | D(2R − 3F)T/D(2F − 3R)T | 0.41 |
| (14) | $(1 - Mt^2) \times MRt^2$ | 2.47 |
| (15) | f4/f6 | — (Not applicable) |
| (16) | |fN/frm| | 1.60 |
| (17) | v3n/v3p | 2.03 |
| (18) | N3p | 1.8548 |
| (19) | N3a | 1.7874 |

Figure 37A:
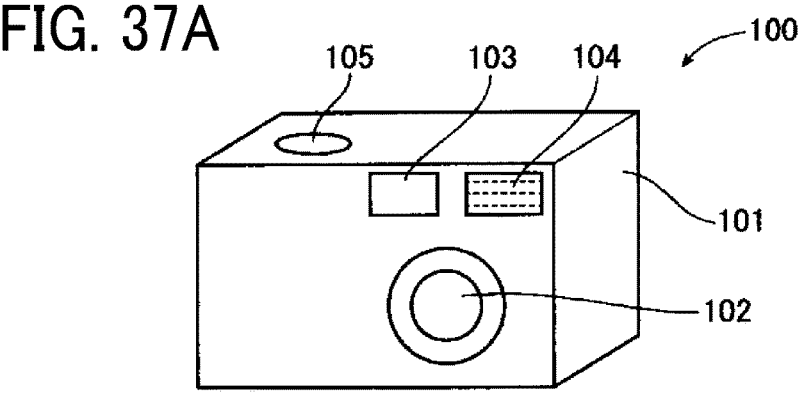
FIGS. 37A and 37B are each a first diagram of an imaging apparatus incorporating a zoom lens system according to an embodiment.
Figure 37B:
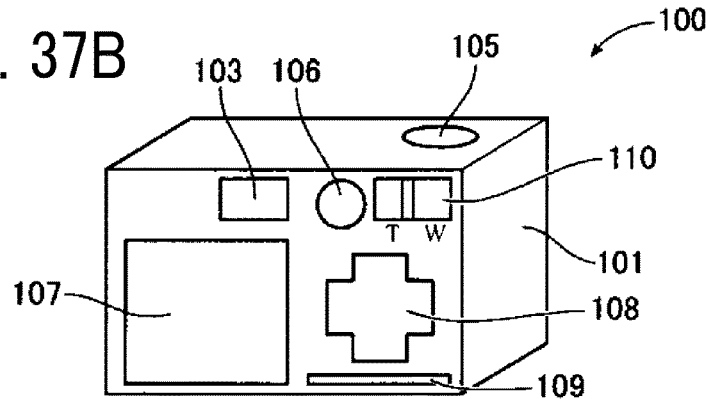
Figure 38:
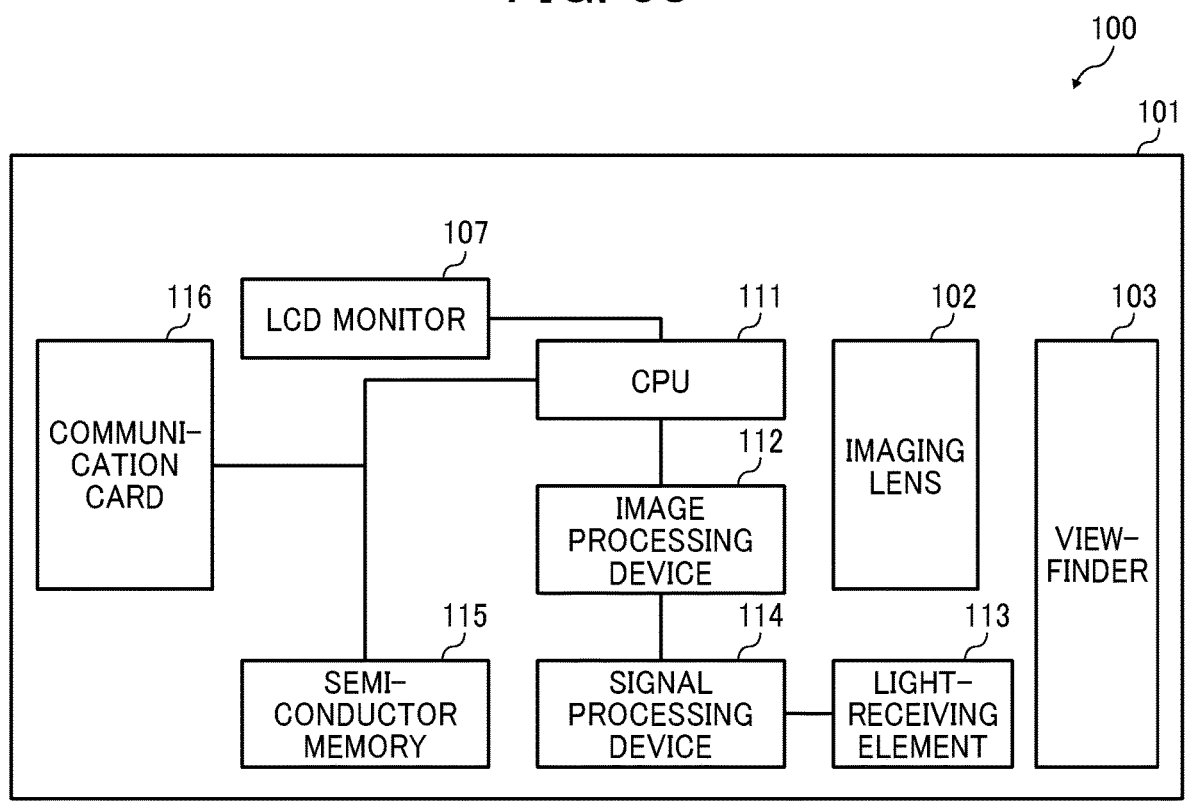
FIG. 38 is a second diagram of an imaging apparatus incorporating the zoom lens system according to the embodiment.

Referring to FIGS. 37A, 37B, and 38, a digital camera (imaging apparatus) 100 including the zoom lens system according to the embodiment is described.

The digital camera 100 includes a camera body (housing) 101, an imaging lens 102, a viewfinder 103, a flash 104, a shutter release button 105, a power button 106, a liquid crystal monitor 107, an operation button 108, a memory card slot 109, and a zoom switch 110.

The camera body 101 houses the components of the digital camera 100. The imaging lens 102 is, for example, a unit in which the zoom lens system according to the embodiment is incorporated into a lens barrel. The viewfinder 103 is a viewing window for determining the subject and the composition. The flash 104 emits a flash when shooting at night or shooting in a dark place. The shutter release button 105 is a physical switch for performing shooting with the digital camera 100. The power button 106 is a physical switch for switching the power of the digital camera 100 on and off. The liquid crystal monitor 107 displays, for example, an image captured by the digital camera 100. The operation button 108 is a physical switch for setting a shooting mode or the like of the digital camera 100. The memory card slot 109 is a slot into which a memory card (not illustrated) for storing, for example, an image captured by the digital camera 100 is inserted. The zoom switch 110 is a physical switch for changing magnification (zooming) between the short focal-length end and the long focal-length end. The zoom switch 110 is operated to properly change the distances among the lens groups of the zoom lens system according to the embodiment.

The digital camera 100 further includes a central processing unit 111, an image processing device 112, a light receiving element 113, a signal processing device 114, a semiconductor memory 115, and a communication card 116, which are functional components within the camera body 101.

The central processing unit 111 performs various types of arithmetic processing inside the digital camera 100. The image processing device 112 performs various types of image processing on an image captured by the digital camera 100. The light receiving element 113 takes in and receives external light that is used for photometric processing. The signal processing device 114 performs various types of signal processing such as a shooting instruction signal and an image processing signal. The semiconductor memory 115 constitutes a temporary storage area for an image captured by the digital camera 100. The communication card 116 is used for enabling wireless communication or the like with an external device (not illustrated).

This configuration of the digital camera 100 described above is merely one example, and various design changes are possible (there is a latitude in the specific aspect of the digital camera 100).

The zoom lens system according to the embodiment may be applied to, instead of the above-described digital camera 100, for example, an interchangeable lens, a portable information terminal apparatus, a video camera, a film camera, an optical sensor, and a projection optical system (projector).

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A zoom lens system comprising:
sequentially from an object side, a first lens group having a positive refractive power, a second lens group having a negative refractive power, a third lens group having a negative refractive power, and a rear lens group having a positive refractive power,
wherein distances among the respective lens groups adjacent to one another change during zooming from a short focal-length end to a long focal-length end,
wherein the third lens group constitutes a focus lens group configured to move during focusing,
wherein the rear lens group includes an N-th lens group having a negative refractive power and configured such that distances between the N-th lens group and the respective lens groups adjacent to the N-th lens group change during zooming from the short focal-length end to the long focal-length end, and
wherein the zoom lens system satisfies Conditional Expression (1) as follows:

$$-20 < Twt/Twm < 1, \quad (1)$$

where
Twt is a moving amount of the second lens group during zooming from the short focal-length end to the long focal-length end, a moving amount to the object side being indicated by a positive sign, a moving amount to an image side being indicated by a negative sign, and
Twm is a moving amount of the second lens group during zooming from the short focal-length end to an intermediate focal length, a moving amount to the object side being indicated by a positive sign, a moving amount to the image side being indicated by a negative sign,
the intermediate focal length being expressed by fm=(fw·ft)$^{1/2}$, where fw is a focal length of a whole system at the short focal-length end, and ft is a focal length of the whole system at the long focal-length end.

2. The zoom lens system according to claim 1, wherein the zoom lens system satisfies Conditional Expression (2) as follows:

$$2.0 < frw/Ya < 3.5, \quad (2)$$

where
frw is a focal length of the rear lens group at the short focal-length end in focus at infinity, and
Ya is a maximum image height.

3. The zoom lens system according to claim 1, wherein the zoom lens system satisfies Conditional Expressions (3) and (4) as follows:

$$2.0 < |f3/ffw| < 5.0, \text{ and} \quad (3)$$

$$1.0 < |f3/fft| < 4.0, \quad (4)$$

where
f3 is a focal length of the third lens group,
ffw is a composite focal length of the first lens group, the second lens group, and the third lens group at the short focal-length end in focus at infinity, and
fft is a composite focal length of the first lens group, the second lens group, and the third lens group at the long focal-length end in focus at infinity.

4. The zoom lens system according to claim 1, wherein the zoom lens system satisfies Conditional Expression (5) as follows:

$$0.1 < f2/f3 < 0.7, \quad (5)$$

where
f2 is a focal length of the second lens group, and
f3 is a focal length of the third lens group.

5. The zoom lens system according to claim 1, wherein the third lens group includes two lenses of a negative lens and a positive lens.

6. The zoom lens system according to claim 1, wherein the zoom lens system satisfies Conditional Expression (6) as follows:

$$0.1 < R3gf/R2gr < 5.0, \quad (6)$$

where
R3gf is a curvature radius of a surface disposed closest to the object side of the third lens group, and
R2gr is a curvature radius of a surface disposed closest to the image side of the second lens group.

7. The zoom lens system according to claim 1, wherein the zoom lens system satisfies Conditional Expression (7) as follows:

$$1.5 < Bfw/Ya < 4.0, \quad (7)$$

where
Bfw is a distance in terms of air conversion from a surface disposed closest to the image side of the rear lens group at the short focal-length end in focus at infinity to the image surface, and
Ya is the maximum image height.

8. The zoom lens system according to claim 1, wherein the zoom lens system satisfies Conditional Expression (8) as follows:

$$1.5 < Bfw/fw < 4.0, \quad (8)$$

where
Bfw is a distance in terms of air conversion from the surface disposed closest to the image side of the rear lens group at the short focal-length end in focus at infinity to the image surface, and
fw is a focal length of the whole system at the short focal-length end in focus at infinity.

9. The zoom lens system according to claim 1, wherein the zoom lens system satisfies Conditional Expression (9) as follows:

$$2.5 < f1/fw < 6.0, \quad (9)$$

where
f1 is a focal length of the first lens group, and
fw is a focal length of the whole system at the short focal-length end in focus at infinity.

10. The zoom lens system according to claim 1, wherein one of the second lens group and the third lens group includes at least one positive lens, and wherein the zoom lens system satisfies Conditional Expression (10) as follows:

$$25 < vp\,MAX < 45, \quad (10)$$

where
vpMAX is an Abbe number for a d-line of a positive lens having a largest Abbe number and included in the at least one positive lens included in the one of the second lens group and the third lens group.

11. The zoom lens system according to claim 1, wherein the first lens group moves from an image side toward the object side during zooming from the short focal-length end to the long focal-length end, wherein the zoom lens system satisfies Conditional Expression (11) as follows:

$$1.5 < f1/Twt1 < 7.0, \quad (11)$$

where
f1 is a focal length of the first lens group, and
Twt1 is a moving amount of the first lens group during zooming from the short focal-length end to the long focal-length end, a moving amount to the object side being indicated by a positive sign, a moving amount to the image side being indicated by a negative sign.

12. The zoom lens system according to claim 1, wherein the zoom lens system satisfies Conditional Expression (12) as follows:

$$-20.0 < f1/f23w < -3.0, \quad (12)$$

where
f1 is a focal length of the first lens group, and
f23w is a composite focal length of the second lens group and the third lens group at the short focal-length end in focus at infinity.

13. The zoom lens system according to claim 1, wherein the zoom lens system satisfies Conditional Expression (13) as follows:

$$0.20 < D(2R-3F)T/D(2F-3R)T < 0.60, \quad (13)$$

where
D(2R–3F)T is a distance in an optical-axis direction from a final surface of the second lens group to a foremost surface of the third lens group at the long focal-length end in focus at infinity, and
D(2F–3R)T is a total thickness in the optical-axis direction from a foremost surface of the second lens group to a surface disposed closest to the image surface of the third lens group at the long focal-length end in focus at infinity.

14. The zoom lens system according to claim 1, wherein the zoom lens system satisfies Conditional Expression (14) as follows:

$$1.00 < (1-Mt^2) \times MRt^2 < 8.00, \quad (14)$$

where
Mt is a lateral magnification of the third lens group at the long focal-length end in focus at infinity, and
MRt is a lateral magnification of the rear lens group at the long focal-length end in focus at infinity.

15. The zoom lens system according to claim 1, wherein the zoom lens system has an F-number of less than or equal to 3 over a whole focal-length range.

16. The zoom lens system according to claim 1, wherein the rear lens group includes, sequentially from the object side, a fourth lens group having a positive refractive power, a fifth lens group having a negative refractive power and serving as the N-th lens group, and a sixth lens group having a positive refractive power.

17. An interchangeable lens comprising:
the zoom lens system according to claim 1.

18. An imaging apparatus comprising:
the zoom lens system according to claim 1.

* * * * *